(12) United States Patent
Brient

(10) Patent No.: US 7,044,177 B2
(45) Date of Patent: May 16, 2006

(54) METHODS AND APPARATUSES FOR DISPENSING CONDIMENTS

(76) Inventor: Scott E. Brient, 625 Highlands Ct., Roswell, GA (US) 30075

( * ) Notice: Subject to any disclaimer, the term of this patent is extended or adjusted under 35 U.S.C. 154(b) by 0 days.

(21) Appl. No.: 10/726,419

(22) Filed: Dec. 2, 2003

(65) Prior Publication Data

US 2004/0112928 A1 Jun. 17, 2004

Related U.S. Application Data

(60) Provisional application No. 60/430,265, filed on Dec. 2, 2002, provisional application No. 60/465,590, filed on Apr. 25, 2003, provisional application No. 60/482,731, filed on Jun. 26, 2003.

(51) Int. Cl.
*B65B 1/04* (2006.01)
(52) U.S. Cl. .................. 141/329; 141/27; 141/234; 141/247; 99/533; 426/282
(58) Field of Classification Search ................ 141/18, 141/27, 82, 114, 129, 130, 192, 234, 237, 141/247, 329; 99/487, 494, 532–536; 426/281, 426/282–284
See application file for complete search history.

(56) References Cited

U.S. PATENT DOCUMENTS

| | | | |
|---|---|---|---|
| 3,082,681 A * | 3/1963 | Petersen | 99/532 |
| 3,410,457 A * | 11/1968 | Brown | 222/191 |
| 4,009,288 A | 2/1977 | Fukagawa | |
| 4,159,348 A | 6/1979 | Dogliotti | |
| 4,182,002 A * | 1/1980 | Holec | 99/532 |
| 4,210,074 A | 7/1980 | Laughman | |
| 4,259,051 A | 3/1981 | Shatila | |
| 4,283,430 A | 8/1981 | Doster | |
| 4,372,354 A | 2/1983 | Moore | |
| 4,392,592 A | 7/1983 | Sullivan | |
| 4,401,681 A | 8/1983 | Dahle | |
| 4,414,885 A * | 11/1983 | Kelly | 99/494 |
| 4,455,928 A * | 6/1984 | Townsend | 99/533 |
| 4,463,021 A | 7/1984 | Eufemia | |
| 4,477,003 A | 10/1984 | Baker | |
| 4,517,203 A | 5/1985 | Levine | |
| 4,551,337 A | 11/1985 | Schmit | |
| 4,569,101 A | 2/1986 | Tribbett | |
| 4,570,298 A | 2/1986 | Tribbett | |
| 4,596,714 A | 6/1986 | Brabbs | |
| 4,618,499 A | 10/1986 | Wainwright | |
| 4,693,899 A | 9/1987 | Hong et al. | |

(Continued)

FOREIGN PATENT DOCUMENTS

DE 198 42 546 A1 3/2000

(Continued)

OTHER PUBLICATIONS

Recipe Source Archives for Cajun and Creole Recipes 1-22, http://allrecipes.tripod.com/recipesource/id133.html.

(Continued)

*Primary Examiner*—Timothy L. Maust

(57) ABSTRACT

A condiment dispenser (such as a unique condiment packet, or automated device) that is configured for dispensing one or more types of condiment (e.g., ketchup, mustard mayonnaise, barbeque sauce, or Ranch dressing) relative to a food item, such as a French fry. In one embodiment of the invention, the condiment dispenser includes an injection nozzle that is configured for injecting condiment into the interior of the food item. In a particular embodiment, the injection nozzle is configured for piercing the food item's exterior surface before injecting condiment into the interior of the food item.

22 Claims, 27 Drawing Sheets

U.S. PATENT DOCUMENTS

| | | |
|---|---|---|
| 4,696,825 A | 9/1987 | Leibfred |
| 4,710,391 A | 12/1987 | Kirn |
| 4,826,697 A | 5/1989 | Ferrero |
| 4,961,508 A | 10/1990 | Weimer |
| 5,009,903 A | 4/1991 | DeFigueiredo et al. |
| 5,081,917 A | 1/1992 | Masuda |
| 5,236,724 A | 8/1993 | Burger |
| 5,330,075 A | 7/1994 | Brown, Sr. |
| 5,337,925 A | 8/1994 | Ferrara, Jr. |
| 5,350,083 A | 9/1994 | Du |
| 5,361,943 A | 11/1994 | Du |
| 5,366,117 A | 11/1994 | Mesenbring et al. |
| 5,429,262 A | 7/1995 | Sharkey |
| 5,437,396 A | 8/1995 | Russillo et al. |
| 5,505,971 A | 4/1996 | Mochizuki et al. |
| 5,605,093 A | 2/1997 | Higashimoto |
| 5,676,990 A | 10/1997 | Wawrzynski |
| 5,823,398 A | 10/1998 | Russillo |
| 5,893,673 A | 4/1999 | Edwards |
| 5,950,867 A | 9/1999 | Martindale et al. |
| D417,848 S | 12/1999 | Marshall |
| 6,004,596 A | 12/1999 | Kretchman et al. |
| 6,085,942 A | 7/2000 | Redmond |
| 6,357,632 B1 | 3/2002 | Salmela |
| 6,360,916 B1 | 3/2002 | Sokolsky et al. |
| 6,386,443 B1 | 5/2002 | Szczerbinski |
| 6,399,128 B1 | 6/2002 | Ballesteros |
| 6,412,400 B1 | 7/2002 | Gambino et al. |
| 2001/0007689 A1 | 7/2001 | Neumann |
| 2002/0036211 A1 | 3/2002 | Seltzer |
| 2002/0039612 A1 | 4/2002 | Gambino et al. |
| 2002/0068115 A1 | 6/2002 | Haynes-Jacobson |
| 2002/0098267 A1 | 7/2002 | Heisey |
| 2002/0100760 A1 | 8/2002 | Rinks |
| 2002/0132029 A1 | 9/2002 | Teras et al. |
| 2002/0148855 A1 | 10/2002 | Sokolsky et al. |
| 2002/0150656 A1 | 10/2002 | Farnsworth et al. |
| 2003/0017248 A1 | 1/2003 | Gray |
| 2003/0024842 A1 | 2/2003 | Blink |
| 2003/0049353 A1 | 3/2003 | Lauen et al. |
| 2003/0202837 A1 | 10/2003 | Trifunovich et al. |

FOREIGN PATENT DOCUMENTS

| | | |
|---|---|---|
| DE | 198 49 248 A1 | 4/2000 |
| WO | WO 00/16646 | 3/2000 |

OTHER PUBLICATIONS

Farmer John, "Filled Franks", http://www.halfbakery.com/idea/Filled_20Franks.

Advertisement for Wet Ones Antibacterial Wipes, People Magizine, Jul. 7, 2003, p. 38.

International Search Report from corresponding International Application No. PCT/US03/38207 dated Jun. 18, 2004.

* cited by examiner

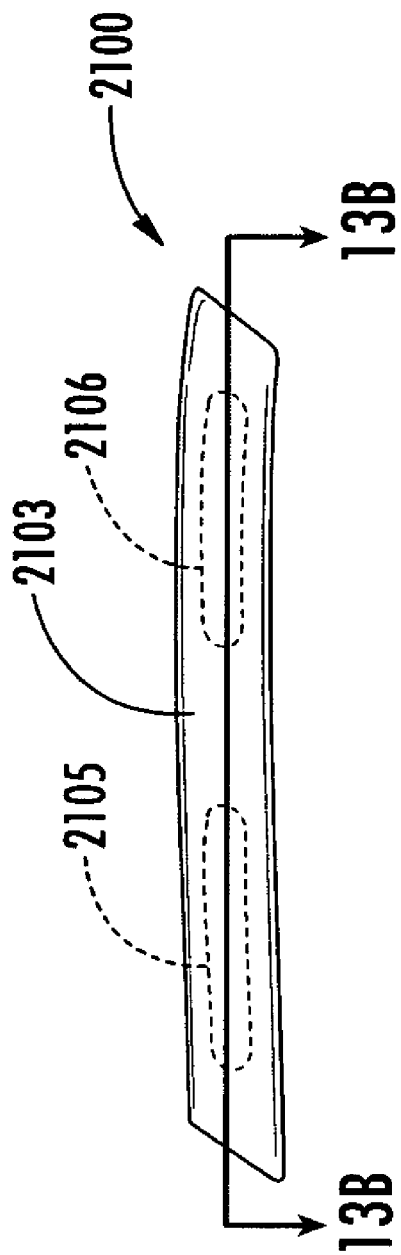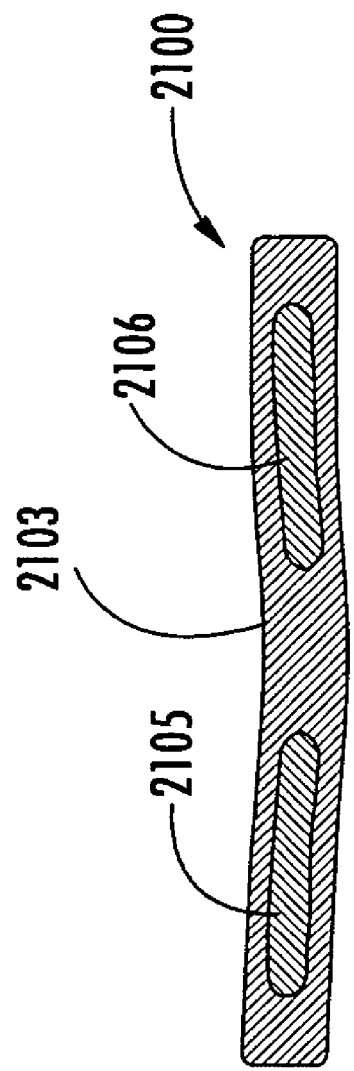
FIG. 13A
FIG. 13B

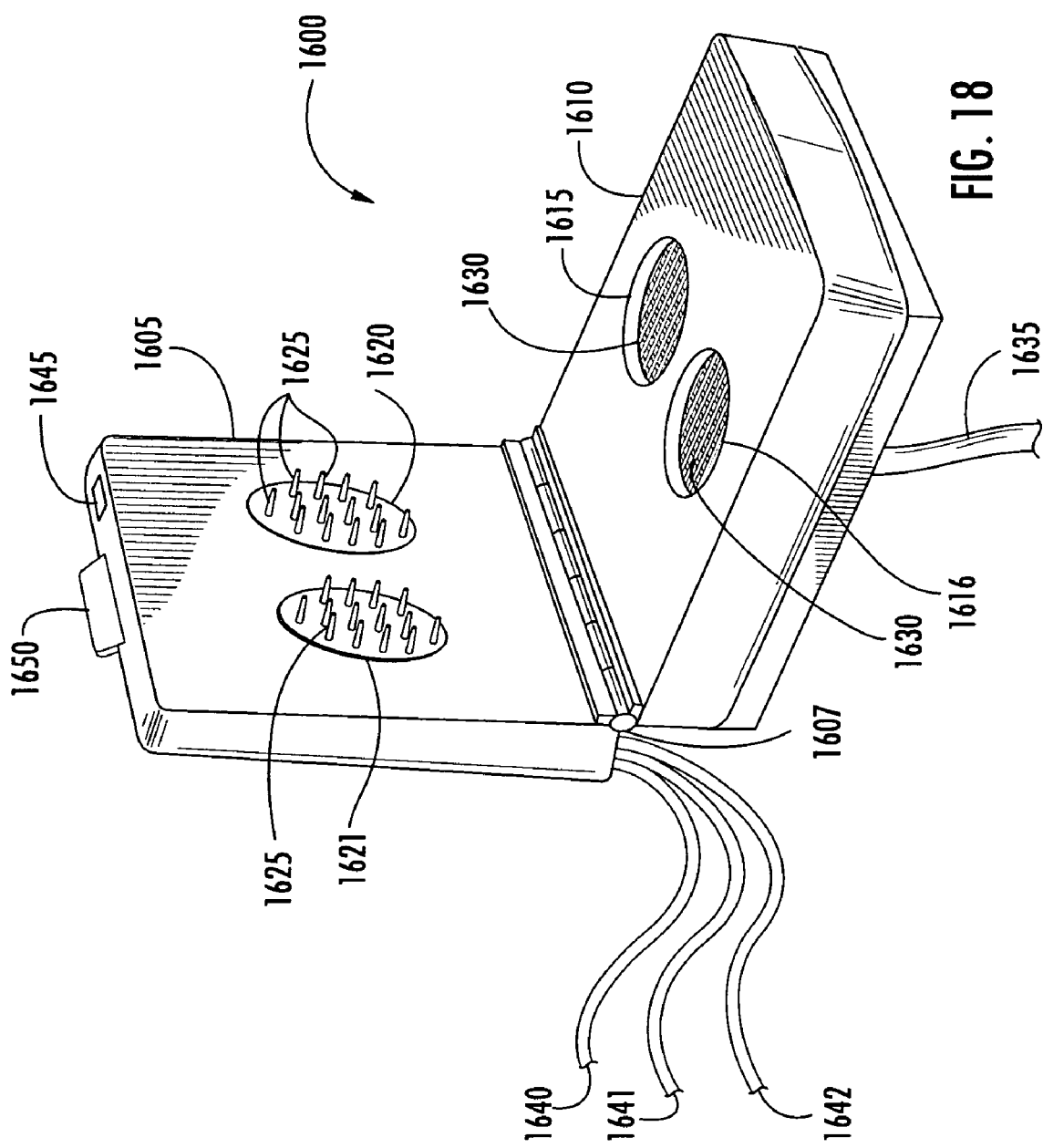

METHODS AND APPARATUSES FOR DISPENSING CONDIMENTS

CROSS-REFERENCE TO RELATED APPLICATIONS

This application claims priority from: (1) U.S. provisional patent application Ser. No. 60/430,265, filed Dec. 2, 2002 and entitled "Methods and Apparatuses for Dispensing Condiments"; (2) U.S. provisional patent application Ser. No. 60/465,590, filed Apr. 25, 2003 and entitled "Methods and Apparatuses for Dispensing Condiments"; and (3) U.S. provisional patent application Ser. No. 60/482,731, filed Jun. 26, 2003 and entitled "Methods and Apparatuses for Dispensing Condiments". Each of these three provisional patent applications is hereby incorporated by reference.

BACKGROUND OF THE INVENTION

Currently, it is common practice to enhance the flavor of food items, such as French fries, by applying a condiment to the exterior of the food items after the food items are cooked. This is done by dipping individual food items in a pool of condiment, such as ketchup, or by dispensing the condiment directly onto the exterior of the food items from a condiment package, or a dispenser such as the large pump-type ketchup and mustard dispensers found at many fast food restaurants.

There are many disadvantages associated with this prior art practice of applying condiments to food items. First, the practice can be messy. This is due to the fact that the condiment may drip off of the food items before, or as, the food items are eaten. In addition, individuals often make pools of condiment for their food items on flexible sandwich wrappers and other unstable surfaces. This can result in stains if the wrappers inadvertently come into contact with clothing, carpets, or other items.

A further disadvantage of current condiment application techniques is that it is difficult to use these techniques to apply a condiment to food items while driving. This is a common problem for individuals who order food items from a drive-through window, and then attempt to apply a condiment to the food items while driving. Using current techniques, the individual is presented with the food item (e.g., French fries, onion rings, hash browns, French toast sticks, or a soft pretzel) and several individual packets of condiment (e.g., ketchup or syrup) at a drive-through window. The user then opens the individual condiment packets, pours the contents of the packets onto a napkin or sandwich wrapper to form a condiment pool, dips the food items individually into the condiment pool, and eats the food items. This can be stressful, messy, and distracting to the driver.

A further disadvantage to current condiment application practice is that it is wasteful. As will be understood by regular consumers of fast food, it is difficult to squeeze all of the condiment out of a prior art condiment packet without touching the torn opening of the packet, which is often smeared with condiment. Accordingly, in an effort to avoid touching the torn opening of the condiment packet, the user often only empties part of the packet when forming a pool of condiment (e.g., on a sandwich wrapper). In addition, customers rarely consume all of the condiment from any particular pool of condiment. This results in the waste of condiment as the wrappers or napkins used to support the condiment pool are discarded.

Accordingly, there is a need for an improved condiment dispensing apparatus (and corresponding method) that is tidy, efficient, and easy to use.

SUMMARY OF THE INVENTION

One embodiment of the invention comprises a packet or other container of condiment that includes an elongate injection nozzle that is configured for facilitating the injection of condiment from the packet (or other container) into the interior of a food item such as a French fry, onion ring, hash brown, tater tot, soft pretzel, or other food item. In a particular embodiment of the invention, the elongate injection nozzle is configured for facilitating the injection of condiment into the interior of the food item after the item is cooked (e.g., baked, cooked in a microwave, or deep fried). In a further embodiment of the invention, the elongate injection nozzle is configured for piercing an exterior surface of a food item and then acting as a conduit to deliver condiment from the packet (or other container) to the interior of the food item. In one embodiment of the invention, the elongate injection nozzle is configured much like a hypodermic needle. In one such embodiment, the end of the nozzle is sufficiently dull to avoid harming individuals during normal use.

In one embodiment of the invention, the nozzle is configured for facilitating the delivery of the condiment onto an exterior portion of the food item.

A particular embodiment of the invention comprises an automated injection device that is configured to perform, preferably in the listed sequence, the steps of: (1) receiving a plurality of cooked food items; (2) moving a first of the cooked food items into an injection position; (3) injecting the first cooked food item with a condiment; (4) moving a second of the cooked food items into an injection position; and (5) injecting the second cooked food item with a condiment.

Another embodiment of the invention comprises an automated injection device that is configured for injecting condiment into a cooked food item substantially without manual assistance from a user (e.g., without the user manually injecting the food item with condiment). A further embodiment of the invention comprises an automated injection device that is configured for injecting a stream of food items with a condiment.

A condiment dispenser according to a particular embodiment of the invention comprises: (1) a housing defining an interior portion; and (2) an injection nozzle defining an interior passage, the injection nozzle being: (A) in liquid communication with the housing; and (B) adapted to facilitate the transfer of condiment from the interior portion of the housing into an interior portion of a food item.

A condiment dispenser according to a further embodiment of the invention comprises: (1) a housing defining an interior portion; and (2) an injection nozzle defining an interior passage, the injection nozzle being: (A) in liquid communication with the housing; and (B) adapted to facilitate the transfer of condiment from the interior portion of the housing into an interior portion of a French fry.

A condiment dispenser according to yet another embodiment of the invention comprises: (1) a housing defining an interior portion; and (2) an injection nozzle defining an interior passage, the injection nozzle being: (A) in liquid communication with the housing; (B) adapted to create a hole in an exterior surface of a food item; and (C) adapted to facilitate the transfer of condiment from the interior portion of the housing, through the hole, and into an interior portion of a food item after the injection nozzle creates the hole in the exterior surface of the food item.

A method of preparing a food item according to one embodiment of the invention comprises the steps of: (1) cooking the food item; and (2) after cooking the food item, injecting a condiment into an interior portion of the food item. In one embodiment of the invention, the food item is a French fry. In other embodiments of the invention, the food item may be, for example: (1) a breakfast food item (such as a French toast stick, a pancake, or a waffle); (2) a baked pretzel; (3) a waffle; (4) a hot dog; (5) a hash brown; (6) a chicken nugget; or (7) a baked potato.

In various embodiments of the invention, the condiment may be, for example: (1) ketchup; (2) mustard; (3) cheese sauce; (4) barbeque sauce; (5) dressing (such as Ranch dressing); (6) hot sauce; (7) syrup, such as maple syrup; (8) sour cream; (9) gravy; (10) Worstershire sauce; or (11) butter.

A method, according to a particular embodiment of the invention, of injecting condiment into a plurality of French fries from within a cooked batch of French fries comprises using a substantially automated device to perform the steps of: (1) piercing, with an injection nozzle, an exterior surface of a first French fry from the single batch of French fries; (2) substantially immediately after piercing the exterior surface of the first French fry with an injection nozzle, injecting a first portion of the condiment into an interior portion of the first French fry; (3) piercing, with an injection nozzle, an exterior surface of a second French fry from the single batch of French fries; and (4) substantially immediately after piercing the exterior surface of the second French fry with an injection nozzle, injecting a second portion of the condiment into the interior portion of the second French fry.

A method, according to a particular embodiment of the invention, of preparing a serving of a plurality of French fries comprises: (1) cooking the serving of French fries; and (2) after the step of cooking the serving of French fries, using an automated French fry injection device to inject, in a substantially automated manner, each of the plurality of French fries with a condiment.

A method, according to another embodiment of the invention, of injecting condiment into a French fry comprises: (1) inserting a dispensing portion of an elongate injection nozzle through an exterior surface of a French fry; (2) positioning the injection nozzle into an "injection position" in which the dispensing portion of the injection nozzle is within an interior portion of the French fry and in which the injection nozzle will direct condiment generally toward a lateral end of the French fry; and (3) after the step of positioning the injection nozzle into the "injection position" and while the nozzle is in the "injection position", injecting condiment through the injection nozzle and into the interior portion of the French fry.

A method, according to one embodiment of the invention, of preparing a breakfast food item comprises the steps of: (1) cooking the breakfast food item; and (2) after cooking the breakfast food item, injecting a condiment into an interior portion of the breakfast food item.

A condiment-filled French fry according to one embodiment of the invention comprises: (1) an outer potato shell; and (2) an interior condiment portion that is disposed within an interior portion of the French fry and that is at least substantially enclosed by the outer potato shell.

Also, a condiment-filled French fry according to a particular embodiment of the invention comprises: (1) a French fry; and (2) a condiment portion disposed within an interior portion of the French fry. In one embodiment of the invention, the French fry is configured to substantially restrict (and preferably prevent) the passage of the condiment portion out of the French fry.

A condiment tap according to one embodiment of the invention comprises: (1) a nozzle having a nozzle inlet and a nozzle outlet, the nozzle defining a nozzle interior passage that extends between the nozzle inlet and the nozzle outlet; and (2) a tap member comprising a tap member inlet and a tap member outlet, the tap member defining a tap member interior passage, the tap member interior passage extending between the tap member inlet and the tap member outlet, the tap member interior passage being in liquid communication with the nozzle interior passage, and the tap member being configured to penetrate an exterior surface of a condiment packet to thereby allow the condiment tap interior passage to come into liquid communication with an interior portion of the condiment packet.

A condiment tap according to one embodiment is adapted for: (1) puncturing an exterior surface of a condiment packet; and (2) after puncturing the condiment packet, acting as a conduit for the flow of condiment out of the condiment packet. In one embodiment of the invention, the condiment tap is also configured for piercing the exterior of a food item and for injecting condiment into the interior of the food item after piercing the food item's exterior.

A condiment dispenser kit according to one embodiment of the invention comprises: (1) a housing defining an interior portion; and; (2) a condiment tap that includes: (A) a nozzle having a nozzle inlet and a nozzle outlet, the nozzle defining a nozzle interior passage that extends between the nozzle inlet and the nozzle outlet; and (B) a tap member comprising a tap member inlet and a tap member outlet, the tap member defining a tap member interior passage, the tap member interior passage extending between the tap member inlet and the tap member outlet, the tap member interior passage being in liquid communication with the nozzle interior passage, and the tap member being configured to penetrate an exterior surface of the housing to thereby allow the condiment tap interior passage to come into liquid communication with the interior portion of the housing.

A method, according to a particular embodiment of the invention, of providing a condiment to a customer, comprises the steps of: (1) providing the customer with a condiment packet; and (2) providing the customer with a condiment tap that is configured for: (A) puncturing an exterior surface of the condiment packet; and (B) after puncturing the condiment packet, acting as a conduit for the flow of condiment out of an interior portion of the condiment packet.

BRIEF DESCRIPTION OF THE DRAWINGS

Figure 1:
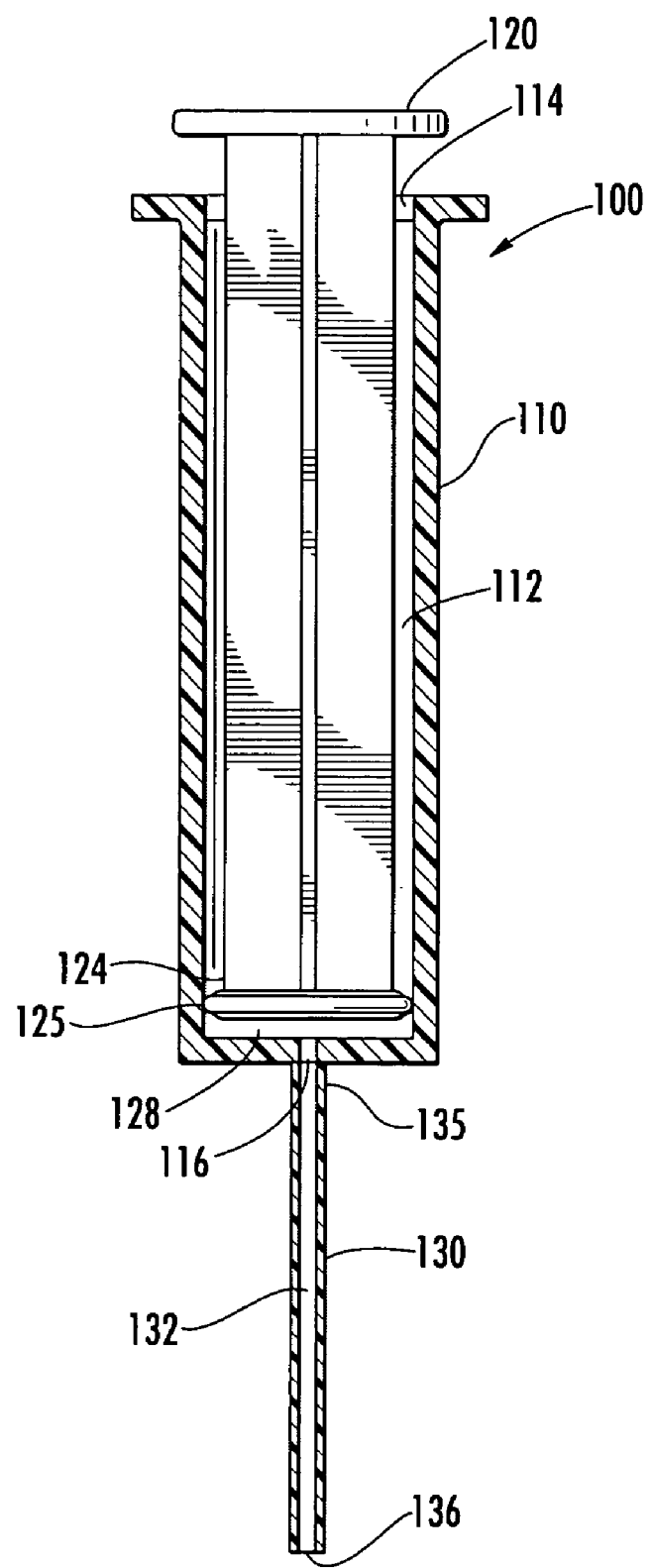

Having thus described the invention in general terms, reference will now be made to the accompanying drawings, which are not necessarily drawn to scale, and wherein:

FIG. 1 is a cross-sectional diagram of a condiment dispenser according to one embodiment of the invention.

Figure 2:
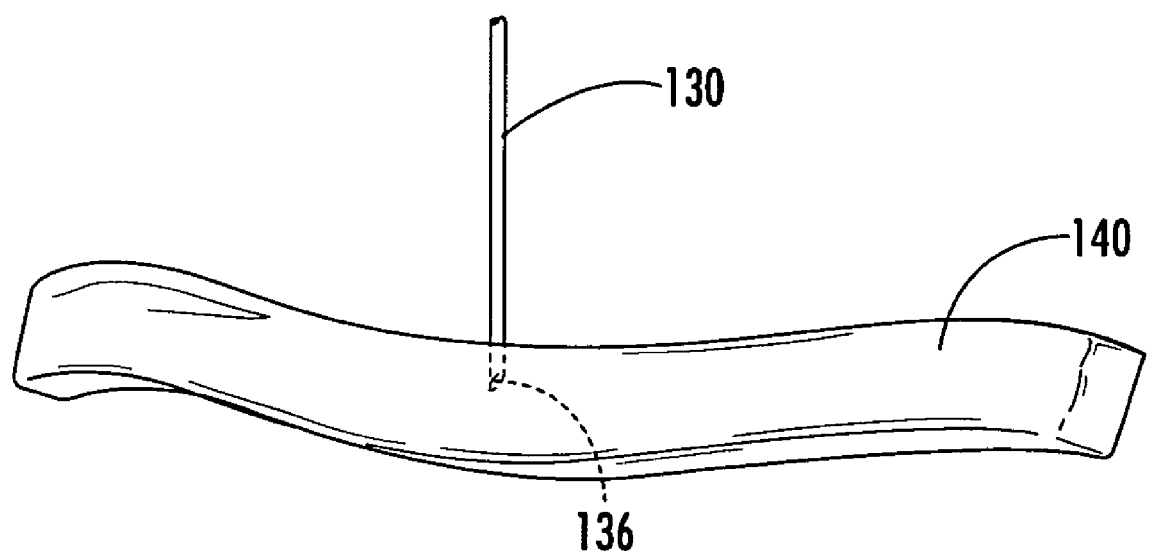

FIG. 2 is a perspective view of an injection nozzle that has been inserted into a food item.

Figure 3:
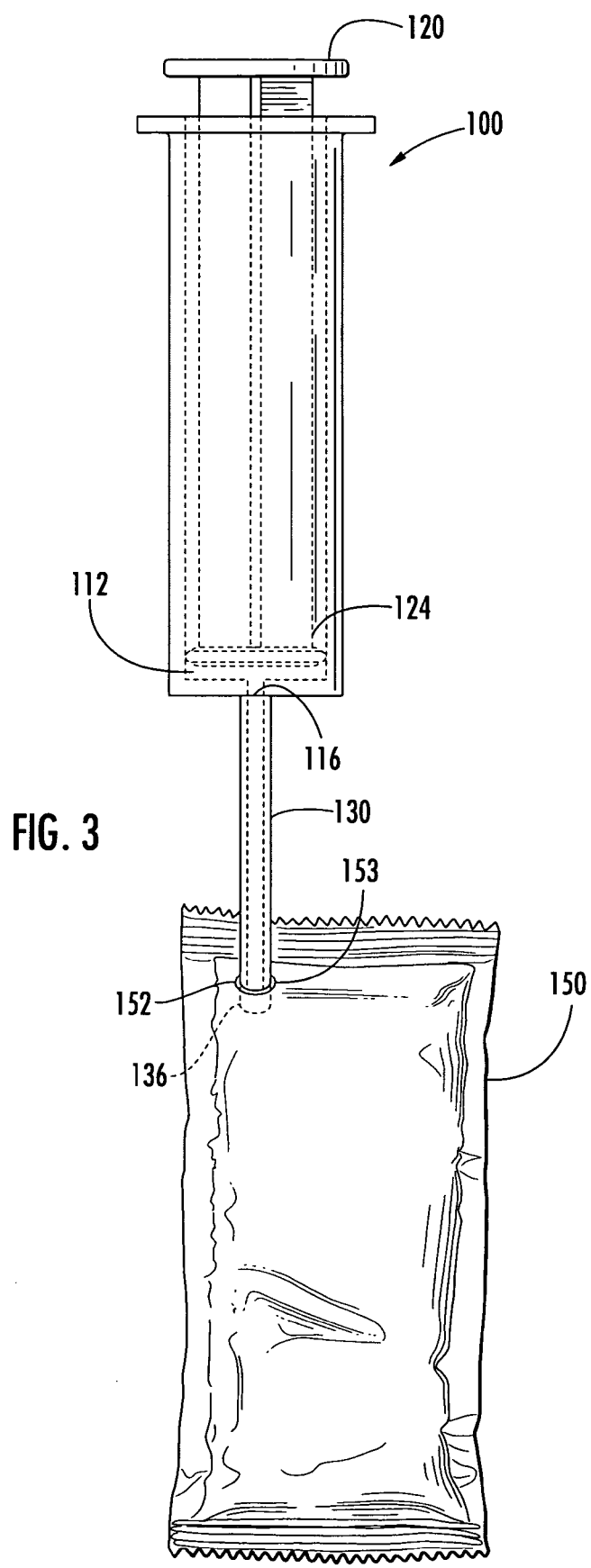

FIG. 3 is a perspective view of a condiment dispenser with its nozzle inserted into an opening in a condiment packet.

Figure 4:
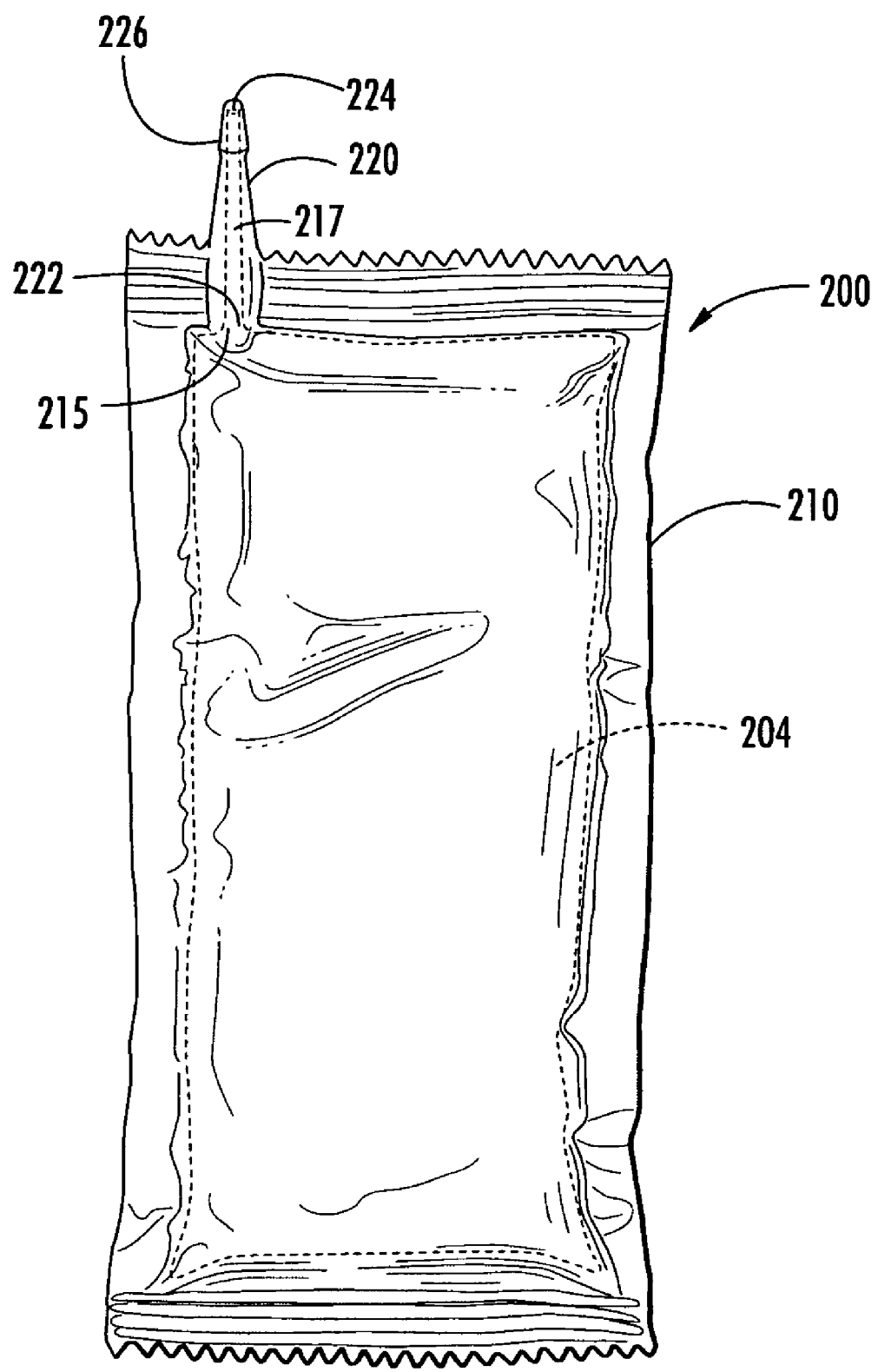

FIG. 4 is a front view of a condiment packet according to one embodiment of the invention in which the condiment packet includes a nozzle for dispensing condiment from the interior of the packet.

Figure 5:
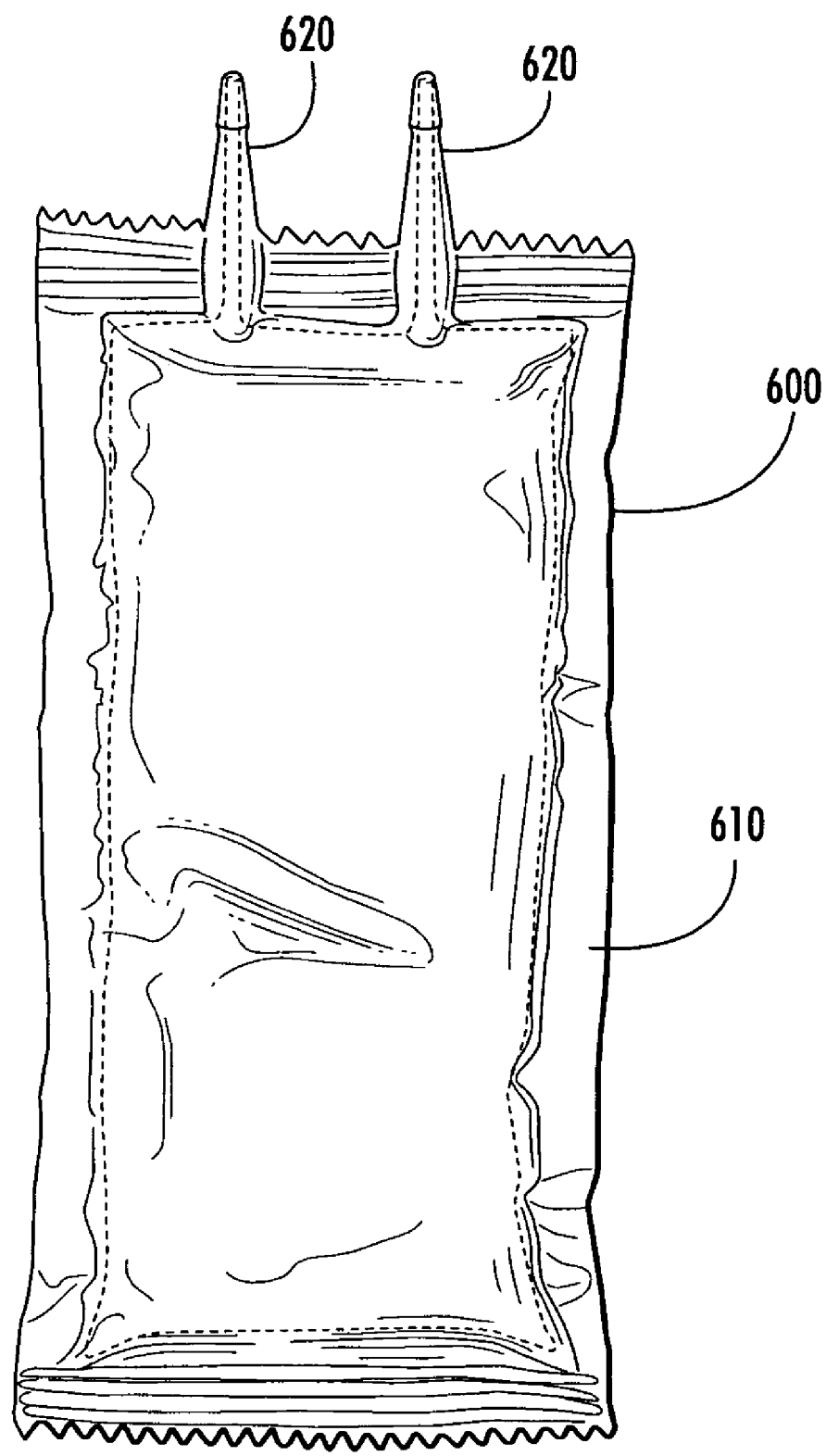

FIG. 5 is a front view of a condiment packet according to another embodiment of the invention, in which the condiment packet includes a plurality of nozzles for dispensing condiment from the interior of the packet.

Figure 6A:
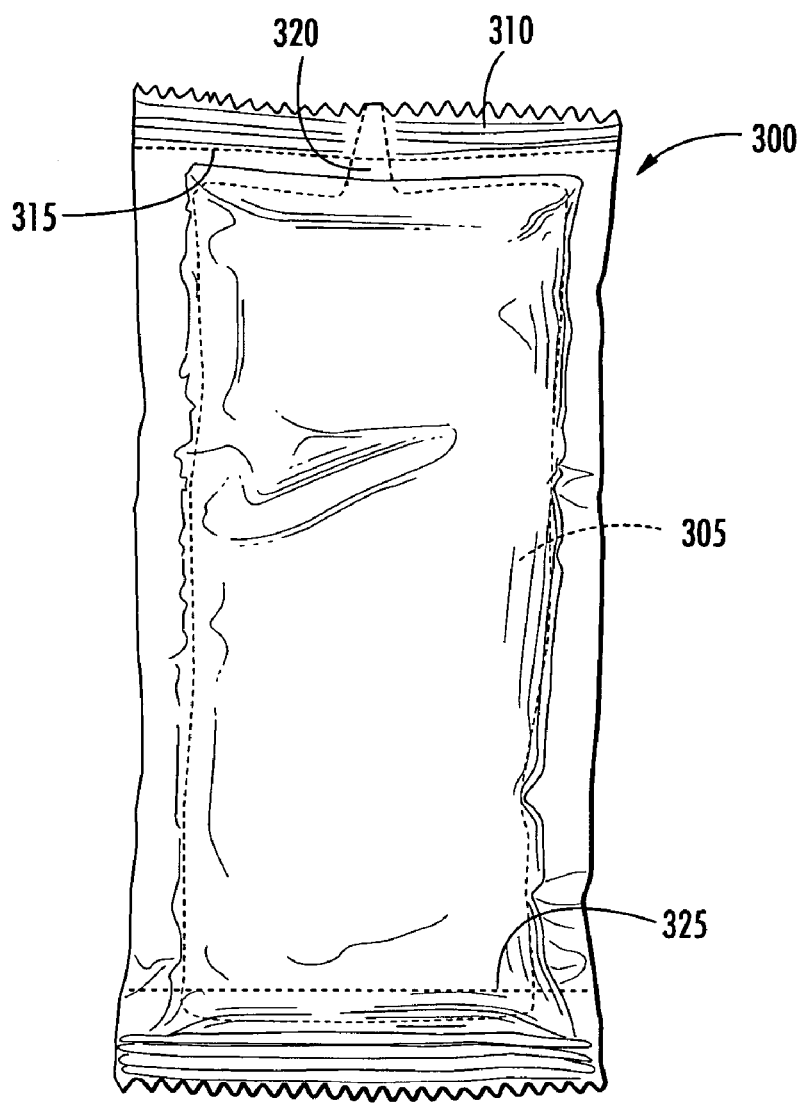

FIG. 6A is a front view of a condiment packet according to a further embodiment of the invention.

Figure 6B:
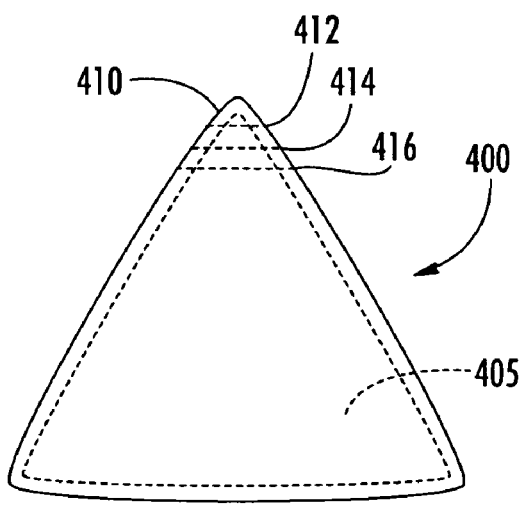

FIG. 6B is a front view of a condiment packet according to another embodiment of the invention.

Figure 7:
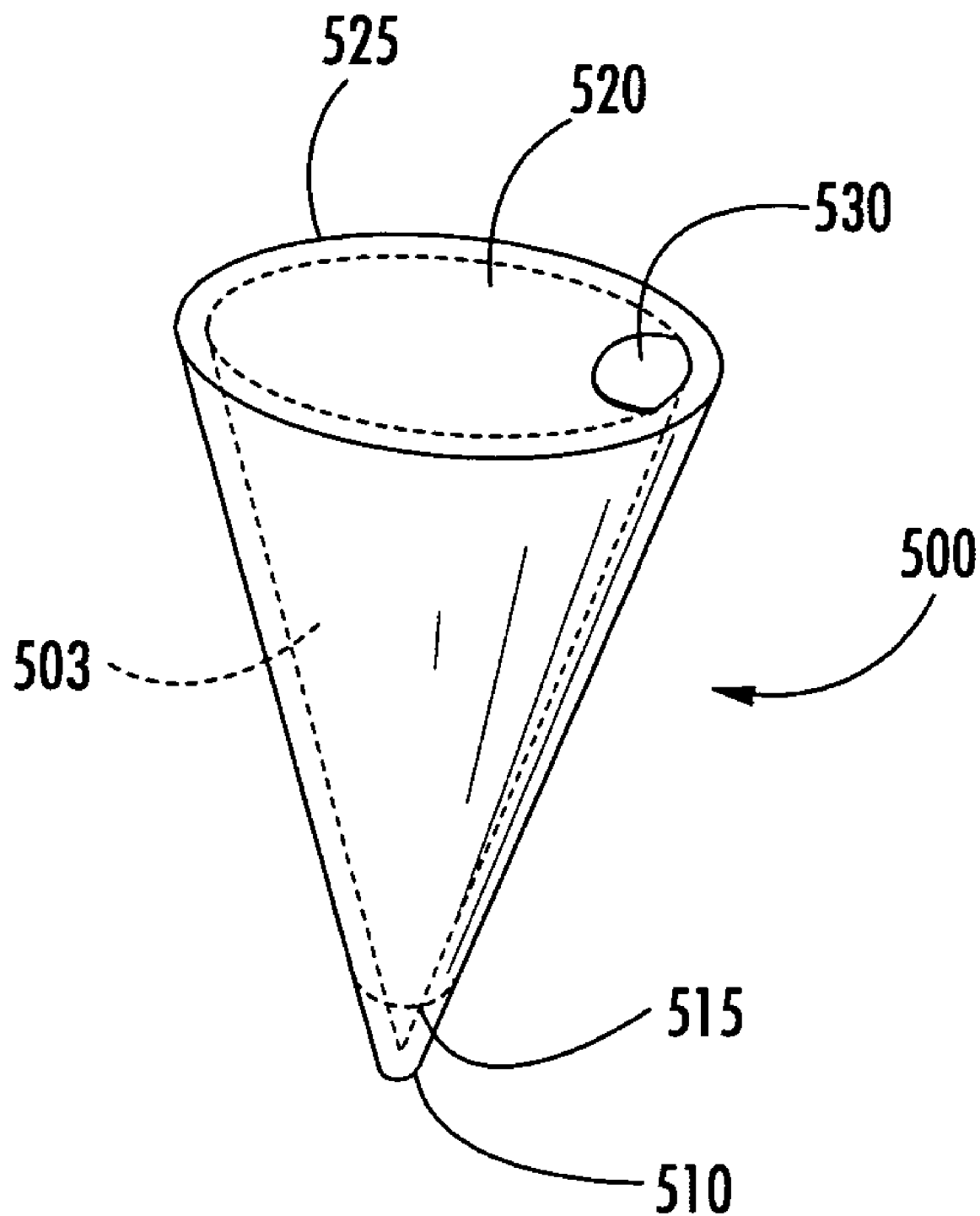

FIG. 7 is a front view of a condiment packet according to yet another embodiment of the invention.

Figure 8:
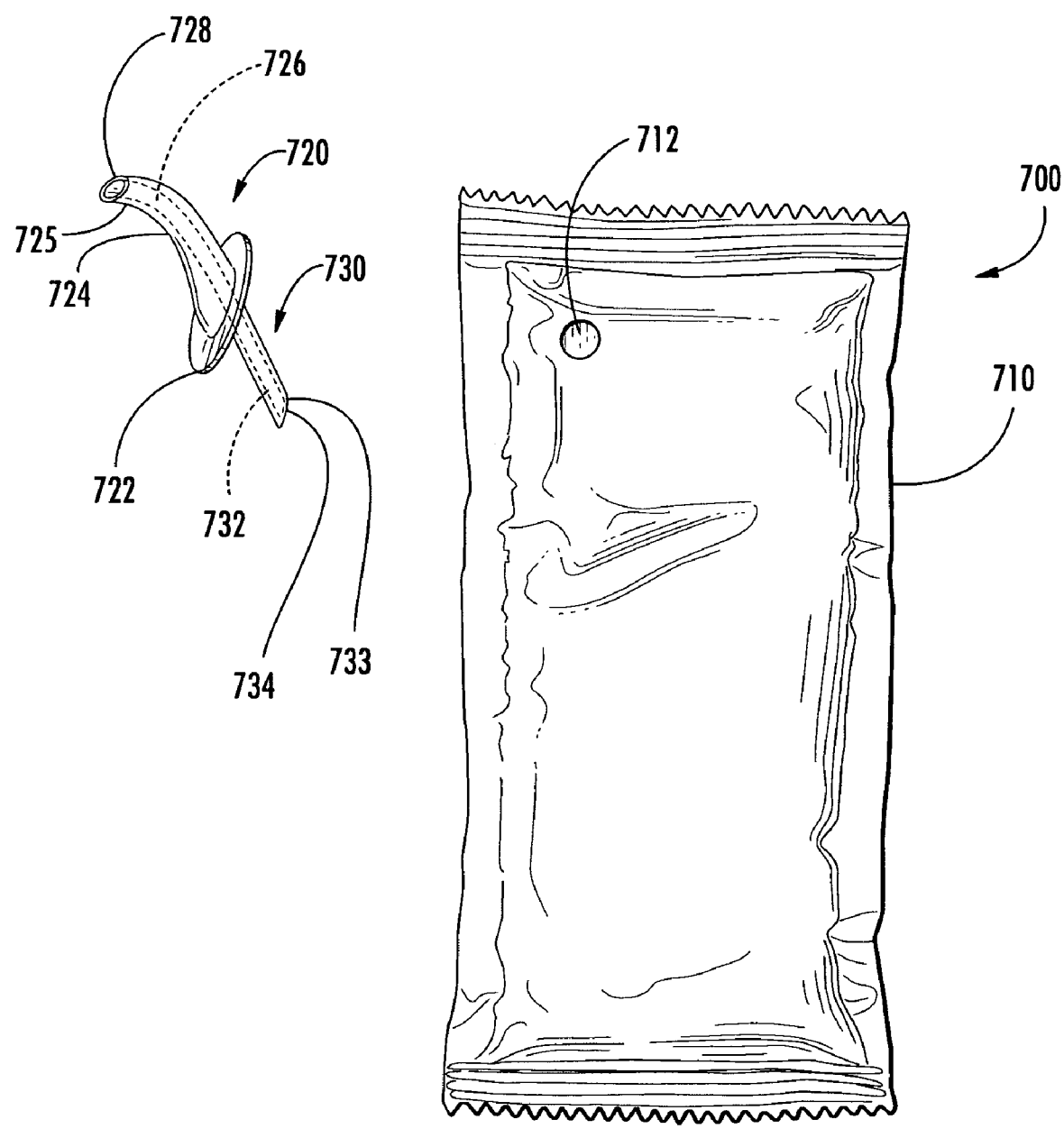

FIG. 8 is a perspective view of a condiment dispenser kit according to one embodiment of the invention.

Figure 9:
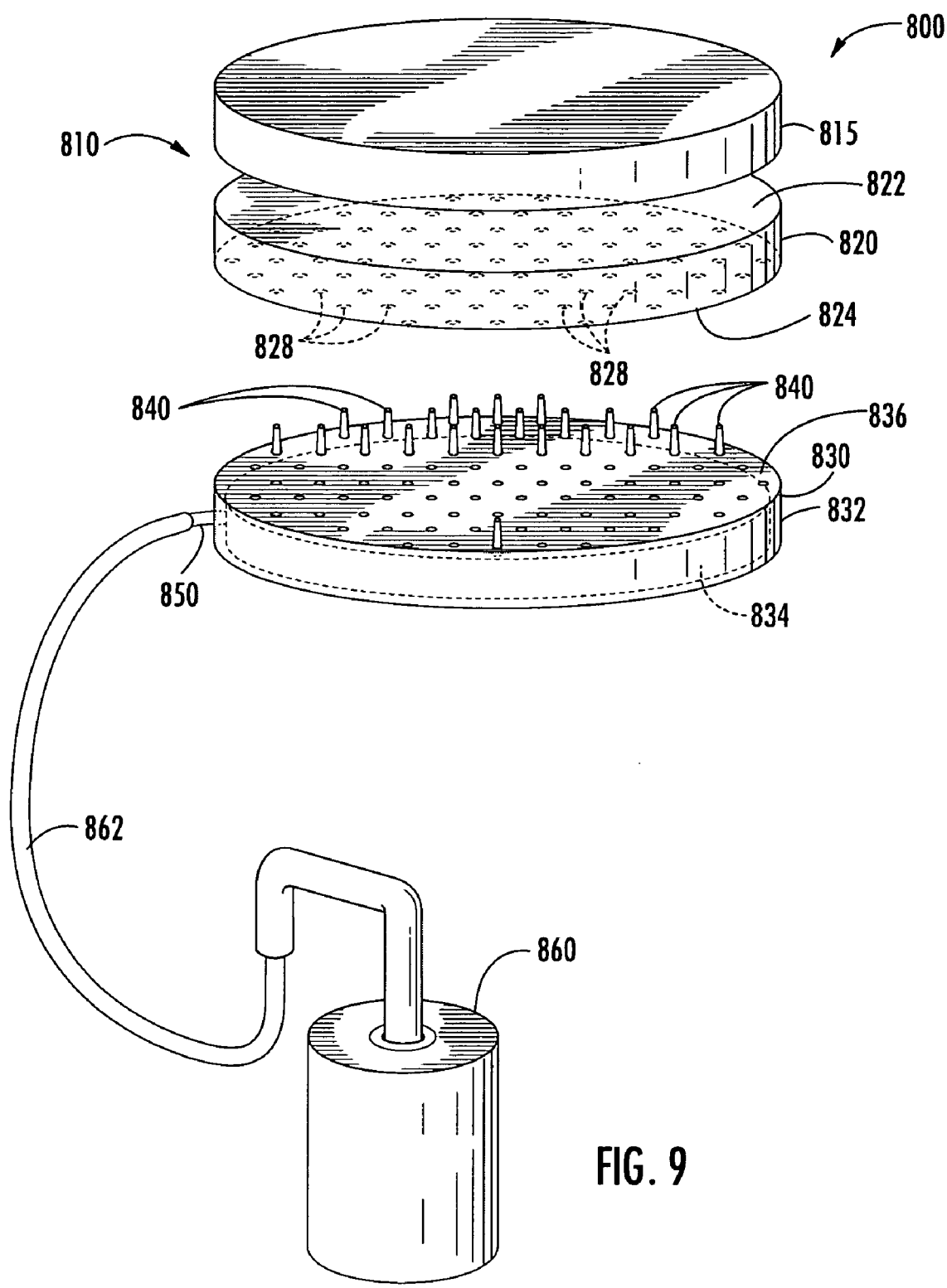

FIG. 9 is perspective view of a condiment injection device according to a particular embodiment of the invention. This condiment injection device is shown with various nozzles removed for purposes of clarity.

FIGS. 10A–10D are perspective views of various nozzles according to various embodiments of the invention.

Figure 11:
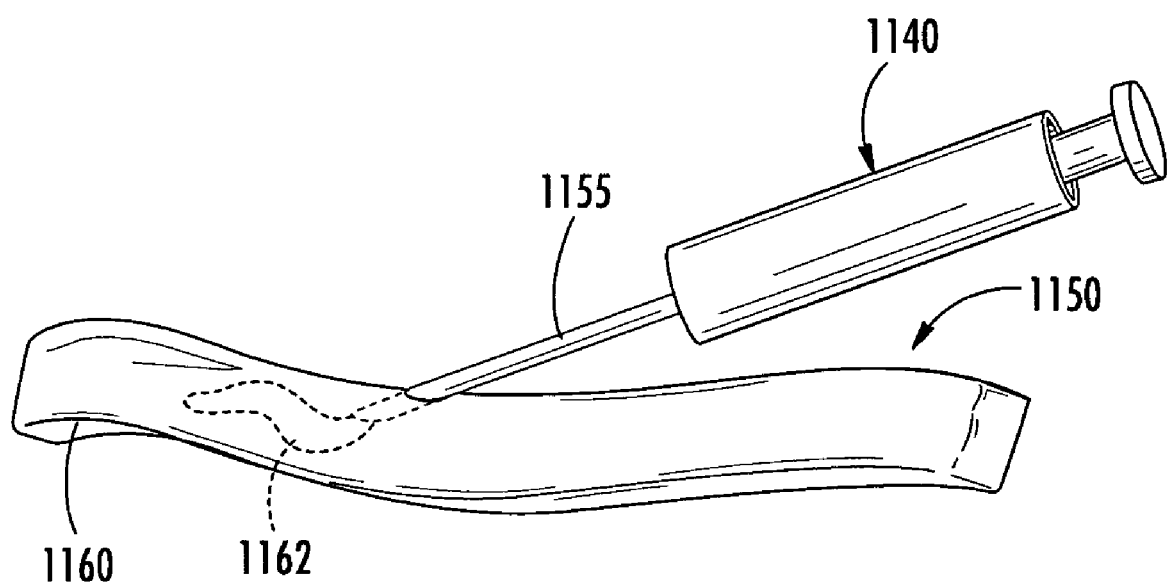

FIG. 11 is a perspective view demonstrating one method of injecting a food item (e.g., a French fry) with a condiment.

Figure 12A:
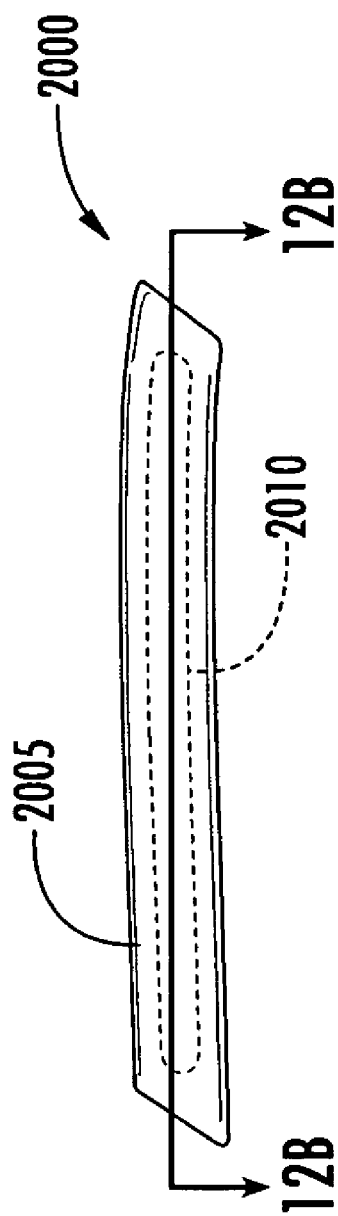

FIG. 12A is a top view of a filled food item (i.e., a filled French fry) according to one embodiment of the invention.

Figure 12B:
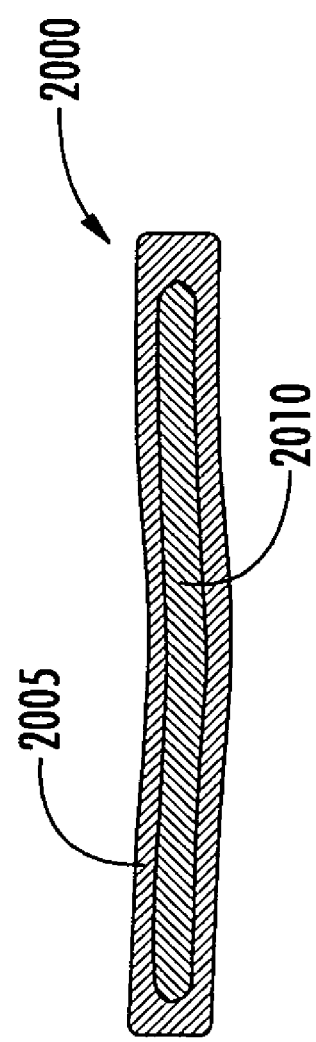
Figure 20A:
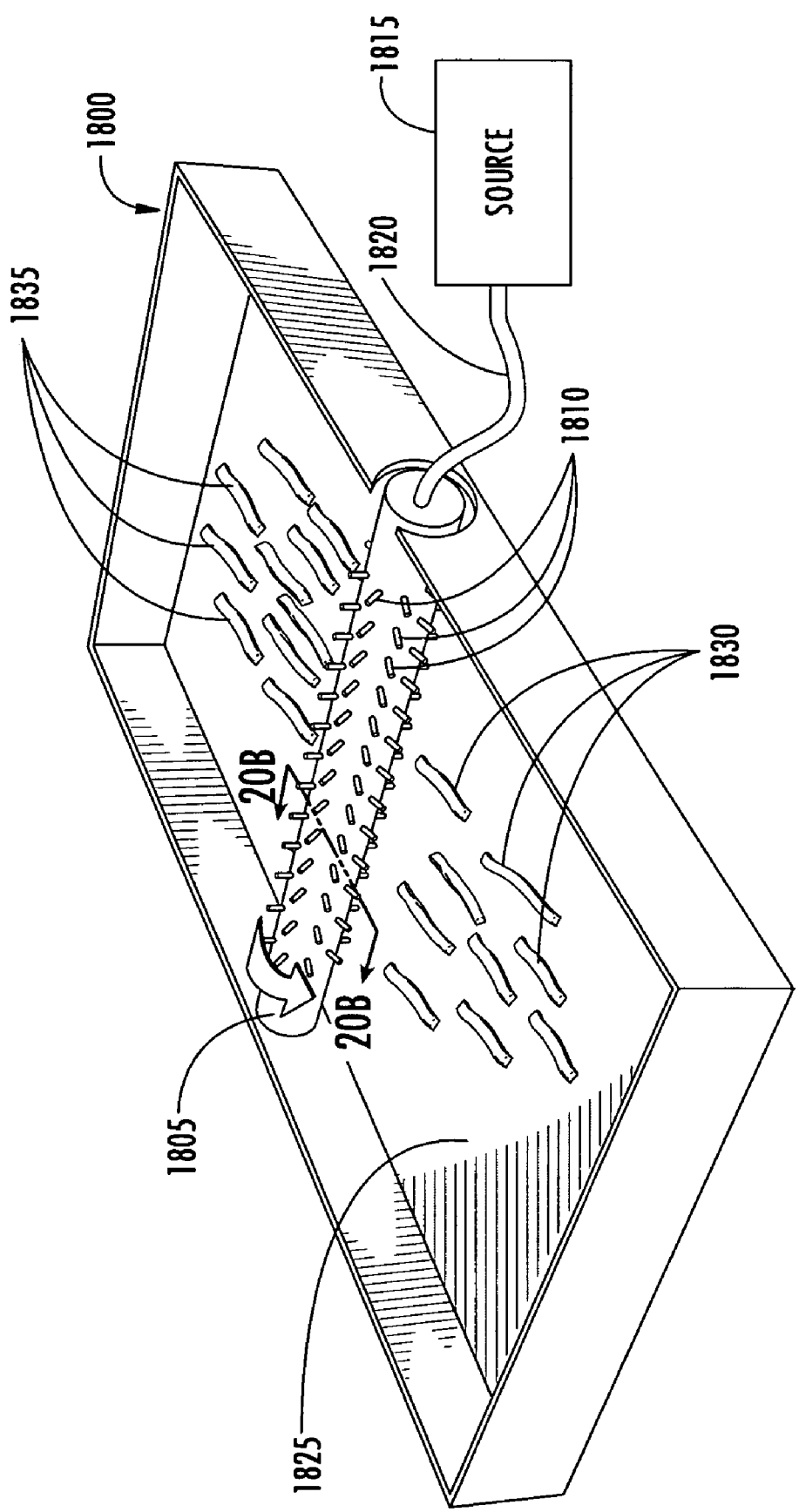

FIG. 12B is a cross-sectional view of the filled food item of FIG. 20A taken along section 12B—12B, which is shown in FIG. 12A.

FIG. 13A is a top view of a filled food item (i.e., a filled French fry) according to another embodiment of the invention.

FIG. 13B is a cross-sectional view of the filled food item of FIG. 13A taken along section 13B—13B, which is shown in FIG. 13A.

Figure 14A:
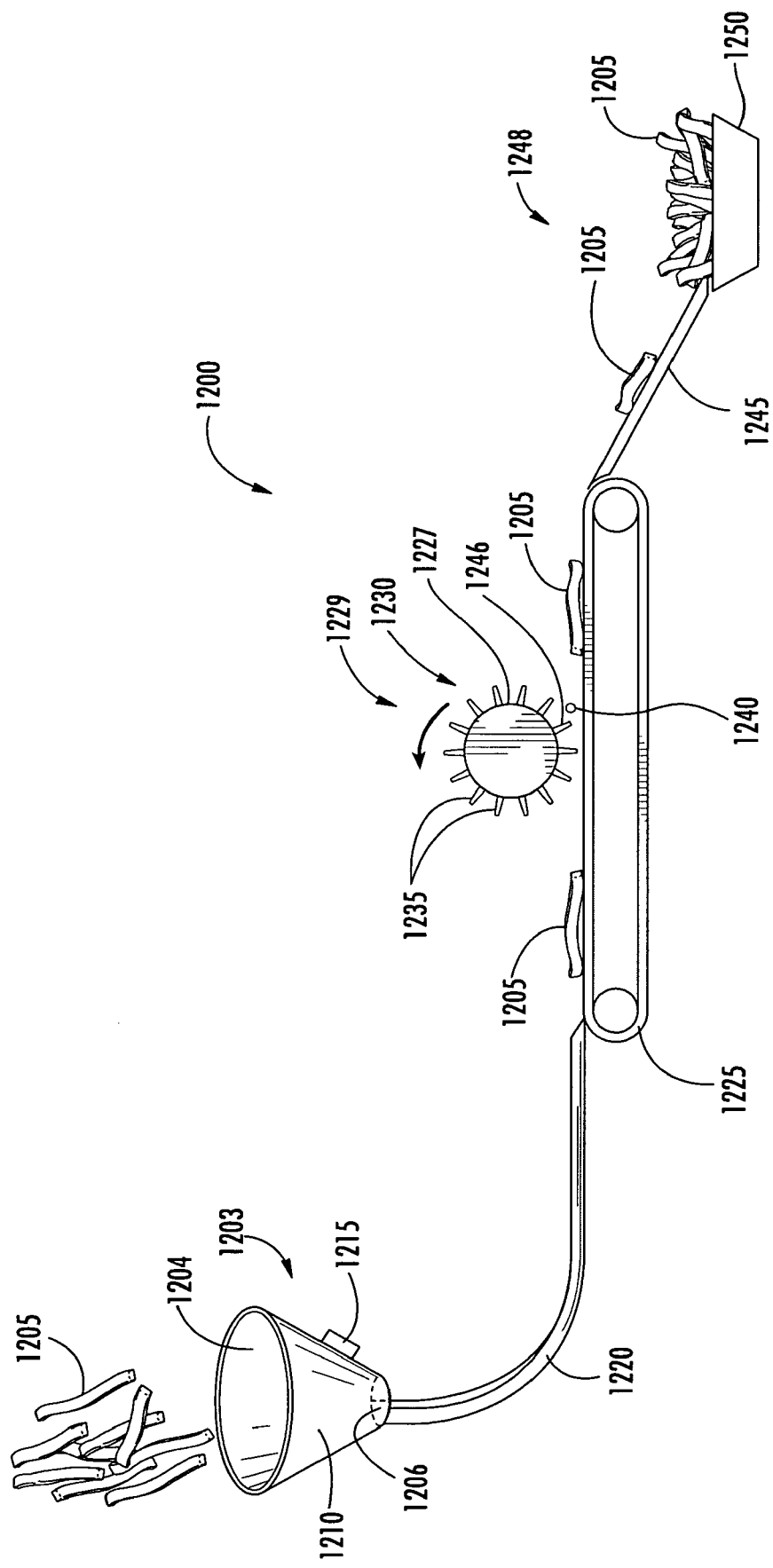

FIG. 14A is a perspective side view of a condiment injection apparatus according to one embodiment of the invention.

Figure 14B:
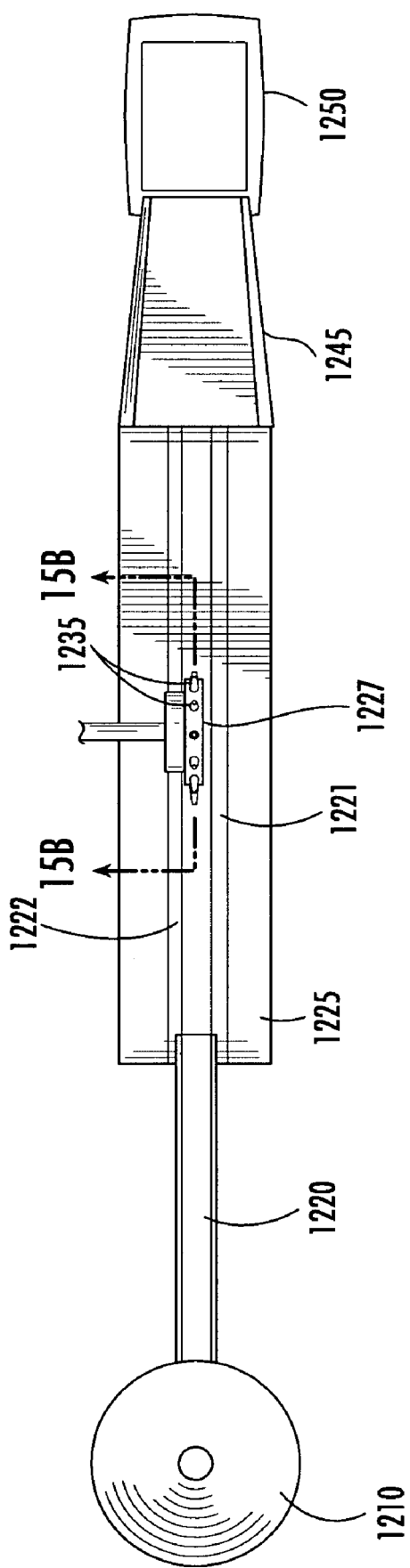

FIG. 14B is a top view of the condiment injection apparatus of FIG. 14A.

Figure 15A:
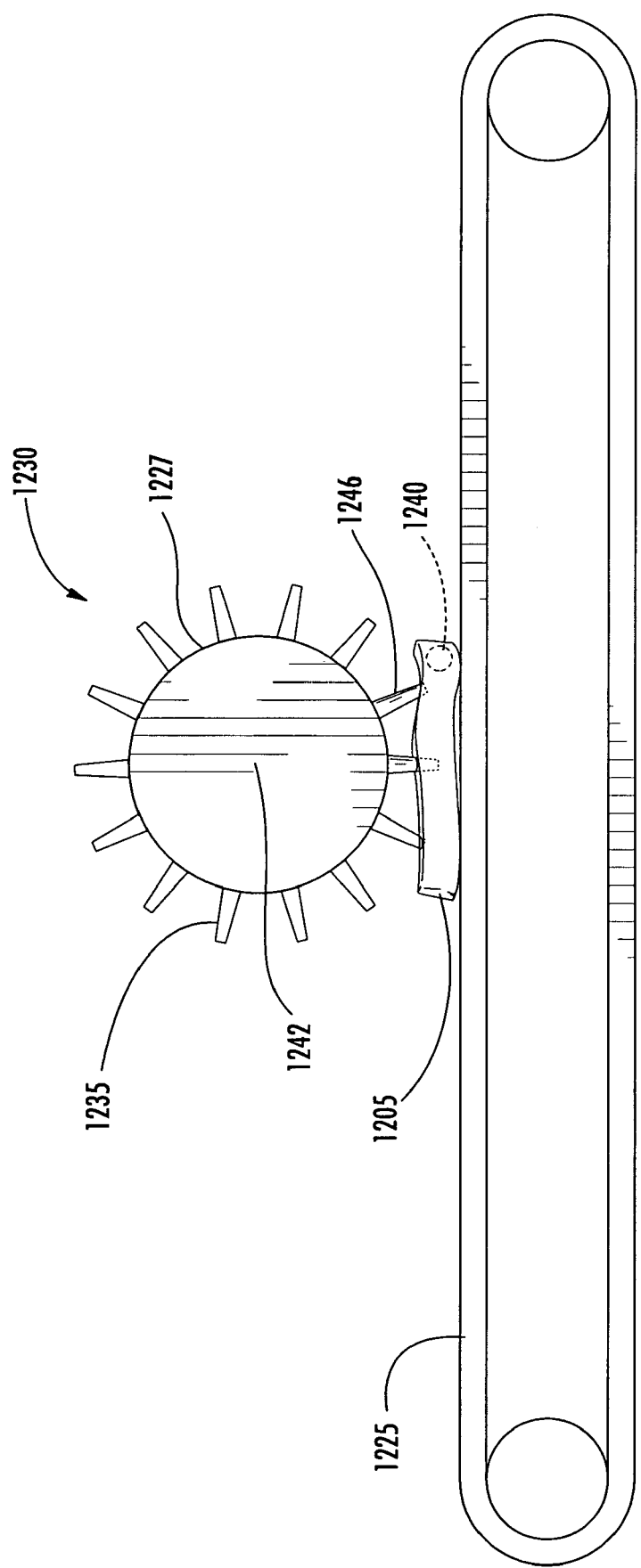

FIG. 15A is a side view of the injection member and injection-portion conveyor of the condiment injection apparatus shown in FIG. 14A.

Figure 15B:
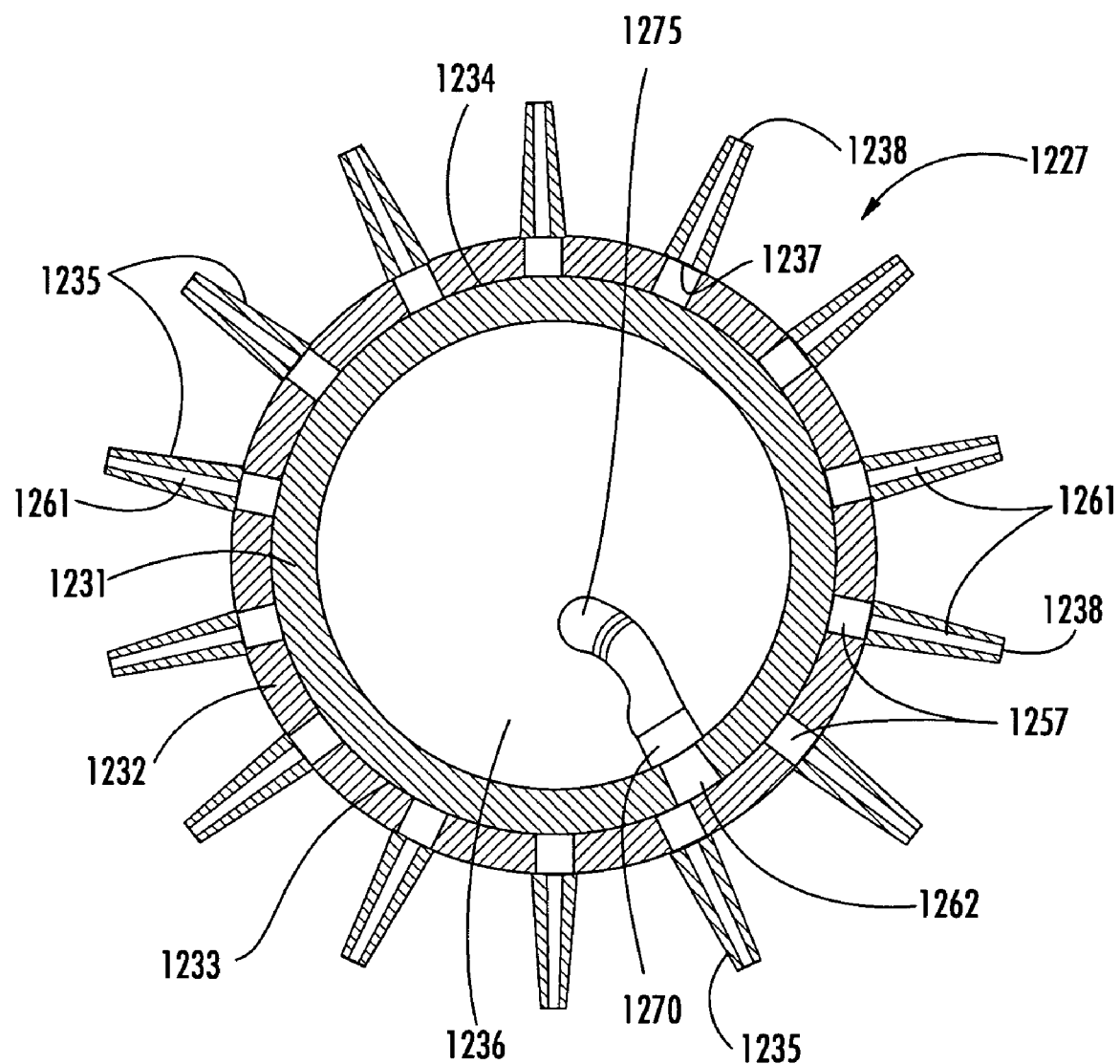

FIG. 15B is a cross-sectional side view of one embodiment of the injection member shown in FIG. 14A.

Figure 16:
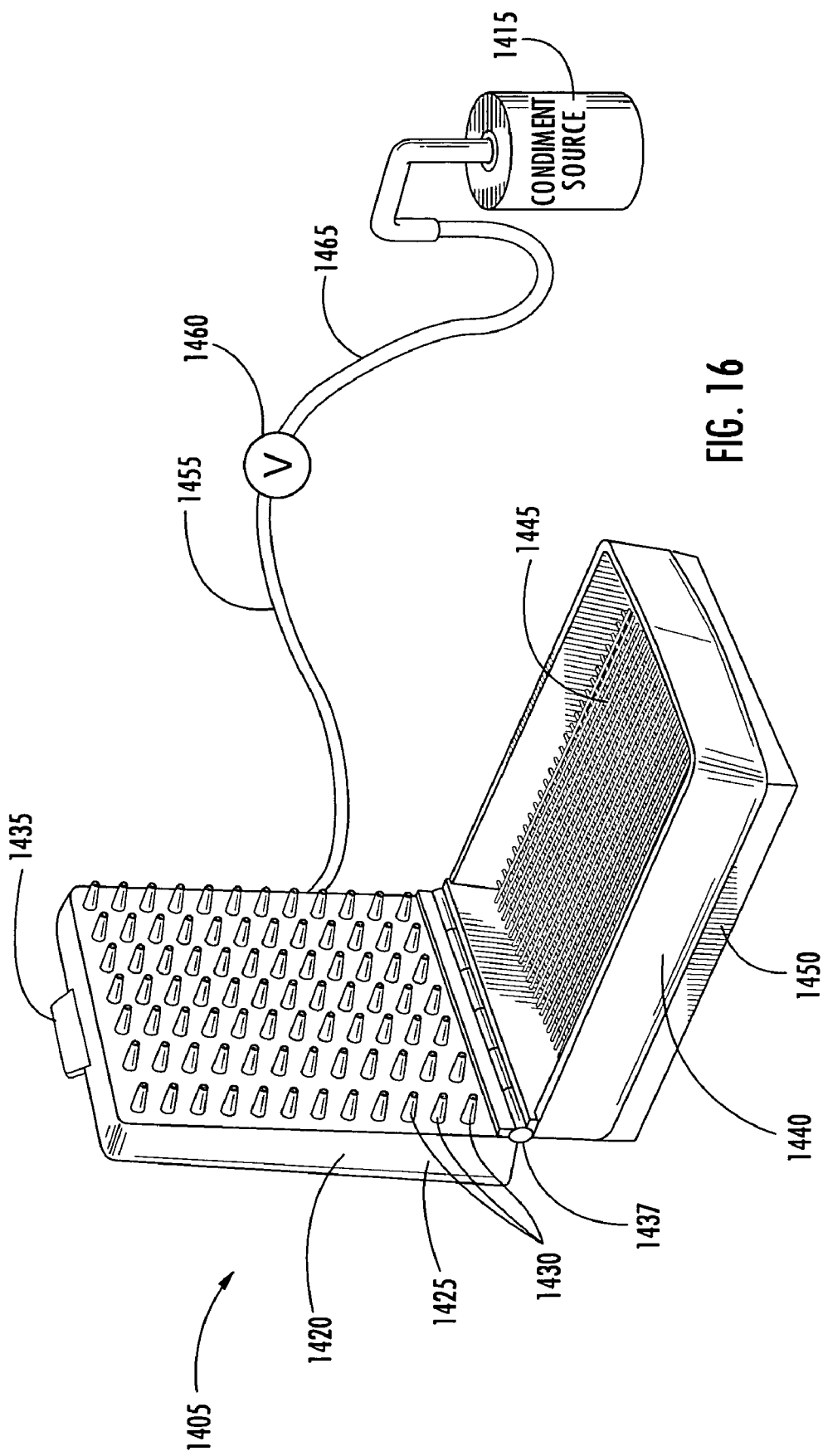

FIG. 16 is a perspective view of a condiment injection apparatus according to another embodiment of the invention.

Figure 17B:
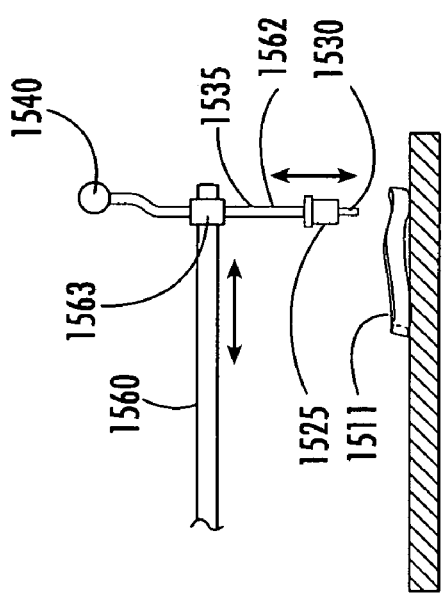
Figure 17A:
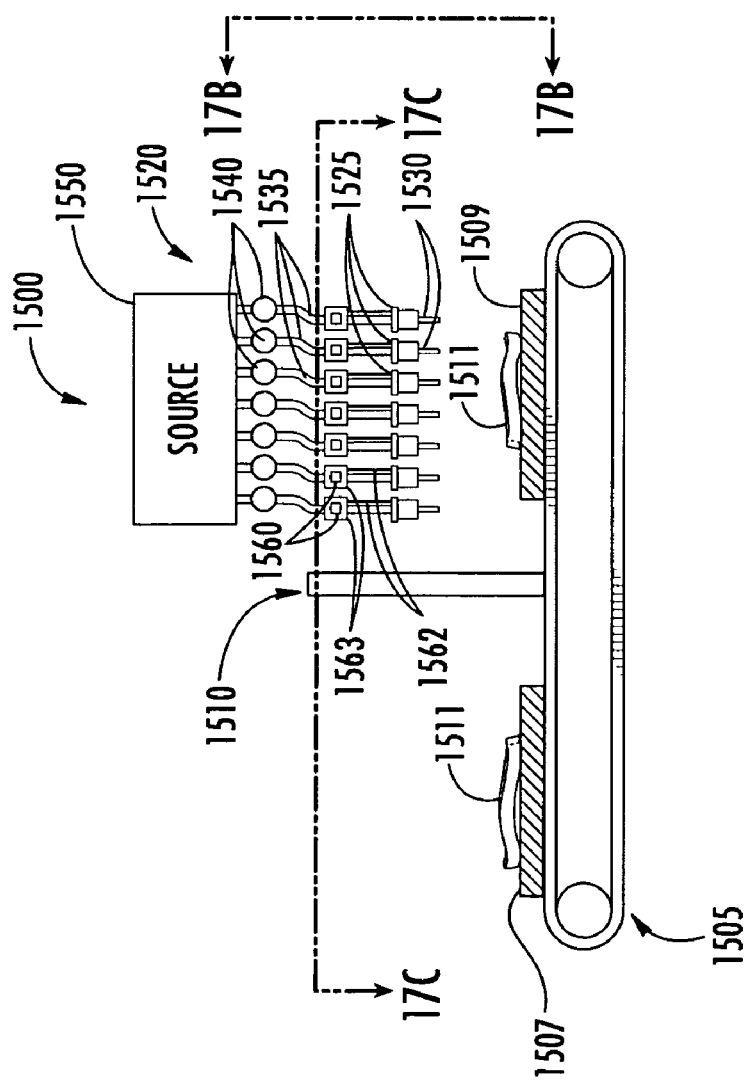

FIG. 17A is a side view of a condiment injection apparatus according to yet another embodiment of the invention.

FIG. 17B is an end view of selected portions of the condiment injection apparatus of FIG. 17A as viewed from the right end of the condiment injection apparatus of FIG. 17A.

Figure 17C:
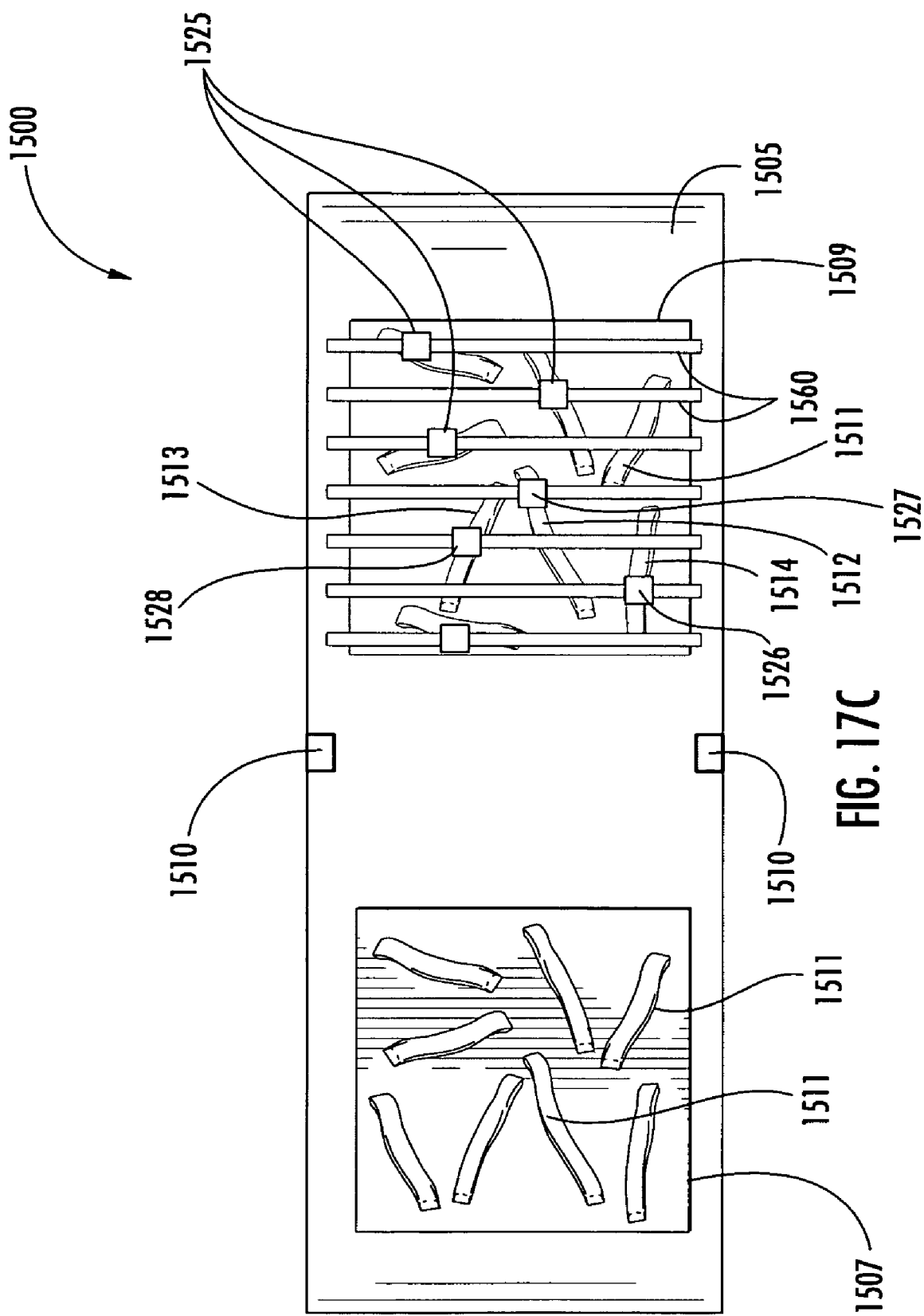

FIG. 17C is a top cross-sectional view of the condiment injection apparatus of FIG; 17A as taken along Section 17C—17C, which is shown in FIG. 17A.

FIG. 18 is a perspective view of a condiment injection apparatus according to another embodiment of the invention.

Figure 19A:
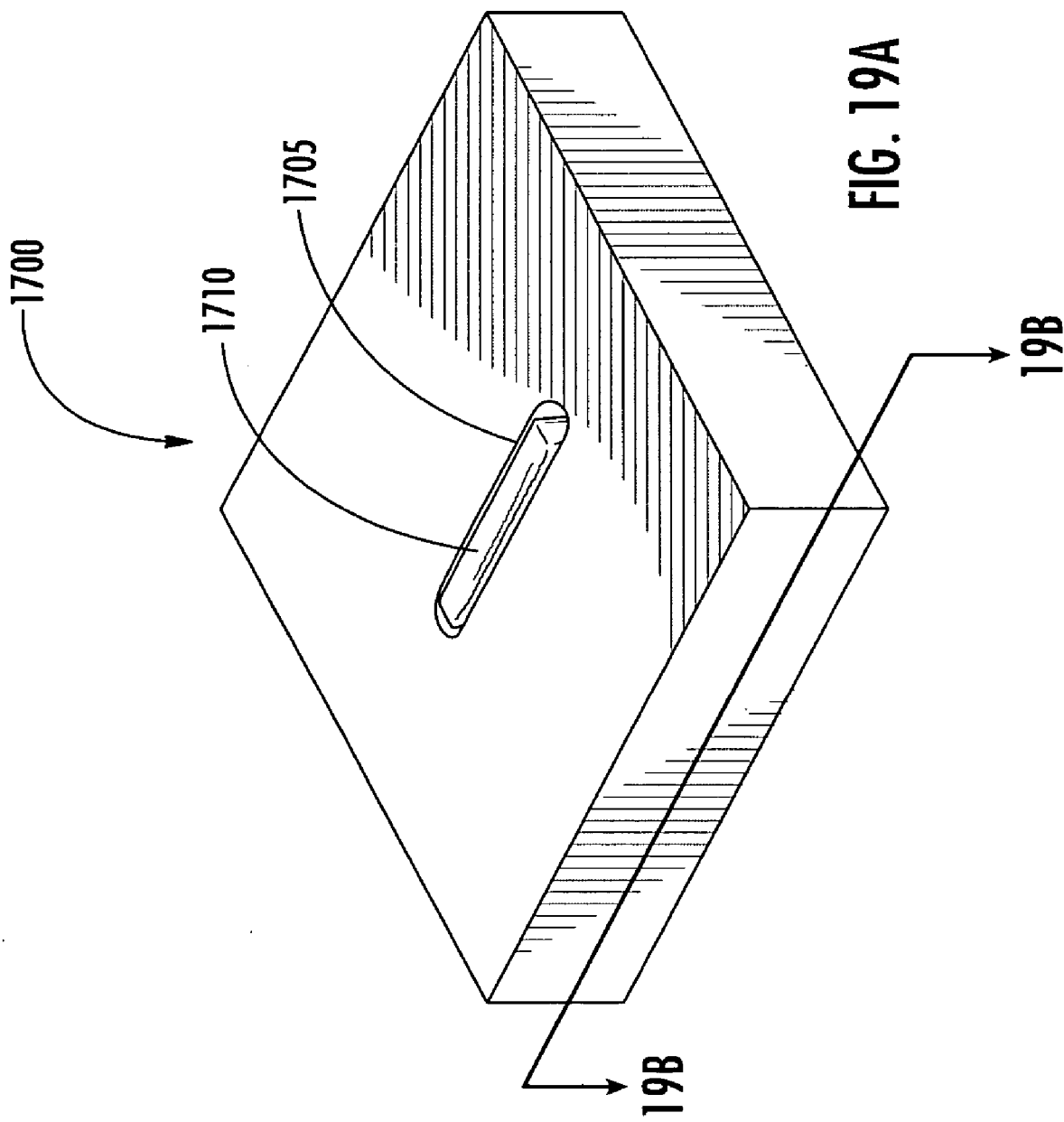

FIG. 19A is a perspective view of a condiment injection apparatus according to a further embodiment of the invention.

Figure 19B:
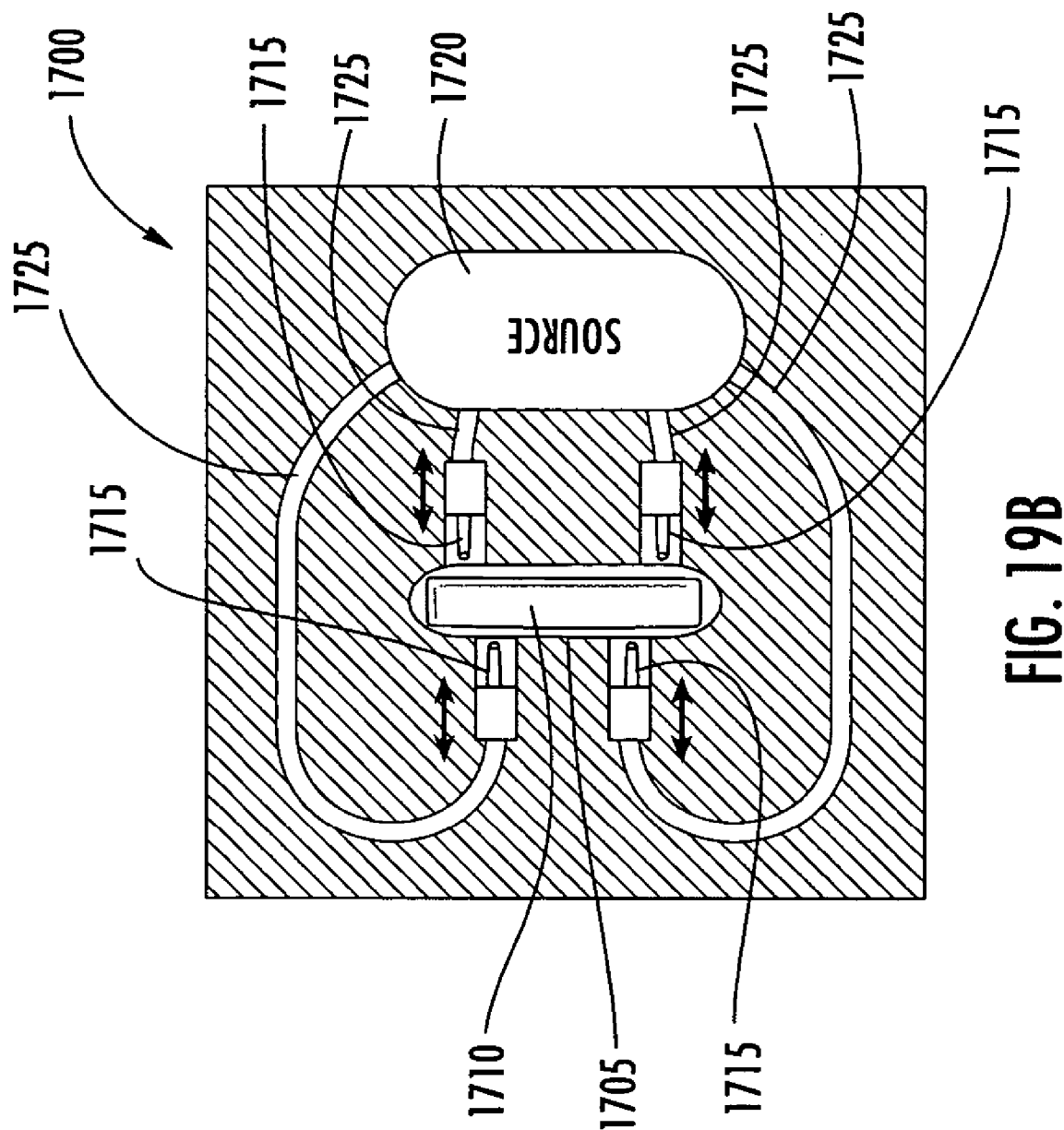

FIG. 19B is a cross sectional top view of the condiment injection apparatus of FIG. 19A taken along section 19B—19B shown in FIG. 19A.

FIG. 20A is a perspective view of a condiment injection apparatus according to yet another embodiment of the invention.

Figure 20B:
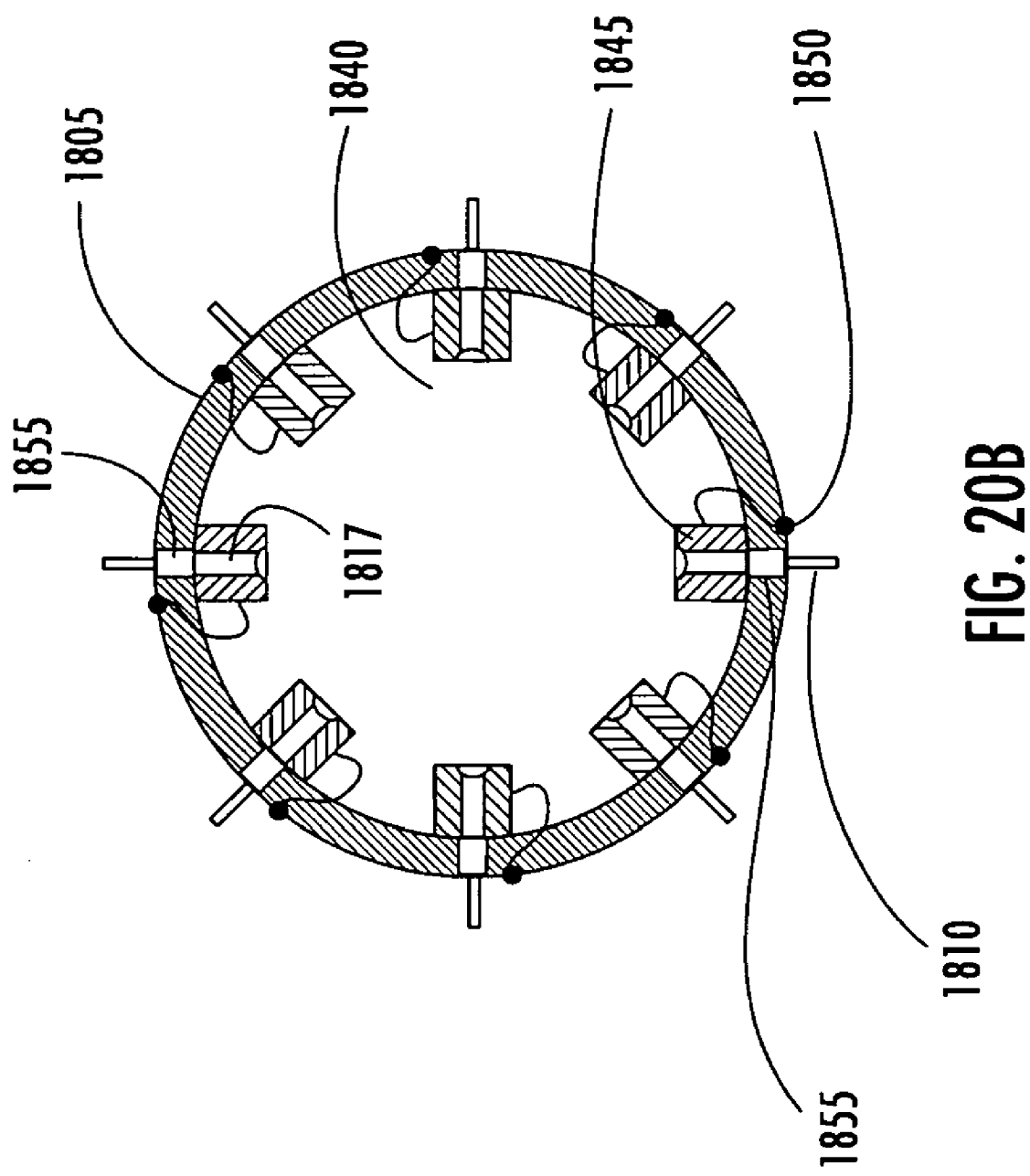

FIG. 20B is a cross sectional side view of the condiment injection apparatus of FIG. 20A taken along section 20B—20B shown in FIG. 20A.

Figure 21B:
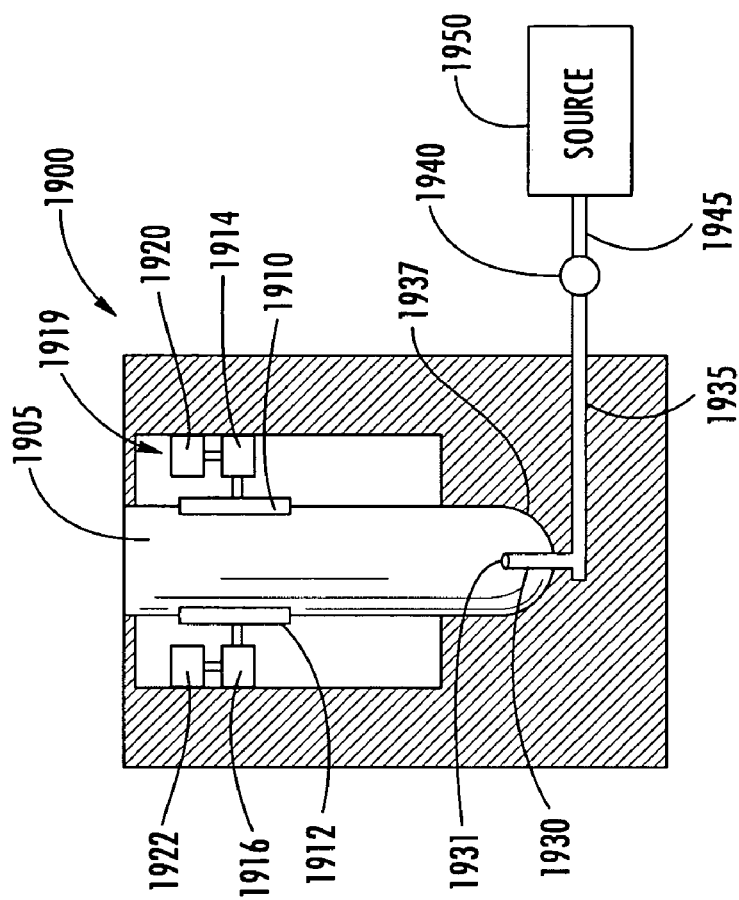
Figure 21A:
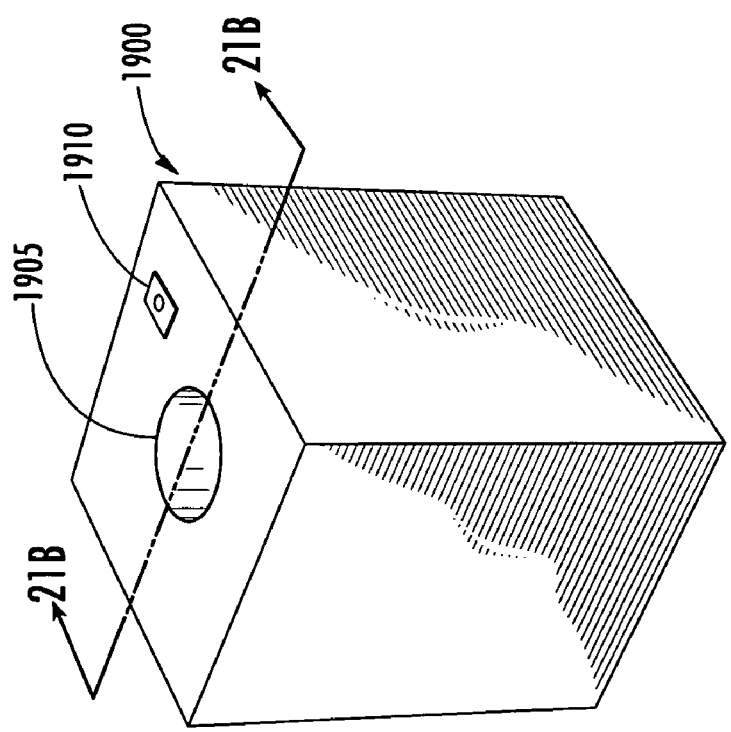

FIG. 21A is a perspective view of a condiment injection apparatus according to a further embodiment of the invention.

FIG. 21B is a cross sectional side view of the condiment injection apparatus of FIG. 21A taken along section 21B—21B shown in FIG. 21A.

Figure 21C:
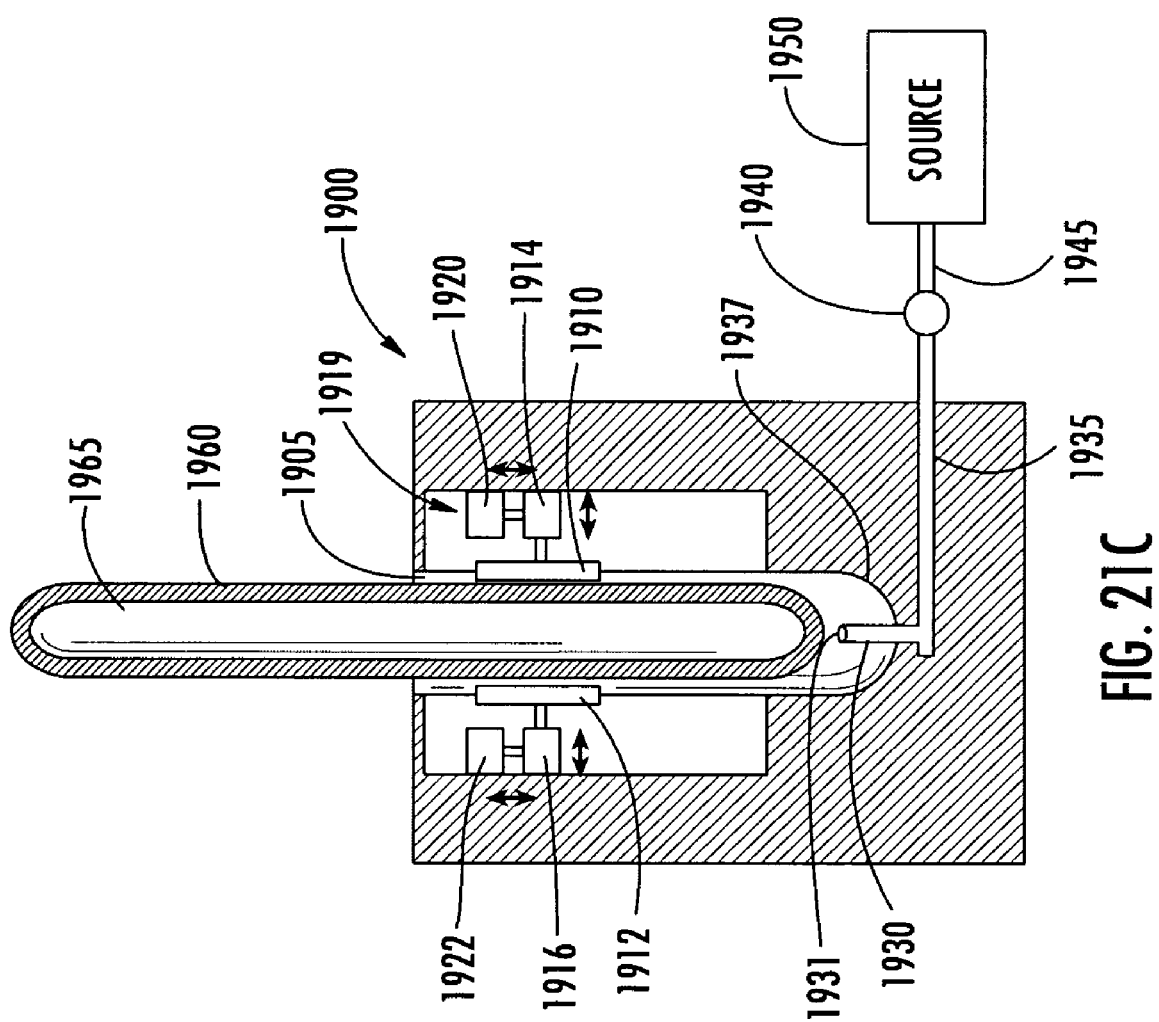

FIG. 21C is also a cross sectional side view of the condiment injection apparatus of FIG. 21A taken along section 21B—21B shown in FIG. 21A. This figure shows a food item that is disposed partially within the condiment injection apparatus' food item receiving portion.

DETAILED DESCRIPTION OF THE INVENTION

The present invention now will be described in detail with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the relevant field. Like numbers refer to like elements throughout.

Definitions

As used in this disclosure, the term "cooking" refers to any method of cooking a food item. Such methods include frying (such as deep frying or any other type of frying), baking, boiling, microwaving, broiling, poaching, steaming, sautéing, and any other method of cooking the food item.

Also, as used in this disclosure, the term "nozzle" refers to a projecting spout that is configured for discharging a fluid.

Syringe/Injection Nozzle Embodiment

A first embodiment of a condiment dispenser according to the current invention is shown in FIG. 1. As may be understood from this figure, this embodiment is structurally much like a standard syringe and hypodermic needle. More particularly, the condiment dispenser 100 comprises a housing 110, a plunger 120, and an injection nozzle 130. The housing 110 is preferably substantially cylindrical and preferably defines an interior passage 112 (e.g., a cylindrical interior passage), an open top end 114, and an outlet opening 116 in the bottom end of the housing 110. The plunger 120 is preferably also substantially cylindrical and is preferably dimensioned so that a leading end 124 of the plunger may be placed into the interior passage 112 of the housing 110 via the housing's open top end 114 so that at least a portion of the plunger 120 may slide within the housing's interior passage 112. In a preferred embodiment of the invention, a seal member (such as an o-ring) 125 is mounted adjacent the leading end 124 of the plunger 120 to provide a seal (which is preferably substantially liquid-tight) between the leading end 124 of the plunger 120 and a portion of the interior of the housing 110.

The injection nozzle 130 (which is preferably, but not necessarily, elongate, and which is preferably pointed at its outlet end) defines an interior chamber 132 that provides a passage from an inlet 135 of the injection nozzle 130 to the nozzle's outlet 136. As shown in FIG. 1, the injection nozzle 130 is disposed adjacent the outlet opening 116 of the housing 110 so that the housing's interior passage 112 is in liquid communication with the interior chamber 132 of the injection nozzle 130 via that housing's outlet opening 116 and the injection nozzle's inlet 135.

To use the condiment dispenser 100, a user first removes the plunger 120 from the housing 110, places a condiment (such as ketchup, mustard, or mayonnaise) into the housing's interior chamber 112, and places the leading end 124 of the plunger 120 back into the housing's interior chamber 112 so that the seal member 125 creates a liquid-tight seal between the plunger 120 and the interior of the housing 110 above the condiment. As shown in FIG. 2, the user then inserts the outlet end of the nozzle 130 through the exterior surface of a food item 140 (preferably a cooked food item, such as a deep fried French Fry) so that the nozzle outlet 136 is within the interior of the food item 140. The user then depresses the plunger 120 (see FIG. 1), which forces the condiment from the housing's interior chamber 112, through the housing's outlet opening 116, into the injection nozzle's interior chamber 132, out the nozzle's outlet 136, and into the interior of the food item 140.

If desired, the user may withdraw the nozzle 130 and re-inject the food item 140 as necessary until the food item 140 contains the desired amount of condiment within its interior. After withdrawing the nozzle 130 from the food item 140 for the final time, the user then consumes the food item 140.

It should be noted that, in one embodiment of the invention, condiment is injected into a food item substantially immediately after the food item is cooked (e.g., within 5, 4, 3, or 2 minutes after the food item is removed from a cooking apparatus, such as a deep fryer), and preferably while the food item is warm (e.g., from being cooked).

The above method and apparatus are especially useful in delivering condiments to the interior of crispy fried foods, such as French fries, French toast sticks, hash browns, and onion rings. This is due to the fact that these food items generally have a crispy, substantially water-tight outer skin that prevents the condiment from leaving the interior of the food items after the condiment has been injected into the food items. In addition, these food items include a soft, compressible interior that moves to accommodate the introduction of condiment into the food item. As a result, it is possible to inject a substantial amount of condiment into the interior of these food items without leaving a significant amount of condiment on the exterior surface of the food items.

One advantage of at least one embodiment of the invention is that it allows users to apply a condiment to a food item and then eat the food item without the risk of touching the condiment or dripping the condiment from the food item. In addition, because, in certain embodiments of the invention, the condiment does not physically mask the salty exterior of a salted food item (such as a French fry), the salted food item tastes better than a similar food item with condiment applied to its exterior surface.

To use the invention, a restaurant, such as a fast food restaurant, may provide customers with one or more of the above-described condiment dispensers 100 (see FIG. 1) that are pre-filled with a condiment (such as ketchup, cheese sauce, or ranch dressing). The customers then use the condiment dispensers 100 to apply condiment to their various food items (e.g., using the techniques described herein). The restaurant may also provide recycle bins in which customers may deposit used condiment dispensers 100 for washing and reuse, or recycling.

Rather than pre-filling the condiment dispensers 100, the restaurant may provide central, pump-type dispensers of condiment and also provide users with empty condiment dispensers 100 (such as the condiment dispenser described above). The users may then fill and re-fill the condiment dispensers 100 from the pump-type condiment dispensers as necessary.

Alternatively, or in addition, the restaurant may provide the user with one or more condiment dispensers 100 according to the invention described above, and one or more standard or modified condiment packets that customers may use to fill or re-fill the condiment dispensers 100. To fill a condiment dispenser 100 from a condiment packet, the user first depresses the condiment dispenser's plunger 120 until the leading end 124 of the plunger 120 is adjacent the housing's outlet opening 116. The user then inserts the tip of the nozzle 130 into a condiment packet 150 as shown in FIG. 3 until the nozzle outlet 136 is in liquid communication with condiment inside the condiment packet 150. The user then slowly withdraws the plunger 120 so that the leading end 124 of the plunger 120 moves away from the housing's outlet opening 116. This causes the condiment dispenser 100 to draw condiment from the interior of the condiment packet 150 and into the condiment dispenser's interior passage 112.

In one embodiment of the invention, the condiment package 150 is provided with an opening 152 that is preferably slightly smaller than the perimeter of an end portion of the nozzle 130. In a particular embodiment of the invention, both the opening 152 and a the perimeter of the nozzle's end portion are substantially circular. Also, in a preferred embodiment of the invention, the opening 152 is covered and closed by a sealed opening cover 153 (such as plastic or foil) that is configured to open in response to a user forcing the end of a condiment dispenser nozzle 130 against the opening cover.

In this embodiment of the invention, to fill the condiment dispenser, the user first depresses the condiment dispenser's plunger 120 until the leading end 124 of the plunger 120 is adjacent the housing's outlet opening 116. The user then presses the tip of the nozzle 130 against the condiment packet's opening cover 153 until the opening cover gives way. The user then presses the tip of the nozzle 130 into the interior of the condiment packet 150, as shown generally in FIG. 3, until an exterior portion of the nozzle 130 forms a seal with the border of the condiment packet's opening 152 and/or the condiment packet's opening cover 153. The user then slowly withdraws the plunger 120 so that the leading end 124 of the plunger 120 moves away from the housing's outlet opening 116. This causes the condiment dispenser 100 to draw condiment from the interior of the condiment packet 150 into the condiment dispenser's interior passage 112. In one embodiment of the invention, the fact that the exterior of the nozzle 130 forms a seal with the packet 150 allows the dispenser 100 to use a vacuum effect to draw condiment out of the condiment package quickly and efficiently.

In addition, in a particular embodiment of the invention, the above process allows users to draw condiment out of a condiment packet 150 substantially without smearing condiment onto the exterior of the condiment packet 150. This is advantageous because it results in less wasted condiment, and reduces the risk of condiment from the packet undesirably coming into contact with clothing, carpet or other items.

In a preferred embodiment of the invention, the condiment dispenser is formed in a decorative shape, such as the shape of a ray gun or a dinosaur, to make using the condiment dispenser more enjoyable for children. In one embodiment of the invention, the condiment dispenser is formed in the shape of a ray gun and configured so that, when the user pulls the ray gun's "trigger", condiment squirts from the "barrel" of the "ray gun." In another embodiment of the invention, the condiment dispenser is formed in the shape of a dinosaur (or other character or animal), and an outlet opening for the condiment is positioned within or adjacent the "mouth" of the dinosaur (or other character or animal). Thus, when the user dispenses condiment from the condiment dispenser, it amusingly appears as if the dinosaur (or other character or animal) is projecting the condiment from its mouth.

Condiment Packet with Integrated Nozzle

A second embodiment of the condiment dispenser 200 is shown in FIG. 4. As may be understood from this figure, this embodiment of the invention comprises a housing 210, such as a flexible packet or bag, and an injection nozzle 220 (which is preferably, but not necessarily, elongate, and preferably pointed). The housing 210 defines an interior portion 204 and an outlet opening 215. The injection nozzle 220 preferably defines an interior passage 217 that provides a passage from an open bottom end 222 of the injection nozzle 220 to a nozzle outlet 224 defined by the nozzle 220. As shown in FIG. 4, the injection nozzle 220 is disposed adjacent the outlet opening 215 of the housing 210 so that the interior portion 204 of the housing 210 is in liquid communication with the injection nozzle's interior passage 217 via the housing's outlet opening 215 and the injection nozzle's open bottom end 222.

In one embodiment of the invention, the housing 210 is substantially the same size, form and shape (e.g., substantially rectangular, substantially thin, and substantially flat) as a standard individual condiment package, such the individual ketchup, mustard, and mayonnaise packages commonly provided by fast food restaurants. The housing 210 is preferably constructed of flexible plastic or foil. However, the housing 210 may be in other sizes and shapes (e.g., 30% larger than a standard condiment package), and/or may be made of any other materials (rigid or flexible) known in the art. In one embodiment of the invention, the housing 210 is in the form of the body of a standard squeeze bottle.

In a preferred embodiment of the invention, the housing 210 is a substantially rectangular, thin, flat, pocket of flexible material such as plastic. Also, in a preferred embodiment of the invention, the housing is configured for only one use, and is pre-filled with a condiment and sealed to maintain the condiment in the housing before the condiment is dispensed.

In a preferred embodiment of the invention, the nozzle 220 is substantially rigid. For example, the nozzle 220 may be made of a rigid material, such as hard plastic or metal (such as stainless steel). This makes it easier to pierce the exterior surface of a food item with the nozzle 220, if desired. However, in other embodiments of the invention, the nozzle 220 may be flexible. For example, the nozzle 220 may be made of a flexible material such as thin, flexible plastic or foil. Flexible nozzles may be especially useful in situations in which it is anticipated that the user will normally dispense condiment onto the exterior surface of food items, rather than into the interior of the food items.

Nozzles according to various embodiments of the invention are discussed in greater detail below. It should be understood that any of the nozzles described herein may be used in conjunction with any of the various embodiments of the invention. Similarly, while some embodiments of the invention are described as comprising an "injection nozzle" that is configured for injecting condiment into the interior of a food item, it should be understood that, in many embodiments of the invention, one or more of these injection nozzles may be replaced with a nozzle that is not configured to inject condiment into the interior of a food item. Such nozzles may be used, for example, to inject condiment onto the exterior of a food item (e.g., substantially automatically).

In one embodiment of the invention, the nozzle 220 and the housing 210 are made of the same material, which is preferably flexible plastic.

In a preferred embodiment of the invention shown in FIG. 4, the condiment dispenser 200 includes a flow prevention device, such as a cap 226 (e.g., a twist off cap), an adhesive tab, a lid, or other barrier for preventing condiment from flowing from the condiment dispenser 200 until the user wishes to dispense the condiment. For example, as shown in FIG. 4, the dispenser 200 may include a cap 226 that is disposed adjacent the nozzle outlet 224, and that is configured for obstructing the nozzle outlet 224 until a user removes the cap 226 from the nozzle 220. In a preferred embodiment of the invention, the flow prevention device is tamper proof or tamper evident for safety purposes.

As may be understood from FIG. 4, in a preferred embodiment of the invention, the housing's outlet opening 215 and the injection nozzle 220, may be disposed adjacent a corner of the housing 210. However, the housing's outlet opening 215 and the injection nozzle 220 may be located at any convenient location on the housing 210. For example, in one embodiment of the invention, the housing's outlet opening and the injection nozzle, are disposed adjacent a top edge of the housing, and are substantially centered in the middle of the top edge.

In another embodiment of the invention, the housing is in the form of a tube (preferably an elongate tube) and the housing's outlet opening and the injection nozzle are disposed at one end of the tube. This allows the user to efficiently dispense condiment from the tube by rolling up the bottom end of the tube.

In an alternative embodiment of the invention, the dispenser comprises a plurality of injection nozzles. For example, in an embodiment of the invention shown in FIG. 5, the dispenser 600 comprises two injection nozzles 620. This serves to facilitate quick transfer of condiment from the dispenser 600 to a food item. In various other embodiments of the invention, the dispenser may include three, four, five or more injection nozzles 620.

Users may use the condiment dispenser 200, 600 to inject condiment into a food item by inserting the outlet end of the nozzle 220, 620 into an interior portion of the food item (preferably by piercing an exterior surface of the food item with the nozzle's outlet end, which is preferably pointed), and then squeezing the housing 210, 610. This squeezing action forces condiment from the interior of the housing 210, 610, through the nozzle 220, 620, and into the interior of the food item.

Alternatively, the user may use the condiment dispenser 200, 600 to apply condiment to the exterior surface of a food item by positioning the outlet end of the nozzle 220, 620 adjacent the exterior portion of a food item and then squeezing the housing 210, 610. This forces condiment from the interior of the housing 210, 610, out the nozzle 220, 620, and onto the exterior surface of the food item.

Discussion of FIGS. 6A, 6B, and 7

FIG. 6A depicts a condiment packet 300 according to one embodiment of the invention. As may be understood from this figure, this condiment packet 300 comprises a flexible housing 310 that defines an interior cavity 305 that is configured for storing condiment. The housing 310 also defines an interior nozzle passage 320 (which may, for example, be substantially conical in shape) that is adjacent, and in liquid communication with, the interior cavity 305. In one embodiment of the invention, the base portion of the interior nozzle passage 320 is adjacent the interior cavity 305, and the interior nozzle passage 320 gradually narrows as it extends away from the interior cavity 305. In one embodiment of the invention, this serves to focus the flow of condiment as condiment passes out of the interior nozzle passage 320.

As may be understood from FIG. 6A, in one embodiment of the invention, the condiment packet 300 includes a first tear line 315 that extends across a portion of the interior nozzle passage 320 to allow a user to create an opening in the interior nozzle passage 320 by tearing the condiment packet 300 along the first tear line 315.

The condiment packet 300 may also include a second tear line 325 that extends between lateral sides of the condiment packet 300. This tear line is preferably configured to allow a user to form an opening in the condiment packet 300 that has about the same width as the condiment packet's interior portion 305. The user may then dip food items, such as French fries, into the condiment packet 300 through this relatively wide opening.

FIG. 6B depicts a condiment packet 400 that comprises a substantially triangular housing 410 defining a substantially triangular interior cavity 405 that is configured for storing condiment. In one embodiment of the invention, the substantially triangular interior cavity 405 serves to facilitate the focused dispensing of condiment from the condiment packet 400.

In one embodiment of the invention, the condiment packet 400 comprises a plurality of tear lines 412, 414, 416 across one corner of the substantially triangular interior cavity 405 (e.g., as shown in FIG. 6B). The various tear lines 412, 414, 416 are preferably spaced different distances apart from an apex of the substantially triangular cavity 405. In one embodiment of the invention, this allows users to create an outlet opening having one of a plurality of pre-determined opening widths by simply tearing the packet 400 along a selected one of the plurality of tear lines 412, 414, 416. In an alternative embodiment of the invention, either the housing 400 or the interior cavity 405 (or both) may be in a form other than a substantially triangular form (e.g., a substantially rectangular or circular form).

FIG. 7 depicts a condiment package 500 according to yet another embodiment of the invention. As may be understood from this figure, the condiment package 500 includes a substantially conical housing portion 525 that defines a substantially conical interior portion 503 that is configured for storing condiment. One embodiment of the invention comprises a removable lid member 520 (e.g., a pull-off lid) and an optional pull-back tab 530 for use in removing the lid member 520.

The removable lid member 520 is preferably positioned adjacent the base portion of the condiment package's substantially conical interior portion 503 and configured to selectively restrict access to condiment disposed within the housing portion 525. In one embodiment of the invention, the condiment package 500 is configured so that a user may remove the lid member 520 to provide access to the substantially conical interior portion 503 (and preferably substantially the entire open base portion of the substantially conical interior portion 503). This allows users to dip food items, such as French fries, into condiment disposed within the substantially conical interior portion 503.

The condiment package 500 may also include one or more tear lines 515 across the tip of the substantially conical interior portion 503. At least one of the tear lines 515 is preferably configured to allow a user to create an opening in the condiment package 500 adjacent the tip of the substantially conical interior portion 503 (e.g., by tearing the condiment package 500 along a particular tear line 515). This preferably allows users to dispense condiment in a substantially focused manner from the tip of the condiment package 500.

As will be understood by one skilled in the art, the various tear lines discussed above are preferably structurally weakened in a manner known in the art to allow a user to tear an item along the tear line.

Condiment Dispenser Kit with Condiment Tap

A further embodiment of the invention comprises a multi-part condiment dispenser kit. One embodiment of this condiment dispenser kit 700, which is shown in FIG. 8, comprises: (1) a housing 710 that defines an interior portion (e.g., a flexible, sealed packet or bag); and (2) a condiment tap 720. The housing is preferably pre-filled with a condiment such as ketchup, mustard, or mayonnaise.

In one embodiment of the invention, the condiment tap 720 comprises: (1) a base portion 722; (2) a preferably elongate nozzle 724 extending from the base portion 722 that defines an interior passage 726 extending from a front surface of the base portion 722 to an outlet 728 at the outlet end 725 of the nozzle 724; and (3) a tap member 730 that defines an interior passage 732 extending from a rear surface of the base portion 722 to an inlet 734 at the inlet end 733 of the tap member 730. The condiment tap 720 is preferably configured so that the interior passage 732 of the tap member 730 is in liquid communication with the interior passage 726 of the nozzle 724. This allows liquid to flow from the tap member's inlet 734, through the condiment tap 720, and out the nozzle's outlet 728. In an alternative embodiment of the invention, the nozzle tap includes no base portion 722.

In one embodiment of the invention, the inlet end 733 of the tap member 730 is pointed to allow a user to puncture a housing 710 (e.g., a condiment packet, such as a standard ketchup packet) with the tap member 730. Also, in a preferred embodiment of the invention, the base member 722 is somewhat wider than the tap member 730. This helps to hold the condiment tap 720 in a stable position, and to seal a hole in a condiment packet made by the tap member 730, after the tap member 730 is inserted into the interior of the housing 710. In a preferred embodiment of the invention, the outlet end 725 of the nozzle 724 is configured to puncture the exterior surface of a food item. More particularly, in one embodiment of the invention, the outlet end 725 of the nozzle 724 is pointed.

In a preferred embodiment of the invention, the housing 710 is substantially the same size, form, and shape (e.g., substantially rectangular, substantially flat, and substantially thin) as a standard individual condiment packet, such the individual ketchup and mayonnaise packages provided at fast food restaurants. The housing 710 is preferably constructed of flexible plastic. However, the housing may be configured in other sizes and shapes (e.g., 30% larger than a standard condiment packet), or be made of any other materials known in the art.

To use the condiment dispenser kit 700, a user presses the inlet end 733 of the tap member 730 against the exterior surface of the housing 710 until the tap member 730 penetrates the exterior surface of the housing 710. The user then continues pushing the condiment tap 720 toward the housing 710 until: (1) the tap member 730 is disposed within the interior of the housing 710; and (2) the condiment tap's base member 722 engages the exterior of the housing 710. Once this is done, condiment that has been pre-loaded into the interior of the housing 710 is free to flow into the tap member's inlet 734, through the tap member's interior passage 732, through the nozzle's interior passage 726, and out the nozzle's outlet 728.

Once the nozzle tap has been properly inserted into the housing 710, a user may use the combined apparatus to inject condiment into a food item by inserting the outlet end 725 of the nozzle 724 into an interior portion of the food item (preferably by piercing an exterior surface of the food item with the nozzle's outlet end 725), and then squeezing the housing 710. This squeezing action forces condiment from the interior of the housing 710, through the condiment tap 720, and into the interior of the food item.

Alternatively, the user may use the combined apparatus to apply condiment to the exterior surface of a food item by positioning the outlet end 725 of the nozzle 724 adjacent the exterior portion of a food item and squeezing the housing 710. This forces condiment from the interior of the housing 710, out the nozzle 724, and onto the exterior surface of the food item.

In a preferred embodiment of the invention, the housing 710 includes a sealed opening 712 that is adapted to open in response to a user pressing the tap member 730 against the sealed opening. This sealed opening is also preferably configured to form a water-tight seal with the tap member 730, or other portions of the condiment tap 720 when the tap member 730 is pressed through the sealed opening 712. This opening functions in much the same way as the opening 152 (and opening seal 153) discussed above in regard to FIG. 3.

Condiment Injection Device with Detachable Container

A condiment injection device according to another embodiment of the present invention is shown in FIG. 9. As discussed below, this condiment injection device 800 comprises a plurality of injection nozzles, and may be used to simultaneously inject condiment into a plurality of food items.

As may be understood from FIG. 9, in one embodiment of the invention, the condiment injection device 800 comprises a food item housing 810 that comprises a top housing portion 815 and a bottom housing portion 820. In one embodiment of the invention, the top housing portion 815 is in the form of a short hollow sphere with an open bottom portion (not shown). In this embodiment of the invention, the bottom housing portion 820 is in the form of a short hollow sphere with an open top portion 822. The bottom surface of the bottom housing portion 824 preferably includes a plurality of holes 828, each of which is dimensioned to receive an injection nozzle 840.

The top housing portion 815 and the bottom housing portion 820 are preferably configured to fit together to form an integrated, substantially cylindrical, container (the food item housing 810) having a plurality of holes 828 in its bottom surface. The container preferably defines a substantially cylindrical interior portion that has a height that is approximately equal to the width or height of a food item into which the condiment injection device 800 is to be used to inject condiment. For example, in one embodiment of the invention, the height of the interior portion of the food item housing 810 is about the height of the average width or height of a particular variety of French fry, onion ring, or hash brown.

The condiment injection device 800 also preferably comprises a nozzle assembly 830 that preferably comprises: (1) a base member 832 that defines an interior portion 834; (2) a plurality of injection nozzles 840 that extend upwardly from a top surface 836 of the base member 832 as shown in FIG. 9. In one embodiment of the invention, the injection nozzles 840 are essentially structurally the same as one or more of the injection nozzles 130, 220, 620, 720 described above, or any other injection nozzle described herein. However, these injection nozzles 840 may, in certain embodiments, be shorter and sharper than the injection nozzles 130, 220, 620, 730 described above.

In one embodiment of the invention, each injection nozzle 840 is dimensioned and positioned to fit (preferably tightly) into a corresponding hole 828 defined by the bottom surface of the bottom housing portion 820 when the bottom housing portion 820 is pressed onto the nozzle assembly 830 as discussed below.

As may be understood from FIG. 9, the nozzle assembly's base member 832 and injection nozzles 840 are preferably configured to define a plurality of passages, each of which extends from the interior portion 834 of the base member 832, through an injection nozzle 840, through that injection nozzle's outlet (which is preferably immediately adjacent the outer end of the injection nozzle 840). As a result, the interior portion 834 of the base member 832 is in liquid communication with the outlets of the various injection nozzles 840.

The base member 832 further defines an inlet 850 that is in liquid communication with the interior portion 834 of the base member 832. The interior portion 834 of the base member 832 is preferably sealed so that condiment may only flow in or out of the interior portion 834 of the base member 832 through the inlet 850, or the outlets of the various injection nozzles 840.

The apparatus preferably also includes a condiment source 860, such as a pump-style condiment dispenser that is in liquid communication with the interior portion 834 of the base member 832. In the embodiment of the invention shown in FIG. 9, the condiment source 860 is a pump-style condiment dispenser that is attached to the inlet 850 via a length of rubber tubing 862. As may be understood by one skilled in the art, any other appropriate condiment source may be used in place of the condiment source described above. For example, a condiment reservoir with an electric pump, or a manually operated squeeze bottle may be used as the condiment source 860.

To use the condiment injection device 800, a user opens the food item housing 810, and inserts one or more food items (such as individual French fries) into the interior of the food item housing 810 (which may, for example, be defined by the inner surfaces of the top and bottom housing portions 815, 820). The user then closes the food item housing 810 by securing the top housing portion 815 to the bottom housing portion 820. When the food item housing 810 is closed, the food items are preferably held in place by frictional contact with the interior surfaces of the top housing portion 815 and the bottom housing portion 820.

The user then aligns the injection nozzles 840 with the various holes 828 in the bottom of the food item housing 810, and pushes the food item housing 810 onto the injection nozzles 840 so that the injection nozzles 840 protrude through the holes 828 in the bottom of the food item housing 810, and into the food items within the food item housing 810. (In a preferred embodiment of the invention, the injection nozzles 840 and the holes 828 are dimensioned so that each injection nozzle forms a water-tight seal with a mating hole 828 when the injection nozzles 840 are properly fit into the corresponding holes 828 in the bottom of the food item housing 810.)

The user then causes condiment to flow from the condiment source 860 and into the interior portion 834 of the base member 830. For example, in the embodiment of the invention shown in FIG. 9, this is done by pumping condiment from the interior of the pump-style condiment dispenser 860 (the structure of which is well-known in the art), through the rubber tubing 862, and into the base member's inlet 850. The condiment then flows into the base member's interior portion 834, through the various injection nozzles 840, and into the interior of the food items in the food item housing 810. Once a sufficient amount of condiment has been delivered to the food items, the user removes the food item housing 810 and removes the food items for consumption.

As will be understood by one skilled in the art, the condiment injection device 800 may be configured for use directly by consumers. For example, the condiment injection device 800 may be configured for use in the lobby of a fast food restaurant. Alternatively, the condiment injection device 800 may be configured for use by restaurant employees and for use, for example, in a food preparation area (e.g., a kitchen) of a restaurant. The condiment injection device 800 may also be configured to add condiment to food items in either small groupings (for example, individual servings) or medium or large groupings (for example, an entire basket of French fries).

In a preferred embodiment of the invention, the food item housing 810 is made of a single-use material, such as cardboard, which may be used as an insulated container for the food items. In one embodiment of the invention, the food item housing 810 is attractively decorated so that the food items may be served directly to the customer within the food item housing 810.

In one embodiment of the invention, each of the condiment injection device's injection nozzles 840 is preferably configured to only dispense a condiment when the injection nozzle 840 is disposed within the interior of a food item. This prevents condiment from being dispensed from the injection nozzle 840 onto the exterior of the food items or onto an interior surface of the food item housing 810. This is advantageous because it helps to assure that substantially all of the condiment is injected into the interior of the food items within the food item housing 810. This serves to minimize waste of the condiment, and minimizes the consumer's contact with the condiment while consuming the food items (which eliminates much of the potential mess associated with consuming the food items).

Figure 10A:
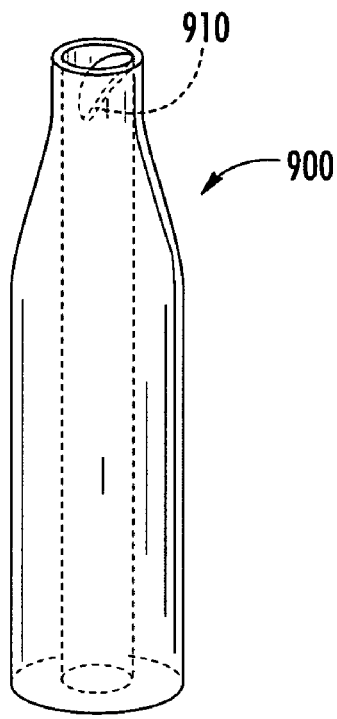

This functional aspect of the injection nozzles 840 may be accomplished in many different ways. For example, as shown in FIG. 10A, each nozzle 900 may be provided with a hinged trap door 910 at its outer end portion that is forced open when the nozzle 900 is forced into a food item such as a French fry, onion ring, or hash brown. Thus, condiment will only flow through, and out of, the injection nozzle 900 after the injection has been opened by forcing the nozzle 900 into the interior of a food item. Any injection nozzles 900 that have not been inserted into a food item will preferably remain closed.

Figure 10B:
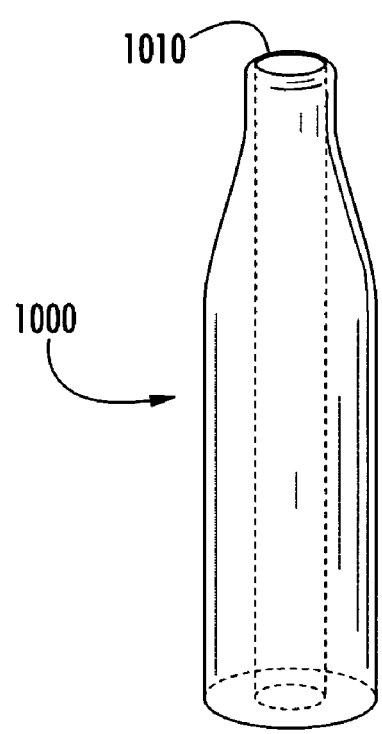
Figure 10C:
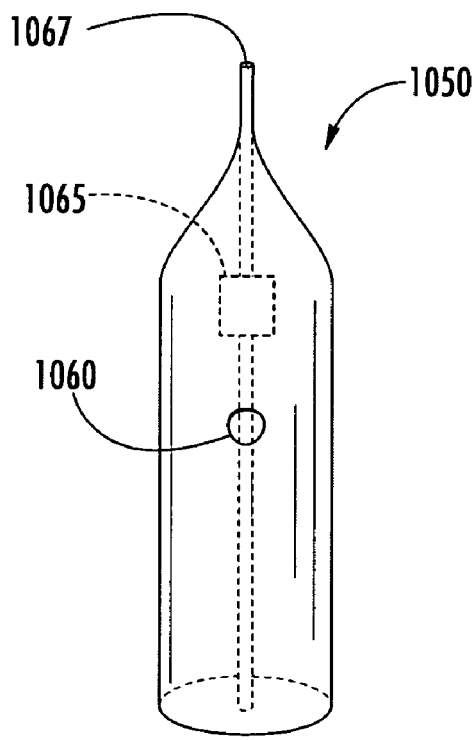

Alternatively, as shown in FIG. 10B, each nozzle 1000 may include a temperature-sensitive valve 1010 that only opens when the temperature-sensitive valve 1010 is exposed to a temperature above a pre-determined threshold temperature (e.g., above 150 degrees Fahrenheit). Such a nozzle will preferably only allow condiment to flow through the nozzle 1000 when the valve 1010 on the nozzle 1000 is within the interior of a hot item, such as recently fried food item.

Other temperature-sensitive valve arrangements or systems may be used in place of the temperature-sensitive valve 1010 described above. For example, the temperature-sensitive valve system shown in FIG. 10C comprises a temperature sensor 1060 that is disposed adjacent (e.g., on the side of) the nozzle 1050, and that is configured for measuring a temperature adjacent the nozzle 1050. The temperature-sensitive valve system preferably further comprises a valve 1065 that is disposed within (or, alternatively, adjacent or remote from) the nozzle 1050, and a control system that is configured both: (1) for receiving signals from the temperature sensor; and (2) for opening and closing the valve. In a preferred embodiment of the invention, the control system is configured for opening the valve 1065 in response to receiving a signal from the temperature sensor 1060 indicating that a temperature adjacent the nozzle 1050 is above a pre-determined threshold temperature, such as 150 degrees Fahrenheit. The control system is also preferably configured for closing the valve 1065 in response to receiving a signal from the temperature sensor 1060 indicating that a temperature adjacent the nozzle is below a pre-determined threshold temperature, such as 150 degrees Fahrenheit. In one embodiment of the invention, when the valve 1065 is closed, the valve 1065 restricts (and preferably prevents) condiment from flowing through the nozzle 1050 and out of the nozzle's outlet 1067. Similarly, when the valve 1065 is open, the valve 1065 does not prevent condiment from flowing through the nozzle 1050 out of the nozzle's outlet 1067.

Figure 10D:
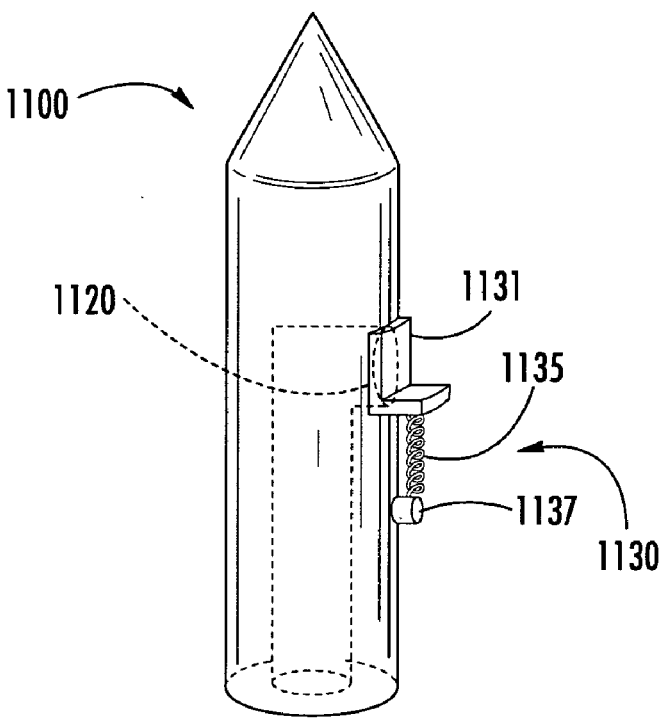

Alternatively, as shown in FIG. 10D, the outlet 1120 of the injection nozzle 1100 may be covered with a sliding spring-loaded door. In one embodiment of the invention, such a door 1130 comprises: (1) a slidably mounted door 1131; (2) a mounting member 1137, that may, for example, be mounted to the nozzle 1100; and (3) a biasing member 1135, such as a spring, that extends between the door 1131 and the mounting member 1137 and that is configured for urging the door towards a "home" (e.g., closed) position. In one embodiment of the invention, the spring loaded door 1130 is positioned adjacent the outlet 1120 of the injection nozzle 1100, and is configured to only slide open when the nozzle 1100 is forced into a food item, such as a French fry. Once the door 1130 is open, condiment may flow from the interior of the injection nozzle 1100 into the food item. Because the door 1130 is spring-loaded, the door 1130 is configured to close when the nozzle 1100 is removed from the interior of the food item. This prevents condiment from flowing through the injection nozzle 1100 when the injection nozzle 1100 is not within the interior of a food item.

As will be understood by one skilled in the art in light of this disclosure, the injection nozzles of the various embodiments of the invention described herein may take many different forms. For example, the injection nozzles may be elongate, short, substantially conical, or substantially cylindrical. In addition, the injection nozzles may include an outlet at the end of the nozzle, on a side portion of the nozzle, or on both the end and on a side portion of the nozzle. Also, the injection nozzles may include either one or a plurality of outlets. Additional outlets may be useful in maximizing the flow of condiment through the nozzle. In addition, in various embodiments of the invention, the injection nozzles may be flexible or rigid, and may be made of any of a variety of materials, such as plastic, metal, foil, or ceramic materials. In various embodiments of the invention, the outlet end of one or more of the injection nozzles is pointed and configured so that this exterior portion of the outlet end the injection nozzle has an interior angle of less than 25, 20, 15, 10, 5, or 3 degrees.

Exemplary Inventive Methods

The present invention includes various inventive methods. Examples of these inventive methods are provided below.

A method of preparing a food item comprising the steps of: (1) cooking the food item; and (2) after cooking the food item, injecting the cooked food item with a condiment, such as mustard, ketchup, or mayonnaise.

A method comprising the steps of: (1) providing a customer with a cooked food item; and (2) providing the customer with a condiment packet (or other container) having a nozzle (e.g., a nozzle that is integrated into the condiment packet) that is configured for dispensing condiment from the condiment packet (or other container) into the interior of the cooked food item. In one embodiment of the invention, the nozzle is substantially rigid, and/or pointed at one end. This makes it easier for the customer to use the nozzle to penetrate the exterior surface of the cooked food item before injecting condiment from the condiment packet (or other container) through the nozzle and into the interior of the food item. In other embodiments, the nozzle is flexible.

A method comprising the steps of: (1) providing a customer with a cooked food item; and (2) providing the customer with a condiment packet (or other container) having a nozzle (e.g., a nozzle that is integrated into the condiment packet) that is configured for dispensing condiment from the condiment packet onto an exterior surface of the food item. In one embodiment, the nozzle is substantially rigid, and/or pointed at one end. In another embodiment, the nozzle is flexible.

A method of providing a condiment to a customer, said method comprising the steps of: (1) providing a customer with a condiment packet; and (2) providing the customer with a condiment tap that is configured to allow the user to tap into the condiment packet and dispense condiment from the condiment packet through the condiment tap.

A method of preparing a food item comprising the steps of: (1) providing a condiment dispenser that is configured for injecting condiment into cooked food items; (2) cooking the food item; and (3) after cooking the food item, using the condiment dispenser to inject the cooked food item with a condiment, such as mustard, ketchup, or mayonnaise (e.g., while the food is still warm from being cooked).

A method of preparing a food item comprising: (1) cooking (e.g., deep frying or baking) the food item; (2) after cooking the food item, injecting the food item with a condiment; and (3) after injecting the food item with a condiment, serving the food item to a customer.

A method of preparing and serving a French fry comprising: (1) cooking (e.g., frying or baking) the French fry; (2) after cooking the French fry, injecting the French fry with ketchup; and (3) serving the French fry to a customer.

A method of preparing a plurality of food items comprising: (1) cooking the plurality of food items; and (2) after cooking the plurality of food items, simultaneously injecting (preferably with a single device, such as the condiment injection device 800 described above in reference to FIG. 9) each of said plurality of food items with a condiment. In one embodiment of the invention, this method is executed in a substantially automated manner. In a further embodiment of the invention, the plurality of food items are injected with condiment sequentially rather than simultaneously.

A method of preparing a plurality of French fries comprising: (1) cooking the plurality of French fries; and (2) after cooking the plurality of French fries, simultaneously injecting (preferably with a single device, such as the condiment injection device 800 described above) each of said plurality of French fries with a condiment, such as ketchup or mayonnaise.

A method of preparing and serving a food item comprising: (1) deep frying the food item; (2) after deep frying the food item, injecting the food item with condiment; and (3) serving the food item to a customer.

A method of preparing and serving a French fry comprising: (1) cooking (e.g., deep frying) the French fry; (2) after cooking the French fry, injecting the French fry with ketchup; and (3) serving the French fry to a customer.

A method of preparing and serving a food item comprising: (1) cooking the food item; (2) after cooking the food item, making a hole in an exterior portion of the food item; (3) transferring condiment from outside the food item, through the hole in the exterior portion of the food item, and into an interior portion of the food item. In a preferred embodiment of the invention, the hole is dimensioned to substantially (and, in one embodiment, entirely) restrict the condiment from flowing from the interior of the food item to the exterior of the food item. In various embodiments of the invention, the maximum width of the hole is: (1) less than 0.2 inches; (2) less that 0.15 inches; (3) less than 0.1 inches; (4) less than 0.08 inches; (5) less than 0.07 inches; (6) less than 0.05 inches; (7) less than 0.04 inches; and/or (8) less than 0.03 inches. In a preferred embodiment of the invention, the hole is substantially in the shape of a circle that has a diameter of: (1) less than 0.2 inches; (2) less that 0.15 inches; (3) less than 0.1 inches; (4) less than 0.08 inches; (5) less than 0.07 inches; (6) less than 0.05 inches; (7) less than 0.04 inches; and/or (8) less than 0.03 inches. Also, in a preferred embodiment of the invention, the exterior portion of the food item is comprised of an "exterior portion material" that is sufficient to resist passage of said condiment through said exterior portion material. Such an exterior portion material, may be for, example, the exterior material of a deep fried French fry or the exterior material of a deep fried hash brown.

Dimensions of Nozzle

In various embodiments of the invention, at least one of the nozzles used for injecting the food items with a condiment is configured so that the nozzle defines an interior passage that is large enough for condiment (such as ketchup) to flow through the nozzle's interior passage, preferably without clogging the nozzle. In addition, at least one of the nozzles may be selected so that substantially no condiment flows from the nozzle when a driving force (such as pressure) ceases to be applied to the condiment within the nozzle. In one embodiment of the invention, at least one of the nozzles is selected so that it defines an interior passage having a maximum width (e.g., a maximum diameter) that is less than 0.047 inches.

In a particular embodiment of the invention, at least one of the nozzles is selected so that a portion of the nozzle's interior passage that is configured to be positioned within the food item when condiment is injected into the food item has a width (and preferably a diameter) of less than 0.05 inches. In another embodiment of the invention, at least one of the nozzles is selected so that a portion of the nozzle's interior passage that is configured to be positioned within the food item when condiment is injected into the food item has a width (e.g., a diameter) of less than 0.04 inches. In another embodiment of the invention, at least one of the nozzles is selected so that a portion of the nozzle's interior passage that is configured to be positioned within the food item when condiment is injected into the food item has a width (e.g., a diameter) of less than 0.035 inches.

Furthermore, in various embodiments of the invention, at least one of the nozzles used for injecting the food items with a condiment is configured so that a portion of the nozzle's interior passage that is configured to be positioned within the food item when condiment is injected into the food item has a maximum width (e.g., a maximum diameter) of less than 0.05 inches. In another embodiment of the invention, at least one of the nozzles is selected so that a portion of the nozzle's interior passage that is configured to be positioned within the food item when condiment is injected into the food item has a maximum width (and preferably a maximum diameter) of less than 0.04 inches. In another embodiment of the invention, at least one of the nozzles is selected so that a portion of the nozzle's interior passage that is configured to be positioned within the food item when condiment is injected into the food item has a maximum width (and preferably a maximum diameter) of less than 0.035 inches.

In one embodiment of the invention, at least one of the nozzles is selected so that it defines an interior passage having a diameter greater than 0.0235 inches. In a particular embodiment of the invention, at least one of the nozzles is selected so that a portion of the nozzle's interior passage that is configured to be positioned within the food item when condiment is injected into the food item has a width (and preferably a diameter) greater than 0.0235 inches. In another embodiment of the invention, at least one of the nozzles is selected so that a portion of the nozzle's interior passage that is configured to be positioned within the food item when condiment is injected into the food item has a width (and preferably a diameter) greater than 0.03 inches. In another embodiment of the invention, at least one of the nozzles is selected so that a portion of the nozzle's interior passage that is configured to be positioned within the food item when condiment is injected into the food item has a width (and preferably a diameter) between 0.0235 and 0.047 inches.

In a particular embodiment of the invention, at least one of the nozzles is selected so that a portion of the nozzle's interior passage that is configured to be positioned within the food item when condiment is injected into the food item has a minimum width (and preferably a minimum diameter) greater than 0.0235 inches. In another embodiment of the invention, at least one of the nozzles is selected so that a portion of the nozzle's interior passage that is configured to be positioned within the food item when condiment is injected into the food item has a minimum width (and preferably a minimum diameter) greater than 0.03 inches. In another embodiment of the invention, at least one of the nozzles is selected so that a portion of the nozzle's interior passage that is configured to be positioned within the food item when condiment is injected into the food item has a minimum width (and preferably a minimum diameter) between 0.0235 and 0.047 inches.

Similarly, in one embodiment of the invention, at least one of the nozzles is preferably selected so that a hole (and preferably any hole) in the food item created by the nozzle during standard use is small enough to restrict condiment from flowing from the interior of the food item to the exterior of the food item. In one embodiment of the invention, at least one of the nozzles is selected so that the portion of the nozzle that penetrates the food item is dimensioned so that a hole (and preferably any hole) in the food item created by the nozzle during standard use is small enough to at least substantially prevent condiment from flowing out of the interior of the food item. In one embodiment of the invention, at least one of the nozzles is selected so the portion of at least one of the nozzles that penetrates the food item is dimensioned so that a hole (and preferably any hole) in the food item created by the nozzle during standard use is small enough so that no substantial amount of condiment flows from the interior of the food item to the exterior of the food item after condiment is injected into the food item through the nozzle. In one embodiment of the invention, at least one of the nozzles is selected so the portion of the nozzle that penetrates the food item is dimensioned to create a hole in the exterior portion of the food item that has a maximum width of 0.09 inches, 0.08 inches, 0.07 inches, 0.065, or 0.055 inches.

In one embodiment of the invention, at least one of the nozzles is selected so that it defines an exterior portion having a diameter of less than 0.09 inches. In a particular embodiment of the invention, at least one of the nozzles is selected so that the portion of the nozzle that is configured to be positioned within the food item when condiment is injected into the food item has a width (and preferably a diameter) of less than 0.08 inches. In one embodiment of the invention, at least one of the nozzles is selected so that the portion of the nozzle that is configured to be positioned within the food item when condiment is injected into the food item has a width (and preferably a diameter) of less than 0.07 inches. In one embodiment of the invention, at least one of the nozzles is selected so that an exterior portion of the nozzle that is configured to be positioned within the food item when condiment is injected into the food item has a width (and preferably a diameter) of less than 0.065 inches. In another embodiment of the invention, at least one of the nozzles is selected so that the portion of the nozzle that is configured to be positioned within the food item when condiment is injected into the food item has a width (and preferably a diameter) of less than 0.058 inches. In another embodiment of the invention, at least one of the nozzles is selected so that the portion of the nozzle that is configured to be positioned within the food item when condiment is injected into the food item has a width (and preferably a diameter) of less than 0.050 inches. In one embodiment of the invention, at least one of the nozzles is selected so that the portion of the nozzle that is configured to be positioned within the food item when condiment is injected into the food item has a width (and preferably a diameter) that is between 0.035 and 0.072 inches.

In one embodiment of the invention, at least one of the nozzles is selected so that it defines an exterior portion having a maximum diameter less than 0.09 inches. In a particular embodiment of the invention, at least one of the nozzles is selected so that the portion of the nozzle that is configured to be positioned within the food item when condiment is injected into the food item has a maximum width (and preferably a maximum diameter) of less than 0.08 inches. In one embodiment of the invention, at least one of the nozzles is selected so that the portion of the nozzle that is configured to be positioned within the food item when condiment is injected into the food item has a maximum width (and preferably a maximum diameter) of less than 0.07 inches. In one embodiment of the invention, at least one of the nozzles is selected so that the portion of the nozzle that is configured to be positioned within the food item when condiment is injected into the food item has a maximum width (and preferably a maximum diameter) of less than 0.065 inches. In another embodiment of the invention, at least one of the nozzles is selected so that the portion of the nozzle that is configured to be positioned within the food item when condiment is injected into the food item has a maximum width (and preferably a maximum diameter) of less than 0.058 inches. In one embodiment of the invention, at least one of the nozzles is selected so that the portion of the nozzle that is configured to be positioned within the food item when condiment is injected into the food item has a maximum width (and preferably a maximum diameter) that is between 0.035 and 0.072 inches.

In one embodiment of the invention, the nozzle is a reusable stainless steel 18 gauge dispensing needle supplied by McMaster Carr (www.mcmaster.com)—part number 6710A67. In one embodiment of the invention, this dispensing needle is attached to a Luer lock syringe, such as McMaster Carr part number 7510A653 and the syringe and dispensing needle are used to inject condiment into the food item as described above.

Method of Injecting Condiment into a Food Item at an Angle

FIG. 11 and the corresponding discussion below demonstrate certain techniques for injecting condiment into a food item. As will be understood by one skilled in the relevant field in light of this disclosure, while these techniques are described as being used to inject condiment into a French fry 1150, these techniques may be used to inject condiment into any appropriate food item, such as any of the food items discussed herein.

As may be understood from FIG. 11, in one embodiment of the invention, to inject condiment into a food item (such as a French fry 1150), a condiment dispenser nozzle 1155 (or other injection member) is inserted through the exterior surface of the French fry 1150 and then positioned so that the nozzle 1155 directs condiment generally toward a lateral end 1160 of the French fry 1150. In one embodiment of the invention, this is done by: (1) inserting the nozzle 1155 into the French fry 1150 so that a portion of the nozzle 1155 and an exterior portion of the French fry 1150 form an angle of about 90 degrees; (2) repositioning the nozzle 1155 into an "injecting position" so that a portion of the nozzle 1155 and an exterior portion of the French fry 1150 form an angle of less than 75 degrees, less than 60 degrees, less than 45 degrees, less than 30 degrees, or less than 20 degrees; and then (3) injecting condiment into the French fry 1150 through the nozzle 1155 while the nozzle 1155 is in the "injecting position". Alternatively, this is done by inserting the nozzle 1155 into the French fry 1150 so that a portion of the nozzle 1155 and an exterior portion of the French fry 1150 form an angle of less than 75 degrees, less than 60 degrees, less than 45 degrees, less than 30 degrees, or less than 20 degrees and then injecting condiment into the French fry 1150 through the nozzle 1155 while the nozzle 1155 is in this position.

Positioning the nozzle so that it directs condiment generally toward a lateral end of the French fry and then injecting the condiment into the French fry while the nozzle is in this position is advantageous because it makes it easier to inject condiment evenly into the French fry. In addition, this technique reduces the danger that the condiment will burst through the opposite side of the French fry as the condiment is injected into the French fry.

Alternative Method of Injecting Condiment into a Food Item

In an alternative embodiment of the invention, condiment may be injected into the interior of a food item without using a nozzle to first pierce the exterior of the food item. In one such example, a nozzle is positioned so that its outlet is adjacent (and preferably immediately adjacent) an exterior surface of the food item. Condiment is then injected (preferably at high pressure) against the exterior surface of the food item so that the condiment exerts sufficient force on the exterior of the food item to create a hole in the food item (this hole is preferably a relatively small hole, such as the holes created by one or more of the injection nozzles discussed herein). The nozzle is then used to inject condiment through the hole created by the stream of condiment. It should be noted that, in one embodiment of the invention, this technique is used to inject condiment into the interior of the food item without positioning the nozzle into the interior of the food item.

Method of Preheating the Condiment before it is Applied to a Food Item

In one embodiment of the invention, the condiment is pre-heated (e.g., to around 100 degrees Fahrenheit) using known warming techniques before the condiment is injected into the food item (or otherwise applied to the food item). This reduces the likelihood that the condiment will cool the food item when the condiment comes into contact with the food item and may reduce the need to heat a food item (e.g., with a heating lamp) in order to keep the food item warm.

Method of Injecting Different Colored Condiments into French Fries

A method according to one embodiment of the invention comprises the step of injecting different colored condiments (such as ketchups) into a particular serving (or other grouping) of French fries (or other food items) in order to create a festive effect. This can be done, for example, by injecting one or more of a serving of French fries with a first color of ketchup (e.g., orange), and also by injecting one or more of the same serving of French fries with a second color of ketchup (e.g., blue). Because it is possible to see the color of ketchup injected into a French fry through the French fry's exterior surface, injecting French fries in this manner produces a festive effect that results from some of the French fries in the serving appearing to be one color while other French fries appear to be another color. This is extremely useful in settings, such as professional football games, in which certain colors (such as the colors of a home football team) are particularly popular with customers.

In another embodiment of the invention, a particular food item (e.g., a French fry) is injected with a plurality of different colors of ketchup. In a further embodiment of the invention, food items within a particular serving of food items are injected with three or more different colors of ketchup. For example, a first French fry from within a serving of French fries may be injected with blue ketchup, a second French fry from within the serving may be injected with yellow ketchup, and a third French fry from within the serving may be injected with green ketchup. As will be understood by one skilled in the art in light of this disclosure, this method of injecting different colored ketchups into French fries may be applied to a variety of different food items using ketchup or a variety of different condiments other than ketchup.

A similar effect may also be achieved by sprinkling different fries from within a particular serving (or other grouping) of food items with different colored seasonings (such as blue or yellow seasoning salt). This can be done, for example, by applying a first color of condiment (such as seasoning salt) to the exterior surface of one or more of a plurality (e.g., a serving or batch) of food items (e.g., French fries), and applying a second color of condiment (such as seasoning salt) to the exterior surface of one or more of the same plurality (e.g., serving or batch) of food items. In a further embodiment of the invention, food items from a particular serving of food items are seasoned with three or more different colors of condiment. For example, a blue seasoning may be applied to a first food item from within a particular serving, a yellow seasoning may be applied to a second food item from within the serving, and a green seasoning may be applied to a third food item from within the serving. As will be understood by one skilled in the art in light of this disclosure, this method of applying different colored condiments to the exterior surfaces of food items may be applied to a variety of different food items (e.g., any of the food items included in this disclosure) and using a variety of condiments other than seasoning salt.

Exemplary Condiments

It should be understood that various different types of condiments may be used in accordance with the present invention. For example, the techniques disclosed herein may be used to inject one or more of the following condiments into the interior of a food item, such as a French fry: (1) ketchup (e.g., ketchup having a viscosity of about 1,000 centipoise, or other appropriate viscosity); (2) mustard; (3) mayonnaise; (4) barbeque sauce; (5) salad dressing (such as Ranch, Caesar, or Italian dressing); (6) Worstershire sauce; (7) cheese sauce, such as a "Ragu Cheese Creations!" cheese sauce; (8) hot sauce; (9) butter; (10) gravy; (11) sour cream; or (12) syrup (such as maple syrup). Food items according to various embodiments of the invention are described below.

The Ketchup-Filled French Fry

A French fry according to one embodiment of the invention comprises: (1) an outer potato shell; (2) an interior portion that is defined by the outer potato shell; and (3) a ketchup portion that is disposed within the interior portion of the French fry and that is substantially or entirely enclosed by the outer potato shell. In one embodiment of the invention, the outer potato shell comprises the outer surface of a French fry (either cooked or uncooked) and the ketchup portion comprises ketchup that has been injected (or delivered in another manner) into the interior portion of the French fry. In various embodiments of the invention, the ketchup fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the ketchup fills, by percentage volume, at least 10%, 20%, 30%, 40%, 50%, 60%, 70%, 80%, or 90% of the French fry. Similarly, in various embodiments of the invention, the ketchup fills, by percentage volume, at least 3% or 5% of the French fry.

The Mayonnaise-Filled French Fry

A French fry according to one embodiment of the invention comprises: (1) an outer potato shell; (2) an interior portion that is defined by the outer potato shell; and (3) a mayonnaise portion that is disposed within the interior portion of the French fry and that is substantially or entirely enclosed by the outer potato shell. In one embodiment of the invention, the outer potato shell comprises the outer surface of a French fry (either cooked or uncooked) and the mayonnaise portion comprises mayonnaise that has been injected (or delivered in another manner) into the interior portion of the French fry. In various embodiments of the invention, the mayonnaise fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the mayonnaise fills, by percentage volume, at least 10%, 20%, 30%, 40%, 50%, 60%, 70%, 80%, or 90% of the French fry. Similarly, in various embodiments of the invention, the mayonnaise fills, by percentage volume, at least 3% or 5% of the French fry.

The Barbeque Sauce-Filled French Fry

A French fry according to one embodiment of the invention comprises: (1) an outer potato shell; (2) an interior portion that is defined by the outer potato shell; and (3) a barbeque sauce portion that is disposed within the interior portion of the French fry and that is substantially or entirely enclosed by the outer potato shell. In one embodiment of the invention, the outer potato shell comprises the outer surface of a French fry (either cooked or uncooked) and the barbeque sauce portion comprises barbeque sauce that has been injected (or delivered in another manner) into the interior portion of the French fry. In various embodiments of the invention, the barbeque sauce fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the barbeque sauce fills, by percentage volume, at least 10%, 20%, 30%, 40%, 50%, 60%, 70%, 80%, or 90% of the French fry. Similarly, in various embodiments of the invention, the barbeque sauce fills, by percentage volume, at least 3% or 5% of the French fry.

The Dressing-Filled French Fry

A French fry according to one embodiment of the invention comprises: (1) an outer potato shell; (2) an interior portion that is defined by the outer potato shell; and (3) a dressing portion that is disposed within the interior portion of the French fry and that is substantially or entirely enclosed by the outer potato shell. In one embodiment of the invention, the outer potato shell comprises the outer surface of a French fry (either cooked or uncooked) and the dressing portion comprises dressing (such as Ranch, blue cheese, or Italian salad dressing) that has been injected (or delivered in another manner) into the interior portion of the French fry. In various embodiments of the invention, the dressing fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the dressing fills, by percentage volume, at least 10%, 20%, 30%, 40%, 50%, 60%, 70%, 80%, or 90% of the French fry. Similarly, in various embodiments of the invention, the dressing fills, by percentage volume, at least 3% or 5% of the French fry.

The Cheese-Sauce Filled French Fry

A French fry according to one embodiment of the invention comprises: (1) an outer potato shell; (2) an interior portion that is defined by the outer potato shell; and (3) a cheese-sauce portion that is disposed within the interior portion of the French fry and that is substantially or entirely enclosed by the outer potato shell. In one embodiment of the invention, the outer potato shell comprises the outer surface of a French fry (either cooked or uncooked) and the cheese-sauce portion comprises cheese sauce (or other cheese-based mixture) that has been injected (or delivered in another manner) into the interior portion of the French fry. In one embodiment of the invention, the interior cheese-sauce portion comprises a relatively thin cheese sauce such as Ragu's Cheese Creations! cheese sauce. In various embodiments of the invention, the cheese sauce fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the cheese sauce fills, by percentage volume, at least 10%, 20%, 30%, 40%, 50%, 60%, 70%, 80%, or 90% of the French fry. Similarly, in various embodiments of the invention, the cheese sauce fills, by percentage volume, at least 3% or 5% of the French fry.

The Worstershire-Sauce Filled French Fry

A French fry according to one embodiment of the invention comprises: (1) an outer potato shell; (2) an interior portion that is defined by the outer potato shell; and (3) a Worstershire sauce portion that is disposed within the interior portion of the French fry and that is substantially or entirely enclosed by the outer potato shell. In one embodiment of the invention, the outer potato shell comprises the outer surface of a French fry (either cooked or uncooked) and the Worstershire sauce portion comprises Worstershire sauce that has been injected (or delivered in another manner) into the interior portion of the French fry. In various embodiments of the invention, the Worstershire sauce fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the Worstershire sauce fills, by percentage volume, at least 10%, 20%, 30%, 40%, 50%, 60%, 70%, 80%, or 90% of the French fry. Similarly, in various embodiments of the invention, the Worstershire sauce fills, by percentage volume, at least 3% or 5% of the French fry.

Hot Sauce-Filled French Fry

A French fry according to one embodiment of the invention comprises: (1) an outer potato shell; (2) an interior portion that is defined by the outer potato shell; and (3) a hot sauce portion that is disposed within the interior portion of the French fry and that is substantially or entirely enclosed by the outer potato shell. In one embodiment of the invention, the outer potato shell comprises the outer surface of a French fry (either cooked or uncooked) and the hot sauce portion comprises hot sauce that has been injected (or delivered in another manner) into the interior portion of the French fry. In various embodiments of the invention, the hot sauce fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the hot sauce fills, by percentage volume, at least 10%, 20%, 30%, 40%, 50%, 60%, 70%, 80%, or 90% of the French fry. Similarly, in various embodiments of the invention, the hot sauce fills, by percentage volume, at least 3% or 5% of the French fry.

Gravy-Filled French Fry

A French fry according to one embodiment of the invention comprises: (1) an outer potato shell; (2) an interior portion that is defined by the outer potato shell; and (3) a gravy portion that is disposed within the interior portion of the French fry and that is substantially or entirely enclosed by the outer potato shell. In one embodiment of the invention, the outer potato shell comprises the outer surface of a French fry (either cooked or uncooked) and the gravy portion comprises gravy (such as chicken or turkey gravy) that has been injected (or delivered in another manner) into the interior portion of the French fry. In various embodiments of the invention, the gravy fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the gravy fills, by percentage volume, at least 10%, 20%, 30%, 40%, 50%, 60%, 70%, 80%, or 90% of the French fry. Similarly, in various embodiments of the invention, the gravy fills, by percentage volume, at least 3% or 5% of the French fry.

Syrup-Filled French Fry

A French fry according to one embodiment of the invention comprises: (1) an outer potato shell; (2) an interior portion that is defined by the outer potato shell; and (3) a syrup portion that is disposed within the interior portion of the French fry and that is substantially or entirely enclosed by the outer potato shell. In one embodiment of the invention, the outer potato shell comprises the outer surface of a French fry (either cooked or uncooked) and the syrup portion comprises syrup (such as maple or strawberry syrup) that has been injected (or delivered in another manner) into the interior portion of the French fry. In various embodiments of the invention, the syrup fills, by percentage volume: (1) from 10% to 20% of the French fry's interior portion; (2) from 20% to 30% of the French fry's interior portion; (3) from 30% to 40% of the French fry's interior portion; (4) from 40% to 50% of the French fry's interior portion; (5) from 50% to 60% of the French fry's interior portion; (6) from 60% to 70% of the French fry's interior portion; (7) from 70% to 80% of the French fry's interior portion; (8) from 80% to 90% of the French fry's interior portion; or (9) from 90% to 100% of the French fry's interior portion. Also, in various embodiments of the invention, the syrup fills, by percentage volume, at least 10%, 20%, 30%, 40%, 50%, 60%, 70%, 80%, or 90% of the French fry. Similarly, in various embodiments of the invention, the syrup fills, by percentage volume, at least 3% or 5% of the French fry.

As will be understood by one skilled in the art in light of this disclosure, any other suitable condiment may be used in place of any of the specific condiments described in the various French fry embodiments described above. For example, the gravy in the "gravy-injected French fry" may be replaced by sour-cream. In addition, the French fry portion of the above filled food items may be replaced by any other suitable food item, especially other items of food that have been fried (e.g., deep fried), or that will be fried. Suitable food items include, for example: (1) hash browns; (2) tater tots; (3) chicken wings; (4) hush puppies; (5) fried sweet potatoes; (6) breakfast food items (such as pancakes, French toast sticks or waffles); (7) chicken nuggets; (8) fried vegetables, such as fried cauliflower; (9) a pretzel (preferably a soft pretzel defining a hollow interior portion for receiving a condiment after the pretzel has been cooked); (10) a hot dog (preferably a hot dog defining a hollow interior portion for receiving a condiment after the hot dog has been cooked); (11) a bread item, such as a roll (preferably a bread item defining a hollow interior portion for receiving a condiment after the bread item has been cooked); (12) a hamburger (preferably a hamburger defining a hollow interior portion for receiving a condiment after the hamburger has been cooked); (13) a waffle (preferably a waffle defining a hollow interior portion for receiving a condiment after the waffle has been cooked); (14) a pancake (preferably a pancake defining a hollow interior portion for receiving a condiment after the pancake has been cooked); (14) French toast (preferably a piece of French toast defining a hollow interior portion for receiving a condiment after the piece of French toast has been cooked). For example, replacing the French fry portion of the ketchup-filled French fry with a hash brown results in the following:

The Ketchup-Filled Hash Brown

A hash brown according to one embodiment of the invention comprises: (1) an outer potato shell; (2) an interior portion that is defined by the outer potato shell; and (3) a ketchup portion that is disposed within the interior portion of the hash brown and that is substantially or entirely enclosed by the outer potato shell. In one embodiment of the invention, the outer potato shell comprises the outer surface of a hash brown (either cooked or uncooked) and the ketchup portion comprises ketchup that has been injected (or delivered in another manner) into the interior portion of the hash brown. In various embodiments of the invention, the ketchup fills, by percentage volume: (1) from 10% to 20% of the hash brown's interior portion; (2) from 20% to 30% of the hash brown's interior portion; (3) from 30% to 40% of the hash brown's interior portion; (4) from 40% to 50% of the hash brown's interior portion; (5) from 50% to 60% of the hash brown's interior portion; (6) from 60% to 70% of the hash brown's interior portion; (7) from 70% to 80% of the hash brown's interior portion; (8) from 80% to 90% of the hash brown's interior portion; or (9) from 90% to 100% of the hash brown's interior portion. Also, in various embodiments of the invention, the ketchup fills, by percentage volume, at least 10%, 20%, 30%, 40%, 50%, 60%, 70%, 80%, or 90% of the hash brown. Similarly, in various embodiments of the invention, the ketchup fills, by percentage volume, at least 3% or 5% of the hash brown.

As another example, replacing the French fry portion of the "Ketchup-Filled French fry" described above with a hot dog (and also replacing the Ketchup with mustard) results in the following:

The Mustard-Filled Hot Dog

A hot dog according to one embodiment of the invention comprises: (1) an outer potato shell; (2) an interior portion that is defined by the outer potato shell; and (3) a mustard portion that is disposed within the interior portion of the hot dog and that is substantially or entirely enclosed by the outer potato shell. In one embodiment of the invention, the outer potato shell comprises the outer surface of a hot dog (either cooked or uncooked) and the mustard portion comprises mustard that has been injected (or delivered in another manner) into the interior portion of the hot dog. In various embodiments of the invention, the mustard fills, by percentage volume: (1) from 10% to 20% of the hot dog's interior portion; (2) from 20% to 30% of the hot dog's interior portion; (3) from 30% to 40% of the hot dog's interior portion; (4) from 40% to 50% of the hot dog's interior portion; (5) from 50% to 60% of the hot dog's interior portion; (6) from 60% to 70% of the hot dog's interior portion; (7) from 70% to 80% of the hot dog's interior portion; (8) from 80% to 90% of the hot dog's interior portion; or (9) from 90% to 100% of the hot dog's interior portion. Also, in various embodiments of the invention, the mustard fills, by percentage volume, at least 1.0%, 20%, 30%, 40%, 50%, 60%, 70%, 80%, or 90% of the hot dog. Similarly, in various embodiments of the invention, the mustard fills, by percentage volume, at least 3% or 5% of the hot dog.

As another example, replacing the French fry portion of the "Syrup-Filled French fry" described above with a French toast stick results in the following:

Syrup-Filled French Toast Stick

A French toast stick according to one embodiment of the invention comprises: (1) an outer potato shell; (2) an interior portion that is defined by the outer potato shell; and (3) a syrup portion that is disposed within the interior portion of the French toast stick and that is substantially or entirely enclosed by the outer potato shell. In one embodiment of the invention, the outer potato shell comprises the outer surface of a French toast stick (either cooked or uncooked) and the syrup portion comprises syrup that has been injected (or delivered in another manner) into the interior portion of the French toast stick. In various embodiments of the invention, the syrup fills, by percentage volume: (1) from 10% to 20% of the French toast stick's interior portion; (2) from 20% to 30% of the French toast stick's interior portion; (3) from 30% to 40% of the French toast stick's interior portion; (4) from 40% to 50% of the French toast stick's interior portion; (5) from 50% to 60% of the French toast stick's interior portion; (6) from 60% to 70% of the French toast stick's interior portion; (7) from 70% to 80% of the French toast stick's interior portion; (8) from 80% to 90% of the French toast stick's interior portion; or (9) from 90% to 100% of the French toast stick's interior portion. Also, in various embodiments of the invention, the syrup fills, by percentage volume, at least 10%, 20%, 30%, 40%, 50%, 60%, 70%, 80%, or 90% of the French toast stick. Similarly, in various embodiments of the invention, the syrup fills, by percentage volume, at least 3% or 5% of the French toast stick.

Structure of a Filled Food Item

FIGS. 12A, 12B, 13A, and 13B depict the general structure of exemplary filled food items (specifically French fries) according to two different embodiments of the invention. More specifically, FIGS. 12A and 12B depict a French fry 2000 that comprises an outer potato portion 2005 and a single, substantially discrete interior condiment (e.g., ketchup) portion 2010. The interior condiment portion 2010 may be injected into the interior of the French fry 2000 using, for example, an injection nozzle as discussed above.

FIGS. 13A and 13B depict a French fry 2100 that comprises an outer potato portion 2103 and two substantially discrete interior condiment (e.g., ketchup) portions 2105, 2106. These discrete interior condiment portions 2105, 2106 may be injected (e.g., separately) into the interior of the French fry 2100 using, for example, one or more injection nozzles (or other injection members) as discussed herein. In one embodiment of the invention, each interior condiment portion 2105, 2106 comprises the same condiment (e.g., both condiment portions 2105, 2106 comprise ketchup). However, the individual condiment portions 2105, 2106 may alternatively each comprise a different condiment (e.g., the first condiment portion 2105 may comprise ketchup, and the second condiment portion 2106 may comprise Ranch dressing). Other embodiments of the invention may comprise more than two (for example, three, four, five, or six) discrete condiment portions 2105, 2106. In one embodiment of the invention, each discrete condiment portion 2105, 2106 comprises the same condiment. Alternatively, the various discrete condiment portions 2105, 2106 may comprise different condiments. In one embodiment of the invention, the food item (e.g. French fry) 2100 is configured so that at least one of the food item's discrete condiment portions 2105, 2106 is physically separate from (e.g., spaced apart from) at least another of the food item's discrete condiment portions 2105, 2106.

Injection of Food Items Having an Interior Cavity

The condiment injection techniques described herein may be used to inject condiment into the interior of food items (especially pretzels or other cereal-based food items) that define an interior condiment-receiving cavity. For example, in a preferred embodiment of the invention, a food item is provided that defines at least one interior cavity (which may be, for example, an elongate internal channel defined by the food item). To add condiment to the interior of the food item, a user first uses an injection member (such as one of the nozzles described above) to pierce the outer surface of the food item. The user then pushes the injection member toward the interior of the food item until an outlet portion of the injection member is within the food item's interior cavity. The user then transfers condiment through the injection member (e.g., nozzle) and into the interior cavity of the food item using the techniques described above.

Like various other food injection techniques described above, one reason that this technique is advantageous is that it may optionally allow for a food item to be pre-manufactured without a condiment filling, shipped to a food vendor (such as a restaurant), cooked (or, alternatively, not cooked), and then injected with condiment on an as-needed basis (e.g., just before the food item is sold to a customer, or as needed to maintain a necessary reserve of freshly injected food items for purchase by customers). This is particularly advantageous for food vendors (such as restaurants) that wish to offer customers the option of ordering a particular food item filled with one or more of a variety of different condiments, but that do not wish to purchase many different varieties of pre-filled food items.

In one embodiment of the invention, the food vendor simply purchases one or more generic food items (e.g., a food item with a hollow condiment-receiving cavity) and then injects the generic food items with one or more of a plurality of condiments at a convenient time. For example, the food vendor may wait until a customer orders a food item with a particular filling before injecting the food item with the requested filling. This technique is especially advantageous in situations in which the condiment is to be preheated before injection into the food item. For example, food vendors may inject a hot condiment (such as hot cheese sauce) into a food item (such as a pretzel) substantially immediately before serving the pretzel to a customer. As another example, food vendors may inject a hot condiment (such as hot cheese sauce) into a food item (such as a pretzel) a short time before (e.g., less than 10 minutes before, less than 5 minutes before, or less than one minute before) serving the pretzel to a customer.

As will be understood by one skilled in the art in light of this disclosure, many different food items and condiments may be used in accordance with this aspect of the invention. Such food items include, for example, pretzels, rolls, hot dogs, hamburgers, hash browns, waffles, pancakes, French fries, onion rings, chicken nuggets, and any of the other food items referenced in this specification. Exemplary condiments include: (1) ketchup; (2) mustard; (3) mayonnaise; (4) barbeque sauce; (5) teriyaki sauce; (6) salad dressing (such as ranch, Caesar, or Italian dressing); (7) Worstershire sauce; (8) cheese sauce, such as Ragu brand cheese sauce; (9) hot sauce; (10) butter; (11) gravy; (12) sour cream; and (13) syrup (such as maple syrup).

As will be also be understood by one skilled in the relevant field, while the condiment injection step described in any of the embodiments described in this specification may be performed after the food item is shipped to a food vendor (such as a restaurant), this step may also be performed before the food item is shipped to a food vendor or other customer (e.g., at the same manufacturing plant where the rest of the food item is prepared).

Pre-Filled Condiment-Filled Food Items

As noted above, one method of preparing condiment-filled food items according to the present invention involves pre-manufacturing the food items to contain condiment (e.g., before shipping the food items to a food vendor or other customer). This may be done either by using one or more of the condiment injection techniques described above, or by adding condiment to the interior of a pre-manufactured food item using any other suitable method. Examples of generally related methods of manufacturing food items are described in the following U.S. patents and patent applications, all of which are hereby incorporated herein by reference: U.S. Pat. No. 4,517,203; U.S. Pat. No. 4,618,499; U.S. Pat. No. 5,009,903; U.S. Pat. No. 5,236,724; and U.S. Patent Application 20020098267.

Examples of pre-manufactured food items according to various embodiments of the present invention include the following: (1) ketchup-filled French fries; (2) cheese-sauce filled French fries; (3) dressing filled French fries; (4)

sauce-filled French fries (e.g., French fries filled with barbeque, sweet-and-sour, horseradish, mustard, teriyaki, or other sauce); (5) gravy filled French fries; (6) mayonnaise filled French fries; (7) ketchup-filled hash browns; (8) ketchup-filled hot dogs; (9) mustard-filled hot dogs; (10) mustard-filled pretzels; (11) sauce-filled chicken nuggets (e.g., chicken nuggets filled with barbeque, sweet-and-sour, horseradish, mustard, or other sauce). However, any of the food items and condiments described herein (or other types of food items or condiments) may be combined to form other pre-manufactured food items according to the present invention. For example, ranch-dressing and a hot dog may be combined to form a ranch-dressing filled hot dog.

Automated Injection of Condiment into a Food Item

In various embodiments of the invention, the injection of one or more condiments into one or more food items is at least partially (and may be entirely) automated. For example, in various embodiments of the invention, the injection process is performed by a condiment injection apparatus that is configured for facilitating the injection of one or more food items with at least one condiment. In one embodiment of the invention, the condiment injection apparatus is configured for receiving a plurality of food items, and injecting each of the plurality of food items with a condiment. In a particular embodiment of the invention, the condiment injection apparatus is configured for sequentially injecting a plurality of food items in a substantially (or entirely) automated manner. For example, one embodiment of the condiment injection apparatus is configured for receiving a batch, an order, or other plurality of French fries, and using an automated device to sequentially, simultaneously, or both sequentially and simultaneously, inject the plurality of French fries with a condiment (e.g., ketchup, ranch dressing, barbeque sauce, hot sauce, mayonnaise, or any of the other condiments referenced in this specification).

In one embodiment of the invention, a single machine (or a plurality of interconnected machines) may be used to inject a selected one or more of a plurality of different condiments into food items in a substantially automated manner. In this embodiment of the invention, a user preferably uses an input device (such as a selection lever, or an electronic user interface) to select one or more of a plurality of condiments that are to be injected into the food item or food items to be processed. The one or more food items are then loaded into the machine, which then at least substantially automatically (and preferably entirely automatically) injects the food items with the selected condiment or condiments.

For example, a condiment injection device according to one embodiment of the invention comprises a French fry receiving portion, an injection portion, and a French fry output portion. In this embodiment of the invention, the French fry receiving portion is configured for receiving a plurality of French fries from a user and directing the French fries to the French fry injection portion. The French fry injection portion is configured for injecting (for example, automatically or substantially automatically) French fries that are received from the French fry receiving portion. The French fry output portion is configured for receiving the injected French fries from the French fry injection portion and preferably for storing the injected French fries (either within or outside of the condiment injection device) until the injected French fries are retrieved by a user.

In one embodiment of the invention, the condiment injection device comprises an input device for allowing users to select one or more of a plurality of condiments to be injected into the French fries.

It should be understood that, while the condiment injection device above is described for use in injecting French fries with ketchup, similar techniques and devices may be used to inject other condiments (e.g., any of the condiments referenced herein) into other types of food items (e.g., any of the food items referenced herein).

Description of FIGS. 14A, 14B, 15A, and 15B

A condiment injection apparatus 1200 according to one embodiment of the invention is shown in FIGS. 14A, 14B, 15A, and 15B. While this embodiment of the invention is discussed below as being used to inject French fries with a condiment, such as ketchup, it should be understood that a similar condiment injection apparatus may use the same general techniques to inject any of a variety of food items (such as any of the food items disclosed in this specification) with a condiment or other food item.

As may be understood from FIG. 14A, in this embodiment of the invention, the condiment injection apparatus 1200 comprises: (1) a food item receiving portion 1203; (2) a food item injection portion 1229; and (3) an injected food item dispensing portion 1248. In one embodiment of the invention, the food item receiving portion 1203 comprises a hopper 1210 that is generally funnel shaped (e.g., substantially in the form of a hollow cone) and that defines a relatively wide inlet opening 1204 and a relatively narrow outlet opening 1206. In one embodiment of the invention, the maximum width of the inlet opening 1204 (which is preferably substantially circular) is at least 5 times (or, alternatively, at least 3, 4, 6, 7, 8, 9, or 10 times) the average width of French fries to be injected by the condiment injection apparatus 1200, and the maximum width of the outlet opening 1206 is less than two times (and preferably about equal to) the average width of French fries to be injected by the condiment injection apparatus 1200.

In one embodiment of the invention, a vibrating device 1215, such as a rotary motion vibrator for bins and hoppers, is disposed adjacent (and preferably attached to) the hopper 1210 so that when the vibrating device 1215 is activated, the hopper 1210 vibrates. This serves to facilitate movement of the French fries 1205 out of the hopper's outlet opening 1206.

As shown in FIG. 14A, an input conveyor 1220 (which may, for example, be a static slide or a powered conveyor such as an endless belt conveyor) is disposed adjacent the hopper's outlet opening 1206. The input conveyor 1220 is also preferably positioned to receive French fries 1205 from the hopper's outlet opening 1206 and to transport the French fries 1205 to the injection portion 1229 of the condiment injection apparatus 1200. In the embodiment of the invention shown in FIG. 14A, the input conveyor 1220, comprises a slide (e.g., having a generally half-circular cross-section) that is configured to convey French fries 1205 from the hopper's outlet opening 1206 to an injection portion conveyor 1225. This injection portion conveyor 1225 is configured to move the French fries 1205 through the injection portion 1229 of the condiment injection apparatus 1200.

As shown in FIG. 14A, in one embodiment of the invention, the injection portion 1229 of the condiment injection apparatus 1200 comprises: (1) an injection-portion conveyor 1225 that is adapted to transport French fries through the injection portion of the condiment injection apparatus 1200; and (2) an injection assembly 1230 that is adapted to inject one or more French fries 1205 with condiment as the French fries 1205 pass through the injection portion 1229 of the condiment injection apparatus 1200.

In one embodiment of the invention, the injection assembly 1230 comprises an injection member 1227, and a sensor 1240 disposed adjacent the injection member 1227. In this embodiment of the invention, the injection member 1227 comprises one or more injection nozzles 1235 that are adapted for injecting condiment into the interior of French fries 1205. These injection nozzles 1235 may take the form of any of the nozzles described herein, or any other suitable form.

As may be understood from FIG. 14A, the injection member 1227 comprises one or more (and preferably a plurality of) injection nozzles 1235 that are positioned adjacent a substantially circular exterior outer surface of the injection member 1227, so that the injection nozzles 1235 extend outwardly from, and radially from, the injection member 1227. In one embodiment of the invention, the injection member 1227 comprises a single row of injection nozzles 1235 that are spaced substantially evenly apart from each other around the circumference of a substantially circular outer surface of the injection member 1227. As discussed in greater detail below, this may allow the injection member 1227 to inject a single French fry 1205 multiple times with a condiment (such as ketchup) as the French fry 1205 moves adjacent the injection member 1227.

In one embodiment of the invention, the injection nozzles 1235 are positioned so that an injection portion (e.g., the outer tip) of each injection nozzle 1235 is spaced apart from the injection portion of at least one other injection nozzle 1235 (and preferably all other injection nozzles) by no more than four inches (or, for example, no more than three inches, no more than two inches, no more than one inch, and/or no more than one half inch). Similarly, in one embodiment of the invention, the injection nozzles 1235 are spaced apart so that an injection portion (e.g., the outer tip) of each injection nozzle 1235 is spaced apart from the injection portion of at least one other injection nozzle 1235 (and preferably all other injection nozzles) by at least ⅛ inch (or, for example, at least ¼ inch, at least ½ of an inch, at least ¾ of an inch, and/or at least one inch).

The interior structure of an injection member 1227 according to one embodiment of the invention is shown in FIG. 15B. As may be understood from this figure, the injection member 1227 comprises a rotatable outer portion 1232 and an interior support portion 1231. The rotatable outer portion 1232 is preferably mounted, in any manner known in the art (e.g., using bearings) so that the rotatable outer portion 1232 rotates (e.g., under the power of a drive mechanism, such as a motor or by manual power) about the exterior surface of the interior support portion 1231. In one embodiment of the invention, the rotatable outer portion 1232 defines a substantially cylindrical interior portion 1233 that is positioned to substantially conform with a substantially cylindrical exterior portion 1234 of the interior support portion 1231. This allows the rotatable outer portion 1232 to move smoothly about the substantially cylindrical exterior portion 1234 of the interior support portion 1231.

As may be understood from FIG. 15B, the interior support portion 1231 defines an interior cavity 1236, and a condiment delivery passage 1262 through which condiment may be delivered from the interior cavity 1236 (e.g., via a condiment supply member 1275 disposed within the interior cavity 1236) to an interior surface of the rotatable outer portion 1232. In one embodiment of the invention, a condiment supply member (such as a supply tube) 1275 may be provided for carrying condiment from a condiment source (such as a pressurized, or unpressurized, condiment container) to the interior support condiment delivery passage 1262. In one embodiment of the invention, the flow of condiment from the condiment supply member 1275 and into the condiment delivery passage 1262 is regulated by a valve 1270 that is disposed between the condiment supply member 1275 and the condiment delivery passage 1262.

As shown in FIG. 15B, the rotatable outer portion 1232 preferably defines a nozzle-supply passage 1257 adjacent an inlet portion 1237 of each nozzle 1235 (each of which, in one embodiment, is positioned adjacent the exterior surface of the rotatable outer portion 1232 as described above). Each nozzle 1235 defines an interior passage 1261 that serves as a conduit between the nozzle-supply passage 1257 adjacent the nozzle 1235 and the nozzle's outlet 1238. Each nozzle 1235 and corresponding nozzle-supply passage 1257 are preferably positioned so that when the nozzle 1235 and corresponding nozzle-supply passage 1257 reach a pre-determined radial position adjacent the interior support portion 1231, the nozzle-supply passage 1257 aligns with the interior support portion's condiment delivery passage 1262 so that, when the valve 1270 is open, condiment may flow from the condiment supply member 1275, through the valve 1270, through the condiment delivery passage 1262, through the particular nozzle-supply passage 1257 that is adjacent the condiment delivery passage 1262, through the nozzle 1235 that is adjacent that particular nozzle-supply passage 1257 and out the nozzle's outlet 1238 (which, in one embodiment of the invention, is adjacent the outer tip of the nozzle 1235).

As will be understood from FIG. 15B, if the valve 1270 is left open and a motor is used to rotate the rotatable outer portion 1232 about the outer surface of the interior support portion 1231, condiment will flow out of the outlet 1238 of (e.g., the tip of) each nozzle 1235 when the nozzle 1235 is adjacent the condiment delivery passage 1262. Thus, in one embodiment of the invention, condiment will flow out of a particular nozzle's outlet 1238 when that particular nozzle 1235 reaches a pre-determined radial position relative to the interior support portion 1231 (and, when, if a valve 1270 is used to regulate condiment flow through the various nozzles 1235, the valve 1270 is open).

Turning again to FIG. 14A, in one embodiment of the invention, a sensor 1240 (e.g., a light, heat, or motion sensor) is provided in a position that is suitable to determine whether a nozzle 1235, which is in (or about to reach) a condiment delivery position (e.g., a position in which the nozzle 1235 and corresponding nozzle-supply passage 1257 are positioned to receive condiment from a condiment source, such as the condiment supply member 1275), is positioned within a French fry. For example, as shown in FIGS. 14A and 15A, a light sensor 1240 may be positioned so that it is adjacent (and preferably immediately adjacent) the tip of a nozzle 1235 (e.g., particular nozzle 1246) when the nozzle 1235 is in the condiment delivery position. (See, for example, FIGS. 14A and 15A, which show a particular nozzle 1246 in a condiment delivery position).

The sensor 1240 may then be used to determine whether a French fry 1205 is present while the particular nozzle 1246 is in the condiment delivery position. If so, the sensor 1240 sends a signal (e.g., to a computer processor or other suitable control device) that opens the valve 1270. This, in turn, causes condiment to flow through the particular nozzle 1246 in the manner discussed above, and into the interior of the French fry 1205. If the sensor 1240 does not detect a French fry adjacent the particular nozzle 1246, however, the valve 1270 remains closed and no condiment flows through the nozzle 1246. This serves to assure that condiment is only dispensed from the nozzle 1246 when a French fry is positioned to receive the condiment. This, in turn, may reduce the amount of condiment wasted during the injection process.

Alternatively, the condiment injection apparatus 1230 may be provided without a valve 1270 (or other device) for regulating condiment flow from the condiment supply member 1275 to the various nozzles 1235. In such an embodiment, each nozzle 1235 will typically eject condiment each time that the nozzle 1235 reaches a condiment delivery position. In this embodiment, the apparatus is preferably configured with a condiment receiving member (such as a condiment receiving bin, not shown) for receiving condiment that has been ejected from a nozzle 1235 when a French fry is not positioned to receive the condiment.

As may be understood from FIGS. 14A and 14B, the injection member 1227 is preferably positioned adjacent the injection-portion conveyor 1225 so that the injection member's axis of rotation is substantially parallel to an upper surface of the injection-portion conveyor 1225 and so that a plane formed by the injection member's various nozzles 1235 (which, in one embodiment of the invention, are substantially co-planar) is both: (1) substantially perpendicular to the upper surface of the injection-portion conveyor 1225; and (2) substantially parallel to at least one side of the injection-portion conveyor 1225. In addition, the injection member 1227 is preferably positioned so that when one of the injection member's nozzles 1235 is: (1) positioned between the injection member's axis of rotation and the upper surface of the injection-portion conveyor 1225; and (2) substantially perpendicular to the upper surface of the injection-portion conveyor 1225, there is a gap between that nozzle 1235 and the upper surface of the injection-portion conveyor 1225. In one embodiment of the invention, the length of this gap (the distance between the end of the nozzle 1235 and the upper surface of the injection portion conveyor 1225 when the nozzle 1235 is in the position specified above) is less than the average width of French fries to be injected by the condiment injection apparatus 1200 (e.g., the width of a standard French fry). In various embodiments of the invention, the length of this gap is: (1) less than ⅛ of the average width of French fries to be injected by the condiment injection apparatus 1200; (2) less than ¼ of the average width of French fries to be injected by the condiment injection apparatus 1200; (3) less than ⅜ of the average width of French fries to be injected by the condiment injection apparatus 1200; (4) less than ½ of the average width of French fries to be injected by the condiment injection apparatus 1200; (5) less than ⅝ of the average width of French fries to be injected by the condiment injection apparatus 1200; (6) less than ¾ of the average width of French fries to be injected by the condiment injection apparatus 1200; and/or (7) less than ⅞ of the average width of French fries to be injected by the condiment injection apparatus 1200. Also, in various embodiments of the invention, the length of this gap is: (1) less than ¾ of an inch; (2) less than ⅝ of an inch; (3) less than ½ of an inch; (4) less than ⅜ of an inch; (5) less than ¼ of an inch; (6) less than ⅛ of an inch; and/or (7) less than 1/16 of an inch.

In one embodiment of the invention, this gap is dimensioned so that when a French fry 1205 passes between the injection member 1227 and the injection-portion conveyor 1225, at least one of the injection member's nozzles 1235 pierces only one surface (e.g., the upper surface) of the French fry 1205. This serves to prevent the nozzle 1235 from piercing entirely through the French fry 1205 and ejecting condiment adjacent the exterior of the French fry 1205 rather than into the French fry's interior. However, the gap may also be selected so that the injection member 1227 automatically dispenses condiment onto the exterior surface of the French fry 1205 (e.g., with or without piercing the French fry).

In one embodiment of the invention, a motor is provided to rotate the rotatable outer portion 1232 (see FIG. 15B) so that the linear speed of the nozzles 1235 as the nozzles 1235 pass adjacent the top surface of the injection portion conveyor 1225 is about the same as the linear speed of the top surface of the injection portion conveyor 1225 (which may, for example, be a motorized, endless-belt conveyor). In an alternative embodiment of the invention, the injection portion conveyor 1225 is a slanted, fixed smooth surface that is configured to allow the French fries 1205 to slide relative to the injection portion conveyor 1225 as the French fries 1205 are injected by the injection member 1227.

Returning to FIG. 14A, and as noted above, in one embodiment of the invention, the condiment delivery apparatus 1200 further comprises an injected food item dispensing portion 1248 that is configured for dispensing food items that have been injected with condiment in the condiment delivery apparatus' injection portion 1230. In one embodiment of the invention, the injected food item dispensing portion 1248 comprises a dispensing conveyor 1245 and a dispensing bin 1250. The dispensing conveyor 1245 (which may be any suitable conveyor for conveying French fries 1205—e.g., a slide or a belt conveyor) is preferably positioned for conveying injected French fries 1205 from the injection conveyor 1225 into the dispensing bin 1250, which may be used to dispense injected French fries 1205 to a user (such as a food service worker or a customer).

To use the condiment injection device of FIGS. 14A, 14B, 15A, and 15B, a user places one or more French fries 1205 into the interior of the hopper 1210, and then activates the condiment injection apparatus 1200. Activating the condiment injection apparatus 1200 causes the vibrating device 1215 to vibrate (and to thereby vibrate the hopper 1210) and also causes the injection member 1227 to rotate and the injection-portion conveyor 1225 to move as discussed in greater detail below.

The vibration of the hopper 1210 and the shape of the hopper's interior surface (which is preferably substantially conical) orients the French fries 1205 in a generally vertical orientation in which one end of at least one of the French fries is adjacent the outlet portion 1206 of the hopper 1210. The vibration of the hopper 1210 then causes the French fries 1205 to move, one-by-one, through the hopper's outlet portion 1206 (which is preferably only large enough to dispense one French fry at a time).

When a particular French fry 1205 exits the hopper 1210, the French fry 1205 is in a substantially vertical position in which the central, longitudinal axis of the French fry is substantially parallel to the longitudinal axis of a portion of the input conveyor 1220 that is immediately adjacent the hopper 1210. Once the French fry 1205 leaves the hopper 1210, the French fry 1205 moves along the input conveyor 1220 to the injection-portion conveyor 1225. As shown in FIG. 14A, in one embodiment of the invention, the input conveyor 1220 is configured to move the French fry 1205 from a substantially vertical to a substantially horizontal position while maintaining the French fry 1205 so that the French Fry's longitudinal axis is substantially parallel to (and preferably substantially coplanar with) a plane defined by at least two of, and preferably all of, the injection member's nozzles 1235.

When the French fry 1205 reaches the injection-portion conveyor 1225, the injection-portion conveyor 1225 moves the French fry 1205 under the injection member 1227 while maintaining the French fry's longitudinal axis substantially parallel to, and substantially laterally aligned with, a plane defined by at least two of, and preferably all of, the injection member's nozzles 1235. As shown in FIG. 14B, in one embodiment of the invention, the injection portion conveyor 1225 is preferably provided with substantially parallel raised portions 1221, 1222 (which are omitted from FIG. 14A for purposes of clarity) for maintaining the French fry's longitudinal axis substantially parallel to, and substantially laterally aligned with, a plane defined by at least two of, and preferably all of, the injection member's nozzles 1235. These raised portions 1221, 1222 are preferably parallel and spaced apart by a distance that is about equal to the width of a French fry 1205 to be processed by the condiment injection apparatus 1200. In one embodiment of the invention, these raised portions 1221, 1222 are about 1/16 inch in height, but they may be dimensioned differently to accommodate the particular French fries 1205 to be injected.

As a French fry 1205 approaches the injection member 1227, a first nozzle 1235 pierces a top surface of the French fry 1205 as shown generally in FIG. 15A. The French fry 1205 and the first nozzle 1235 then move together substantially in tandem as the first nozzle 1235 moves around the injection member's axis of rotation 1242, and the French fry 1205 is moved under the injection member 1227 by the injection-portion conveyor 1225 and/or the rotational motion of the injection member 1227. When the first nozzle's nozzle supply passage 1257 (see FIG. 15B) aligns with the condiment delivery passage 1262, the portion of the French fry 1205 immediately adjacent the end of the first nozzle 1235 activates the sensor 1240, which sends a signal to a control system (e.g., a computer processor or other suitable control system) that opens the valve 1270. This, in turn, causes condiment to flow from the condiment supply member 1275, through the valve 1270, through the condiment delivery passage 1262, through the first nozzle's nozzle supply passage 1257, through the nozzle 1235, and into the interior of the French fry 1205. As the first nozzle 1235 and the French fry 1205 continue to move, the first nozzle 1235 and its corresponding nozzle supply passage 1257 eventually move so that the nozzle supply passage 1257 is no longer aligned with the condiment delivery passage 1262. This causes condiment to stop flowing into (and, accordingly, out of) the first nozzle 1235. The first nozzle 1235 then rotates out of engagement with the French fry 1205, and the injected French fry 1205 is eventually transported (in various embodiments after being injected with condiment by a second, third, fourth, and/or fifth nozzle 1235) to the injected food item dispensing portion 1248 so that the injected French fry 1205 may be dispensed to a user.

Returning to FIG. 14A, once an injected French fry 1205 reaches the condiment dispensing apparatus' dispensing portion 1248, the French fry 1205 is conveyed by the dispensing portion conveyor 1245 to a dispensing bin 1250, where the injected French fry may be retrieved by a user.

As will be understood in view of the above description and the corresponding Figures (especially FIG. 15A) the condiment injection apparatus 1200 may be configured to automatically inject a single French fry 1205 with condiment several times. If desired, this serves to provide the French fry 1205 with a substantially uniform condiment filling.

As may be understood from the above description and from FIG. 13B, the amount of condiment injected into a particular French fry 1205 by a particular nozzle 1235 will depend upon such factors as: (1) the pressure at which condiment is supplied by the condiment supply member 1275, (2) the size (e.g., the length of the arc defined by) the condiment delivery passage 1262; (3) the size of the nozzle supply passages 1257; (4) the size of the interior bore 1261 of the nozzles 1235; and (5) the speed at which the injection member's rotatable outer portion 1232 rotates about its axis of rotation 1242. One or more of these various factors can be selected and modified (preferably in real time) to fill French fries 1205 with the desired amount (e.g., a predetermined amount) of condiment.

For example, the condiment injection apparatus 1200 may be provided with a "desired condiment fill amount" input device that allows users to select whether they would like their French fries 1205 to be filled with a "large", "medium", or "small" amount of condiment. Input from this input device may be used (for example, by a computer processor connected to a pressure regulator) to vary the pressure at which condiment is delivered by the condiment supply member 1275 so that this pressure corresponds with the selected, desired fill amount. For example, if a user uses the input device to indicate that they would like a "large" amount of condiment injected into their French fries, the computer processor may use the pressure regulator to maintain the pressure of condiment delivered by the condiment supply member 1275 at a relatively high level. This causes a relatively large amount of condiment to be injected into the French fries.

Similarly, if a user uses the input device to indicate that they would like a "small" amount of condiment injected into their French fries, the computer processor uses the pressure regulator to maintain the pressure of condiment delivered by the condiment supply member 1275 at a relatively low level. This causes a relatively small amount of condiment to be injected into the French fries.

As will be understood by one skilled in the art, a similar effect may be accomplished in many other ways (e.g., by replacing the valve 1270 with a variable flow valve and using this variable flow valve to provide a selectably variable condiment flow through the injection member's nozzles 1235, or by varying, in accordance with the amount of condiment selected by the user, the speed at which the injection member's rotatable outer portion 1232 rotates about its axis of rotation.

It should be understood that while the above embodiment of the invention is described as being configured for injecting French fries with a condiment, this embodiment of the invention (or modified versions of this embodiment) may also be used to inject other food items (such as any of the food items discussed in this specification) with any condiment or other fluid food item.

As will be understood by one skilled in the art in light of this disclosure, configuration of the embodiment of the invention shown in FIGS. 14A, 14B, 15A, and 15B, may differ based on design choice. For example, the injection member 1227 may be positioned adjacent the hopper's outlet portion 1206 and configured to inject French fries 1205 with condiment while the French fries 1205 are in a substantially vertical, rather than horizontal, orientation. In this embodiment of the invention, the dispensing bin 1250 may be, for example, positioned generally below the injection member 1227 to receive French fries 1205 after they have been injected with condiment by the injection member 1227.

Description of FIG. 16

A condiment injection apparatus 1405 according to a further embodiment of the invention is shown in FIG. 16. As may be understood from this figure, this condiment injection apparatus 1405 comprises an injection member 1420 that comprises an injection member base portion 1425 and a plurality of injection nozzles 1430. At least one (and preferably all) of these injection nozzles 1430 is supplied with condiment from a (preferably lightly pressurized) condiment source 1415 via a conduit (such as tubing 1455, 1465). Flow from the condiment source 1415 may be regulated by a flow regulation device 1460 (such as a valve or pump).

The condiment injection apparatus 1405 further comprises a food item receiving bin 1440 for receiving and supporting food items to be injected by the injection member 1420. This receiving bin 1440 may include a grate as its bottom surface 1445, and an excess condiment receiving bin 1450 below the bottom surface 1445.

As may be generally understood from FIG. 16, in one embodiment of the invention, the injection member 1420 is preferably configured to move between an open position (e.g., the position shown in FIG. 16), and a closed position, in which the injection member's nozzles 1430 are positioned so that they are substantially perpendicular to the receiving bin's bottom surface 1445, and so that the ends of the nozzles 1430 are spaced apart from the receiving bin's bottom surface 1445 by a gap.

In various embodiments of the invention, the length of this gap is: (1) less than ⅛ of a thickness of a food item to be injected with condiment by the machine; (2) less than ¼ of a thickness of a food item to be injected by the machine; (3) less than ⅜ of a thickness of a food item to be injected by the machine; (4) less than ½ of a thickness of a food item to be injected by the machine; (5) less than ⅝ of a thickness of a food item to be injected by the machine; (6) less than ¾ of a thickness of a food item to be injected by the machine; and/or (7) less than ⅞ of a thickness of a food item to be injected by the machine. Also, in various embodiments of the invention, the length of this gap is: (1) less than ¾ of an inch; (2) less than ⅝ of an inch; (3) less than ½ of an inch; (4) less than ⅜ of an inch; (5) less than ¼ of an inch; (6) less than ⅛ of an inch; and/or (7) less than 1/16 of an inch.

In one embodiment of the invention, the gap is dimensioned so that when a food item (such as a French fry) is disposed between the injection member 1420 and the receiving bin's bottom surface 1445, and the injection member 1420 is in the closed position, at least one of the injection member's nozzles 1430 pierces only one surface (e.g., the upper surface) of the food item. This serves to prevent the nozzle 1430 from piercing entirely through the food item and ejecting condiment adjacent the exterior of the food item rather than into the food item's interior. (However, the gap may also be selected so that the condiment dispensing apparatus 1405 automatically dispenses condiment onto the exterior surfaces of one or more food items.)

In one embodiment of the invention, the injection member 1420 is attached to rotate relative to the receiving bin 1440 via a hinge 1437. Furthermore, the injection member 1420 is preferably provided with a handle 1435 for facilitating the movement of the injection member 1420 between an open and a closed position.

To use this embodiment of the invention, the user first moves the injection member 1420 into an open position. The user then places one or more food items, such as French Fries, hash browns, French toast sticks, pancakes, tater tots, hot dogs, hamburgers (or any other food item, especially the food items mentioned in this specification) into the interior of the receiving bin 1440 (preferably so that the food items form a single layer on the bottom of the receiving bin 1440). The user then moves the injection member 1420 into the closed position (e.g., by rotating the injection member 1420 downwardly about the hinge 1437).

In a preferred embodiment of the invention, the condiment injection apparatus 1405 includes a sensor (e.g., a light sensor, a mechanical sensor, or any other suitable sensor) that senses when the injection member 1420 has been initially moved into the closed position. When the sensor determines that the injection member 1420 has been moved into the closed position, the condiment injection apparatus 1405 (and preferably a computer processor or other suitable control system disposed within or connected to the condiment injection apparatus 1405) uses the flow regulation device 1460 to allow condiment to flow from the condiment source 1415, through the injection nozzles 1430 and into the interior of the food items within the receiving bin 1440. In one embodiment of the invention, one or more of the nozzles 1430 is configured to only eject condiment if the nozzle 1430 is disposed within the interior of a food item. This may be accomplished in any suitable manner, and especially in any manner discussed herein.

Alternatively, each nozzle 1430 is configured to eject condiment whenever the injection member 1420 is moved into the closed position. In this embodiment, if a nozzle 1430 ejects condiment and the condiment does not come to rest on the exterior or within the exterior of a food item, the condiment simply passes through holes defined by the bottom surface 1445 of the receiving bin 1440 and into an excess condiment receiving bin 1450 disposed adjacent (and preferably below) the bottom surface 1445 of the receiving bin 1440.

Description of FIG. 18

FIG. 18 depicts a condiment injection apparatus 1600 according to an exemplary embodiment of the invention that is configured for injecting food items with a condiment, especially food items (such as hash browns) that have a distinct exterior contour. As may be understood from this figure, this embodiment of the invention comprises an injection member 1605 that includes at least one injection subassembly 1620, 1621 having a plurality of injection nozzles 1625. At least one (and preferably all) of the injection nozzles 1625 within a particular injection subassembly 1620, 1621 is supplied with one or more condiments from a (preferably lightly pressurized) condiment source (not shown) via one or more conduits (such as condiment inlets 1640, 1641, 1642). Flow from the condiment source is regulated by one or more flow regulation devices, such as a valve or pump (not shown) (e.g., in a manner discussed above).

The condiment injection apparatus 1600 also comprises a base portion 1610 defining one or more food item receiving portions 1615, 1616 each of which is configured for receiving and supporting at least one particular type of food item to be injected by the injection member 1605. In one embodiment of the invention, each food item receiving portion 1615, 1616 is configured to substantially conform to an exterior profile of a particular food item (such as a hash brown) and to maintain the food item in place when the food item is being injected with a condiment by the condiment injection apparatus 1600.

In one embodiment of the invention, each food item receiving portion 1615, 1616 includes a grate as its bottom surface 1630, and an excess condiment receiving bin (not shown) is preferably disposed adjacent to (and preferably below) this grate. In one embodiment of the invention, this excess condiment receiving bin is configured to receive condiment that is ejected from the nozzles 1620, 1621 and that does not come to rest on or within a food item. The excess condiment receiving bin may be configured to be drained, for example, by an excess condiment outlet tube 1635.

As may be generally understood from FIG. 18, in one embodiment of the invention, the injection member 1605 is preferably configured to move between an open position (shown in FIG. 18), and a closed position, in which the nozzles of each injection subassembly 1620, 1621 are positioned substantially within a corresponding food item receiving portion 1615, 1616. For example, when the condiment injection device 1600 is in a closed position, the nozzles 1625 of the leftmost injection subassembly 1621 are disposed substantially within the leftmost food item receiving portion 1616.

Also, in one embodiment of the invention, the nozzles 1625 of at least a particular one of the injection subassemblies 1620, 1621 together form the general shape of the food item receiving portion 1615, 1616 that corresponds to that particular injection subassembly 1620, 1621. This may serve to assure that the food item is, for example, substantially uniformly injected with condiment.) Also, in one embodiment of the invention, when the injection member 1605 is in the closed position, the injection member's nozzles 1625 are positioned so that they are substantially perpendicular to their corresponding food item receiving portion's bottom surface 1630, and so that the ends of the nozzles 1625 are spaced apart from that food item receiving portion's bottom surface 1630 by a gap.

In various embodiments of the invention, the length of this gap is: (1) less than ⅛ of the thickness of a food item to be injected by the condiment injection apparatus 1600; (2) less than ¼ of the thickness of a food item to be injected by the condiment injection apparatus 1600; (3) less than ⅜ of the thickness of a food item to be injected by the condiment injection apparatus 1600; (4) less than ½ of the thickness of a food item to be injected by the condiment injection apparatus 1600; (5) less than ⅝ of the thickness of a food item to be injected by the condiment injection apparatus 1600; (6) less than ¾ of the thickness of a food item to be injected by the condiment injection apparatus 1600; and/or (7) less than ⅞ of the thickness of a food item to be injected by the condiment injection apparatus 1600. Also, in various embodiments of the invention, the length of this gap is: (1) less than ¾ of an inch; (2) less than ⅝ of an inch; (3) less than ½ of an inch; (4) less than ⅜ of an inch; (5) less than ¼ of an inch; (6) less than ⅛ of an inch; and/or (7) less than 1/16 of an inch.

In one embodiment of the invention, the gap is dimensioned so that when a food item is disposed between the injection member 1605 and a food item receiving portion's bottom surface 1630, and the injection member 1605 is in a closed position, at least one of the injection member's nozzles 1625 pierces only one surface (e.g., the upper surface) of the food item. This serves to prevent the nozzle 1625 from piercing entirely through the food item and ejecting condiment adjacent the exterior of the food item rather than into the food item's interior. However, the gap may also (or alternatively) be selected to automatically dispense condiment onto the exterior surface of the food item.

In one embodiment of the invention, the injection member 1605 is attached to rotate relative to the base portion 1610 about a hinge 1607. Furthermore, the injection member 1605 is preferably provided with a handle 1650 for facilitating the movement of the injection member 1605 between an open and a closed position.

To use this embodiment of the invention, the user first moves the injection member 1605 into an open position. The user then places at least one (and preferably only one) food item, such as a hash brown, pancake, tater tot, hot dog, hamburger (or any other food item, especially the food items mentioned in this specification) into each food item receiving portion 1615, 1616. In one embodiment of the invention, the user places each food item into a food item receiving portion 1615, 1616 that defines a retaining portion (e.g., the side portions of the food item receiving portion 1615, 1616) that are in a form that substantially corresponds to the exterior shape of the food item.

For example, in the example shown in FIG. 18, one hash brown is placed into each of the condiment dispensing apparatus' generally hash brown-shaped food item receiving portions 1615, 1616. Each hash brown in then aligned within its corresponding food item receiving portion 1615, 1616 so that the hash brown fits within its corresponding food item receiving portion 1615, 1616. The user then moves the injection member 1605 into the closed position.

In a preferred embodiment of the invention, the condiment injection apparatus 1600 includes a sensor (e.g., a light sensor, a mechanical sensor, or any other suitable sensor) that senses when the injection member 1605 has been initially moved into a closed position. When the sensor determines that the injection member 1605 has been moved into the closed position, the condiment injection apparatus 1600 (and preferably a computer processor or other suitable control mechanism disposed within, or attached to, the condiment injection apparatus) uses a flow regulation device (not shown) to convey condiment from at least one condiment source (e.g., one or more condiment inlets 1640, 1641, 1642), through the injection nozzles 1625, and into the interior of the food items.

In one embodiment of the invention, one or more of the injection nozzles 1625 is configured to only eject condiment if the injection nozzle 1625 is disposed within the interior of a food item. This may be accomplished in any suitable manner (e.g., by providing a sensor apparatus adjacent each nozzle 1625 that detects the presence of a food item and only permits condiment flow through the nozzle 1625 if the sensor detects the presence of a food item adjacent the nozzle 1625), and especially in any manner discussed above.

Alternatively, one or more sensors may be provided within each food item receiving portion 1615, 1616, and condiment may only be permitted to flow through the nozzles 1625 of a particular injection subassembly 1620, 1621 if: (1) the injection member 1605 is in a closed position; and (2) the one or more sensors detect the presence of a food item within the food item receiving portion 1615, 1616 that corresponds to that particular injection subassembly 1620, 1621.

Alternatively, the condiment injection apparatus 1600 may be configured so that each nozzle 1625 ejects condiment whenever the injection member 1605 is moved into a closed position. In this embodiment, if a nozzle 1625 ejects condiment without being adjacent a food item, the condiment simply passes through holes defined by the bottom surface 1630 of the corresponding food item receiving portion 1615, 1616 and into an excess condiment receiving bin (not shown).

As shown generally in FIG. 18, the condiment injection apparatus 1600 may be supplied with a plurality of different condiments via one or more condiment inlets 1640, 1641, 1642. In one embodiment of the invention, the condiment injection apparatus 1600 is configured to allow a user to select one or more condiments from a plurality of condiments for injection into one or more food items. This allows users to use a single machine to inject food items with a variety of different condiments (e.g., ketchup, cheese sauce, ranch dressing, barbeque sauce, or maple syrup)

Description of FIGS. 17A–17C

FIGS. 17A–17C depict yet another embodiment of a condiment injection apparatus 1500 according to the present invention. As may be understood from these figures, this condiment injection apparatus 1500 comprises: (1) a conveyor 1505 (such as an endless belt conveyor or other suitable conveyor) having at least one food item support plate 1507, 1509 disposed adjacent the top surface of the conveyor 1505; (2) a food item scanning system, such as a light grid 1510, that is configured for determining the position and/or the dimensions of food items 1511 passing through food item scanning system; and (3) an automated injection assembly 1520 that is configured for injecting food items 1511 with condiment once the food item scanning system has determined the position and/or dimensions of the food items 1511.

As may be understood from FIG. 17A, in this embodiment of the invention, the conveyor 1505 is configured to move food items 1511 (such as French fries) disposed on a support plate 1507, 1509 relative to both a light grid 1510 (such as a DS3 series AREASCAN™ detection and measurement light grid, which is manufactured by Datasensor SpA) and an automated injection assembly 1520. As the food items 1511 pass through the light grid 1510 (and towards the automated injection assembly 1520), the light grid 1510 scans the food items 1511 and determines the dimensions and positions of the food items 1511 on the support plate 1507, 1509. The conveyor then moves the support plate 1507, 1509 adjacent (in this case, under) the automated injection assembly 1520.

Next, the condiment injection apparatus 1500 moves one or more injection nozzles 1530 in response to the information obtained from the light grid 1510. More particularly, in one embodiment of the invention, the condiment injection apparatus 1500 uses a control system (e.g., a computer operated control system) to move at least one injection nozzle 1530 above the position of a particular food item. This position is preferably determined based on position and measurement information obtained from the light grid 1510.

After the nozzle is above the particular food item, the system moves the injection nozzle 1530 toward the food item 1511 (e.g., downwardly toward the top surface of the conveyor 1505) until the injection nozzle 1530 pierces the exterior surface of the food item (e.g., as described above) and until the outlet portion of the injection nozzle 1530 is disposed within the interior of the food item 1511. Condiment is then injected through the injection nozzle 1530 and into the interior of the food item 1511 (e.g., as described above).

After the food item 1511 is injected with condiment, the automated injection assembly 1520 withdraws the injection nozzle 1530 from the interior of the food item 1511. The condiment injection apparatus 1500 then dispenses the injected food item 1511 to a user (e.g., along with other injected food items 1511) by, for example, moving the support plate 1507, 1509 back to its starting position (which is shown in the left hand portion of FIGS. 17A and 17C) where the injected food items are removed by a user.

As may be understood from FIGS. 17A and 17C, in order to decrease the amount of time required to inject a plurality of food items (e.g., a serving or a batch of French fries) with condiment, in one embodiment of the invention, the automated injection assembly 1520 comprises a plurality of injection nozzles 1530 that are configured to simultaneously inject a plurality of food items 1511 with condiment. In one embodiment of the invention, a first of the injection nozzles 1530 is configured to inject a first food item 1511 with condiment while a second of the injection nozzles 1530 is injecting a second food item 1511 with condiment. Similarly, in a particular embodiment of the invention, a third of the injection nozzles 1530 is configured to inject a third food item 1511 with condiment while the first and second injection nozzles 1530 are injecting condiment into the first and second food items 1511, respectively.

In another embodiment of the invention, a first injection nozzle 1530 and a second injection nozzle 1530 are configured to simultaneously inject a single food item 1511 with condiment. This decreases the time needed to inject condiment into the food item 1511.

In one embodiment of the invention, each injection nozzle 1530 is retractably mounted to a carriage 1563 so that the injection nozzle 1530 may move toward and away from food items 1511 disposed on a support plate 1507, 1509 positioned beneath the automated injection assembly 1520. As may be understood from FIG. 17B, each carriage 1563 is preferably slidably mounted adjacent a rod 1560 that extends laterally across the conveyor 1505, (e.g., substantially perpendicular to the lateral sides of the conveyor). This allows each carriage 1535 and corresponding nozzle 1530 to slide laterally relative to the conveyor 1505 as needed to inject condiment into various food items 1511 disposed on the support plate 1507, 1509.

As will be understood by one skilled in the art, any appropriate automated motion device (e.g., an actuator) may be used to induce the lateral and vertical motion of the various nozzles 1530 relative to both the support plate 1507, 1509 and the food items 1511. In a preferred embodiment of the invention, the movement of each nozzle 1530 is controlled by a central computerized control system, which, as noted above, coordinates the movement of the injection nozzles 1530 in response to food item position information received from the light grid 1510.

As will be understood in light of the above disclosure, the various nozzles 1530 may be supplied with one or more condiments via a condiment source in any appropriate manner (and especially in a manner described above). For example, in one embodiment of the invention, flow of the condiment through each nozzle is controlled by an individual flow regulation device 1540 (such as a pump or a valve) that is configured to control condiment flow from a condiment source 1550, through one or more conduits 1535 and through one or more corresponding nozzles 1530.

In one embodiment of the invention, the condiment injection apparatus 1500 is configured to allow a user to select, from a plurality of available condiments, one or more particular condiments (e.g., via an input device on the condiment injection apparatus 1500) to be injected into a particular food item (or plurality of food items). For example, a user may use the input device to direct the condiment injection apparatus 1500 to inject a particular serving of French fries with cheese sauce (rather than ketchup, ranch dressing, or barbeque sauce, which may also be available for selection by the user).

Description of FIGS. 19A and 19B

FIGS. 19A and 19B depict a condiment injection apparatus 1700 according to one embodiment of the invention that is configured for injecting condiment into the lateral sides of one or more food items 1710, such as French toast sticks, waffle sticks, hot dogs, chicken nuggets, or any other food items listed in this specification. As may be understood from FIG. 19A, to use the apparatus, at least one food item 1710 is first inserted into a food item receiving portion 1705 defined by the condiment injection apparatus 1700. As shown in FIG. 19B, at least one injection nozzle 1715 is then moved so that it pierces one or more side portions of the food item 1710 and so that the nozzle's outlet is disposed within the interior of the food item 1710. Condiment is then injected through the nozzle 1715 and into the food item 1710 (e.g., in a manner discussed in detail above). One or more mechanically-controlled or computer-controlled actuators are preferably used to control the movement of the nozzles 1715 relative to the food item 1710.

As may be understood from FIG. 19B, in one embodiment of the invention, the condiment injection apparatus 1700 comprises at least two injection nozzles 1715 that are adjacent opposing lateral sides of the food item 1705.

The flow of condiments from one or more condiment sources 1720 and through the various injection nozzles 1715 may be regulated in any manner discussed above. For example, in one embodiment of the invention, flow of the condiment through each injection nozzle 1715 is controlled by an individual flow regulation device (such as a pump or a valve) in a manner discussed above.

Description of FIGS. 20A and 20B

FIGS. 20A and 20B depict a condiment injection device 1800 according to yet another embodiment of the invention. As may be understood from these figures, this embodiment of the invention comprises a conveyor 1825 (e.g., an endless conveyor) that is configured to move food items (such as French fries 1830, 1835) relative to, and, for example, beneath a substantially cylindrical injection member 1805 that comprises one or more condiment injection nozzles 1810, and that is mounted to rotate relative to the conveyor 1825.

In one embodiment of the invention, the injection member 1805 is rotated about a central axis (e.g., in the direction shown in FIG. 20A) and, while the injection member 1805 is rotating, the conveyor 1825 is moved to transfer food items 1830, 1835 from a first end of the conveyor 1825 (e.g., the left end of the conveyor 1825 shown in FIG. 20A), underneath the injection member 1805, and to a second end of the conveyor 1825 (e.g., the right end of the conveyor 1825 shown in FIG. 20A). In a preferred embodiment of the invention, the injection member 1805 is positioned and configured to inject the food items 1830, 1835 (e.g., in a manner described herein) as the food items 1830, 1835 pass beneath the injection member 1805.

Alternatively, the food items 1830, 1835 may remain in a fixed position and the injection member 1805 may be moved relative to the food items 1830, 1835 to inject the food items 1830, 1835 with condiment from a condiment source 1815. In one embodiment of the invention, this is done by moving the injection member 1805, preferably while the injection member 1805 is rotating, along a substantially planar path that is substantially parallel to a surface on which the food items 1830, 1835 are supported.

As may be understood from FIG. 20A and FIG. 20B, which shows an interior cross-section of the injection member 1805, in one embodiment of the invention, the injection member 1805 defines a condiment-receiving cavity 1840 for receiving condiment from a condiment source 1815. In this embodiment of the invention, the condiment injection device 1800 is configured to transfer condiment from the condiment-receiving cavity 1840, through a nozzle-supply passage 1855 defined by the injection member 1805, through a nozzle 1810 adjacent the nozzle-supply passage 1855, out of the nozzle's outlet, and into a food item 1830, 1835. In one embodiment of the invention, this flow of condiment is regulated, as discussed generally above in regard to FIGS. 14A, 14B, 15A, and 15B, by a valve 1845 adjacent the nozzle supply passage 1855. In one embodiment of the invention, a sensor 1850, such as a light, temperature, or motion sensor, is disposed adjacent the nozzle 1810 to detect the presence of a food item adjacent the nozzle 1810. In a particular embodiment of the invention, the condiment injection device 1800 is configured to only open a valve 1845 adjacent a particular nozzle 1810, when a sensor 1850 detects the presence of a food item 1830, 1835 adjacent that particular nozzle 1810. In one embodiment of the invention, this serves to prevent the discharge of condiment from the particular nozzle 1810 when no food item 1830, 1835 is adjacent that nozzle 1810.

Description of FIGS. 21A–21C

FIGS. 21A–21C depict a condiment injection apparatus 1900 according to yet another embodiment of the invention that is configured to inject condiment adjacent (e.g., into) the end portion of a food item 1960 such as a hot dog, chicken nugget, pretzel stick, or any other food item (especially those referenced in this specification). As may be understood from these figures, this condiment injection apparatus 1900 defines a food item receiving portion 1905 (e.g., a recess that is configured for at least partially receiving a food item 1960), a food item positioning assembly 1919, and at least one injection member (such as an injection nozzle 1930).

The food item positioning assembly 1919 is preferably configured to move the food item 1960 relative to the injection member 1930 (which may be, for example, an injection nozzle, such as any injection nozzle described herein) so that the injection member 1930 pierces an end portion of the food item 1960, and so that an outlet portion 1931 of the injection member 1930 is within an interior portion 1965 (for example, a hollow portion) of the food item 1960. The condiment injection apparatus 1900 then injects condiment into the interior of the food item 1960 in a manner discussed above. After the food item 1960 is injected with the desired amount of condiment, the food item positioning assembly 1919 preferably moves the food item 1960 out of engagement with the injection member 1930 and the food item 1960 is then removed by a user.

As shown in FIGS. 21B and 21C, the injection member 1930 may be supplied with a condiment via a condiment source 1950 and flow of the condiment from the condiment source 1950 to the injection member 1930 may be regulated by a condiment flow regulation device 1940, such as a pump or a valve (e.g., in the manner described above).

In one embodiment of the invention, the food item positioning assembly 1919 is configured for applying pressure to the sides of the food item 1960 and for moving the food item 1960 toward the injection member 1930 while applying pressure to the sides of the food item 1960. This serves to assure that the injection member 1930 will move smoothly into the food item 1960 without the food item 1960 slipping substantially relative to the food item positioning assembly 1919.

In one embodiment of the invention, the food item positioning assembly 1919 comprises one or more actuators 1914, 1916, 1920, 1922 for effecting the above-described movement of the food item 1960 (for example, actuators 1914, 1916, 1920, 1922 may be configured for movement in the directions indicated in FIG. 21C). However, any other known device may be used for effecting the movement of the food item 1960 relative to the injection member 1930. For example, a vacuum may be used to draw the food item 1960 onto the injection member, and then flow of the vacuum may be reversed to force the food item 1960 off of the injection member after the food item 1960 has been injected with condiment.

Similarly, movement of the food item 1960 may be accomplished by a user manually moving the food item 1960 relative to the injection member 1930. In this embodiment of the invention, the condiment injection apparatus 1900 is preferably configured to sense the presence of a food item 1960 adjacent the injection member 1930 and, in response to detecting the presence of the food item 1960, injecting the food item 1960 with a condiment. In addition, the injection member 1930 may be configured to move relative to the food item 1960 (rather than moving the food item 1960 relative to the injection member 1930) during the injection process. In this embodiment of the invention, the condiment injection apparatus 1900 is preferably configured to hold the food item 1960 in place while the food item 1960 is injected with condiment.

The embodiment of the invention shown in FIGS. 21A–21C is particularly suitable for injecting condiment into hot dogs (especially cooked hot dogs) that define a hollow interior portion 1965 to create a "fresh condiment-filled food item" (a food item that has been filled with a condiment after the food item has been cooked), such as a fresh condiment-filled hot dog. For example, this allows users (such as restaurant workers or customers) to produce a condiment-filled hot dog (preferably at a restaurant) that is filled with a condiment that was not pre-frozen or otherwise heated or cooled along with the hot dog.

Various versions of this embodiment of the invention may also be used to allow users to fill a hot dog (or other food item) on a customized basis. Thus, in response to a customer ordering a food item (such as a hot dog) that is filled with a particular, specified condiment, a food worker may retrieve a cooked food item, inject the food item with the specified condiment, and then serve the food item to the customer. Alternatively, a restaurant (or other food vendor) may provide a customer with a food item (such as a hot dog) that defines a condiment-receiving cavity 1965 (or other recess) and also provide the customer with an apparatus for injecting one or more condiments into the food item's condiment receiving cavity 1965. In one embodiment of the invention, this may allow customers to fill the food item as desired with one or more condiments of their choice.

CONCLUSION

It should be understood that while various embodiments above may be described in relation to a particular food item or a particular condiment, any suitable food item (especially any of the food items disclosed in this specification) may be used in any of the above embodiments and any suitable condiment (especially any of the condiments disclosed in this specification) may be used in any of the embodiments described above.

Furthermore, it should be understood that any of the embodiments of the invention described herein may be used with various different types of nozzles (e.g., any of the injection nozzles or other nozzles described herein). In addition, it should be understood that any of the embodiments of the invention described herein may be equipped with nozzles that are configured for injecting condiment onto an exterior surface of, rather than into an interior surface of, a food item.

It should also be understood that, while various embodiments above are described as having a single condiment source, this single condiment source may be replaced by one or more condiment sources that are configured for providing multiple condiments to any of the above embodiments of the invention. This serves to allow the embodiments to be used to inject one or more of a plurality of condiments into one or more food items.

Also, in any embodiment of the invention described above, the condiment source may comprise a disposable condiment container that is configured to be depleted of condiment only once before either being disposed of or retuned to a central facility for refilling. Such disposable condiment containers are preferably configured so that they are difficult for a user to refill without tampering.

Furthermore, a method according to one embodiment of the invention comprises the steps of: (1) providing a condiment injection device and at least two disposable condiment containers; (2) using the condiment injection device to inject condiment from the a first disposable condiment container into one or more food items until the first disposable condiment container is substantially depleted of condiment; (3) replacing the first, depleted condiment container with a second condiment container; and (4) using the condiment injection device to inject condiment from the second disposable condiment container into one or more food items until the second disposable condiment container is substantially depleted of condiment.

It should be understood that while many of the embodiments of the invention described above are discussed as being configured for applying condiment to a food item after the food item is cooked, the techniques described above may also be used to apply condiments to uncooked food items. For example, a user may use one or more of the above techniques to inject a food item, such as a hollow French toast stick, with a condiment before cooking the food item.

In addition, it should be understood that while the above disclosure describes using the invention for dispensing a condiment, the invention may also be used for dispensing other fluid materials, such as other fluid food items (i.e., food items that are capable of flowing), and other fluid items. Similarly, while the above disclosure describes using the invention to inject fluid items into food items, the invention may also be used for dispensing fluid materials into other items, such as non-edible items.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What I claim is:

1. A food processing apparatus comprising:
(A) a support surface that is adapted to support at least one food item;
(B) an automated injection assembly that is configured for injecting said at least one food item with condiment while said at least one food item is being supported by said support surface, wherein said automated injection assembly:
  (1) comprises at least one injection nozzle, and
  (2) is adapted to move said at least one injection nozzle relative to said support surface; and
(C) a food item scanning system disposed adjacent said support surface, said food item scanning system being adapted to determine position data for said at least one food item, said position data corresponding to a position of said at least one food item, wherein:
said automated injection assembly is adapted for:
  moving said at least one injection nozzle to a pre-injection position in which said at least one injection nozzle is disposed adjacent said at least one food item, said pre-injection position being determined based, at least in part, on said position data; and
  after said step of moving said at least one injection nozzle into said pre-injection position, injecting condiment into said at least one food item via said at least one injection nozzle.

2. The food processing apparatus of claim 1, wherein said food processing apparatus further comprises a control system for facilitating said steps of: (A) moving said at least one injection nozzle to a pre-injection position; and (B) injecting condiment into said at least one food item.

3. The food processing apparatus of claim 1, wherein:
said food item scanning system is further adapted to determine item dimension data for said food item, said item dimension data corresponding to one or more dimensions of said food item; and
said pre-injection position is determined based, at least in part, on said item dimension data.

4. The food processing apparatus of claim 1, wherein:
said food processing apparatus comprises a support surface drive mechanism that is adapted to move said support surface relative to said food item scanning system and to thereby facilitate a determination of said position data by said scanning system.

5. The food processing apparatus of claim 4, wherein:
said scanning system comprises a light curtain; and
said support surface drive mechanism is adapted for moving said support surface so that said at least one food item passes through said light curtain to thereby facilitate a determination of said position data by said scanning system.

6. The food processing apparatus of claim 1, wherein:
said food item scanning system is further adapted to determine item dimension data for said food item, said item dimension data corresponding to one or more dimensions of said food item;
said pre-injection position is determined based, at least in part, on said item dimension data; and
said food processing apparatus comprises a support surface drive mechanism that is adapted to move said support surface relative to said food item scanning system and to thereby facilitate a determination of both said position data and said item dimension data by said scanning system.

7. The food processing apparatus of claim 6, wherein:
said scanning system comprises a light curtain; and
said support surface drive mechanism is adapted to move said support surface so that said at least one food item passes through said light curtain to thereby facilitate the determination of both said position data and said item dimension data by said scanning system.

8. The food processing apparatus of claim 7, wherein:
said support surface drive mechanism is a drive mechanism associated with a conveyor; and
said support surface is a top surface of said conveyor.

9. The food processing apparatus of claim 7, wherein:
said support surface drive mechanism is a conveyor; and
said support surface is a food item support plate disposed adjacent a top surface of said conveyor.

10. The food processing apparatus of claim 1, wherein:
said at least one food item comprises a particular food item;
said injection nozzle comprises a particular injection nozzle;
said step of injecting condiment into said at least one food item via said at least one injection nozzle comprises:
  moving said particular injection nozzle toward said particular food item until: (a) said particular injection nozzle pierces an exterior surface of said particular food item, and (b) an outlet portion of said particular injection nozzle is disposed within said particular food item; and
  while said outlet portion is disposed within said particular food item, injecting condiment through said outlet portion and into an interior portion of said particular food item.

11. The food processing apparatus of claim 1, wherein:
said at least one injection nozzle comprises a first injection nozzle and a second injection nozzle;
said at least one food item comprises a particular food item; and
said step of injecting condiment into said at least one food item comprises using said first injection nozzle to inject said particular food item with condiment while said second injection nozzle also injects said particular food item with condiment.

12. The food processing apparatus of claim 1, wherein:
said at least one injection nozzle comprises a first injection nozzle and a second injection nozzle;
said at least one food item comprises a first food item and a second food item; and
said step of injecting condiment into said at least one food item via said at least one injection nozzle comprises using said first injection nozzle to inject said first food item with condiment while said second injection nozzle injects said second food item with condiment.

13. The food processing apparatus of claim 1, wherein:
said at least one injection nozzle comprises a first injection nozzle, a second injection nozzle, and a third injection nozzle;
said at least one food item comprises a first food item, a second food item, and a third food item; and
said step of injecting condiment into said food item via said at least one injection nozzle comprises using said first injection nozzle to inject said first food item with condiment while said second injection nozzle injects said second food item with condiment, and while said third injection nozzle injects said third food item with condiment.

14. The food processing apparatus of claim 1, wherein:
said at least one injection nozzle comprises a particular injection nozzle;
said automated injection assembly further comprises a carriage; and
said particular injection nozzle is retractably mounted to said carriage so that said particular injection nozzle can move toward and away from food items disposed on said support surface.

15. The food processing apparatus of claim 14, wherein:
said automated injection assembly further comprises a carriage support member that extends laterally across and above said support surface;
said carriage is slideably mounted adjacent said carriage support member so that said carriage can slide relative to said support surface; and
said step of moving said at least one injection nozzle to a pre-injection position comprises causing said carriage to slide along said carriage support member until said particular injection nozzle is in said pre-injection position.

16. The food processing apparatus of claim 1, wherein:
said at least one injection nozzle comprises a first injection nozzle and a second injection nozzle;
said automated injection assembly further comprises a first carriage and a second carriage;
said first injection nozzle is retractably mounted to said first carriage so that said first injection nozzle can move toward and away from food items disposed on said support surface; and
said second injection nozzle is retractably mounted to said second carriage so that said second injection nozzle can move toward and away from food items disposed on said support surface.

17. The food processing apparatus of claim 16, wherein:
said automated injection assembly further comprises a first carriage support member that extends laterally across and above said support surface;
said automated injection assembly further comprises a second carriage support member that extends laterally across and above said support surface;
said first carriage is slideably mounted adjacent said first carriage support member so that said first carriage can slide relative to said support surface;
said second carriage is slideably mounted adjacent said second carriage support member so that said second carriage can slide relative to said support surface; and
said step of moving said at least one injection nozzle to a pre-injection position comprises:
  causing said first carriage to slide along said first carriage support member until said first particular injection nozzle is in a pre-injection position; and
  causing said second carriage to slide along said second carriage support member until said second particular injection nozzle is in a pre-injection position.

18. The food processing apparatus of claim 1, wherein:
said injection nozzle is disposed above said support surface; and
said step of moving said at least one injection nozzle to said pre-injection position comprises moving said injection nozzle laterally above said support surface until said injection nozzle is in said pre-injection position.

19. The food processing apparatus of claim 1, wherein:
said at least one food item comprises a particular food item;
said injection nozzle comprises a particular injection nozzle;
said step of injecting condiment into said at least one food item via said at least one injection nozzle comprises:
  moving said particular injection nozzle toward said particular food item until: (a) said particular injection nozzle pierces an exterior surface of said particular food item, and (b) an outlet portion of said particular injection nozzle is disposed within said particular food item; and
  while said outlet portion is disposed within said particular food item, injecting condiment through said outlet portion and into an interior portion of said particular food item.

20. A food processing apparatus comprising:
(A) a support surface that is adapted to support at least one food item;
(B) an automated injection assembly that is configured for injecting said at least one food item with condiment while said at least one food item is being supported by said support surface, wherein said automated injection assembly:
  (1) comprises at least one injection nozzle, and
  (2) is adapted to move said at least one injection nozzle relative to said support surface; and
(C) a food item scanning system disposed adjacent said support surface, said food item scanning system being adapted to determine item dimension data for said at least one food item, said item dimension data corresponding to one or more dimensions of said at least one food item, wherein:
said automated injection assembly is adapted for:
  moving said at least one injection nozzle to a pre-injection position in which said at least one injection nozzle is disposed adjacent said at least one food item, said pre-injection position being determined based, at least in part, on said item dimension data; and
  after said step of moving said at least one injection nozzle into said pre-injection position, injecting condiment into said at least one food item via said at least one injection nozzle.

21. The food processing apparatus of claim 20, wherein:
said injection nozzle is disposed above said support surface; and
said step of moving said at least one injection nozzle to said pre-injection position comprises moving said injection nozzle laterally above said support surface until said injection nozzle is in said pre-injection position.

22. The food processing apparatus of claim 21, wherein:
said at least one food item comprises a particular food item;
said injection nozzle comprises a particular injection nozzle;
said step of injecting condiment into said at least one food item via said at least one injection nozzle comprises:
  moving said particular injection nozzle toward said particular food item until: (a) said particular injection nozzle pierces an exterior surface of said particular food item, and (b) an outlet portion of said particular injection nozzle is disposed within said particular food item; and
  while said outlet portion is disposed within said particular food item, injecting condiment through said outlet portion and into an interior portion of said particular food item.

* * * * *